US012701147B2

(12) United States Patent
Jiang

(10) Patent No.: US 12,701,147 B2
(45) Date of Patent: Aug. 4, 2026

(54) VOICE CALL METHOD AND APPARATUS, COMPUTER-READABLE STORAGE MEDIUM, AND CHIP SYSTEM

(71) Applicant: Honor Device Co., Ltd., Shenzhen (CN)

(72) Inventor: Chenyang Jiang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 209 days.

(21) Appl. No.: 18/699,520

(22) PCT Filed: May 12, 2023

(86) PCT No.: PCT/CN2023/094078
§ 371 (c)(1),
(2) Date: Apr. 8, 2024

(87) PCT Pub. No.: WO2024/183154
PCT Pub. Date: Sep. 12, 2024

(65) Prior Publication Data
US 2025/0240331 A1     Jul. 24, 2025

(30) Foreign Application Priority Data
Mar. 3, 2023     (CN) .......................... 202310252491.8

(51) Int. Cl.
*H04L 65/80*          (2022.01)
*H04L 65/1016*        (2022.01)
(Continued)

(52) U.S. Cl.
CPC ...... *H04L 65/1016* (2013.01); *H04L 65/1104* (2022.05); *H04L 65/80* (2013.01); *H04W 36/00226* (2023.05)

(58) Field of Classification Search
CPC ............. H04L 65/1016; H04L 65/1069; H04L 65/1104; H04L 65/80; H04W 36/00226; H04W 92/18
See application file for complete search history.

(56) References Cited

U.S. PATENT DOCUMENTS 10,111,147 B1 * 10/2018 Prasad .......... H04W 36/008375
10,341,907 B1 * 7/2019 Sahin .................. H04L 65/1073
(Continued)

FOREIGN PATENT DOCUMENTS

CN          111064696 A        4/2020
CN          112671674 A        4/2021
(Continued)

OTHER PUBLICATIONS

China Mobile,"Correction on UE SDP handling for EPS Fallback," Retrieved from the Internet, URL: https://www.3gpp.org/ftp/tsg_ CT/WG1_mm-cc-sm_ex-CN1/TSGC1_130e/Docs, 6 pages (May 12, 2021).

(Continued)

*Primary Examiner* — Syed Ali
(74) *Attorney, Agent, or Firm* — Leydig, Voit & Mayer, Ltd.

(57)          ABSTRACT

A method and an apparatus for improving voice call quality in an EPSFB (Evolved Packet System Fallback) scenario are provided, which are applied to the communication field. This method provides an optimization solution for refreshing a resource reservation state to resolve a problem of dual-terminal no sound, call drop, or call drop after no sound during a call between a caller terminal and a called terminal due to signaling disorder in the EPSFB scenario, effectively improving a success rate for refreshing a call state in the current scenario and ensuring a normal voice for a terminal in an abnormal scenario.

12 Claims, 25 Drawing Sheets

(51) Int. Cl.
*H04L 65/1104* (2022.01)
*H04W 36/00* (2009.01)

(56) References Cited

U.S. PATENT DOCUMENTS

| | | | |
|---|---|---|---|
| 2016/0353315 A1 | 12/2016 | Li et al. | |
| 2017/0214790 A1* | 7/2017 | Sun | H04L 43/12 |
| 2017/0339740 A1* | 11/2017 | Abichandani | H04W 76/10 |
| 2019/0273762 A1* | 9/2019 | Soliman | H04L 65/80 |
| 2019/0335531 A1* | 10/2019 | Wang | H04W 40/005 |
| 2020/0112887 A1* | 4/2020 | Kwok | H04W 36/302 |
| 2020/0137623 A1* | 4/2020 | Nirwani | H04L 65/80 |
| 2021/0344730 A1 | 11/2021 | Jing et al. | |
| 2022/0240128 A1 | 7/2022 | Jiang et al. | |
| 2022/0369197 A1 | 11/2022 | Naik et al. | |
| 2023/0224341 A1* | 7/2023 | Hwang | H04L 65/1104 |
| | | | 370/352 |
| 2024/0015604 A1 | 1/2024 | Zhang | |
| 2024/0236152 A1 | 7/2024 | Wu et al. | |

FOREIGN PATENT DOCUMENTS

| | | |
|---|---|---|
| CN | 115209487 A | 10/2022 |
| CN | 115915036 A | 4/2023 |
| WO | 2022194210 A1 | 9/2022 |
| WO | 2022252725 A1 | 12/2022 |
| WO | 2022271772 A1 | 12/2022 |

OTHER PUBLICATIONS

Miikka Poikselkä et al., "VoLTE End to End and Signalling," Voice Over LTE, pp. 99-215, ISBN: 978-1-11-995168-1, John Wiley & Sons, Ltd, Chichester, UK, XP055082307, DOI:10.1002/9781119944935.ch5 (Feb. 1, 2012).

Nokia et al., "Splitting MO Call TC 12.1 to Rel-5 and Rel-6 variants," 3GPP TSG RAN WG5 Meeting #35, R5-071496, Section 12, Kobe, Japan (May 7-11, 2007).

* cited by examiner

FROM

VOICE CALL METHOD AND APPARATUS, COMPUTER-READABLE STORAGE MEDIUM, AND CHIP SYSTEM

CROSS-REFERENCE TO RELATED APPLICATIONS

This application is a national stage of International Application No. PCT/CN2023/094078, filed on May 12, 2023, which claims priority to Chinese Patent Application No. 202310252491.8, filed on Mar. 3, 2023. The disclosures of both of the aforementioned applications are hereby incorporated by reference in their entireties.

TECHNICAL FIELD

This application relates to the communication field, and specifically, to a communication method and apparatus, a computer-readable storage medium, and a chip system.

BACKGROUND

Wireless cellular communication network technologies have entered the 5G era, and a fifth-generation system (5GS) starts to provide anew radio (NR) access technology. However, in some areas, 5G network coverage is not yet available. In addition, some users are not willing to use 5G, and disable a 5G function on a terminal device. This causes the terminal device to fall back from a 5G network to a 4G network. In a process of initiating a phone call between two terminal devices, if a called terminal falls back from 5G to 4G, a time point at which a voice bearer is established will be affected, which may lead to no voice or automatic hang-up after the call is connected.

SUMMARY

In view of this, this application provides a communication method and apparatus, a computer-readable storage medium, and a chip system, to effectively improve a success rate of call state refreshing of a terminal device in an EPSFB (Evolved Packet System Fallback) process, and avoid a problem of dual-terminal no sound, call drop, or call drop after no sound, thereby improving user experience of a terminal device.

According to a first aspect, a communication method is provided, including: A second terminal device receives a first call initiated by a first terminal device. The second terminal device sends first signaling to the first terminal device based on the first call, where the first signaling includes 200 OK and a=curr:qos local sendrecv, the first signaling is sent before second signaling is received by the second terminal device, and the second signaling includes QCI=1. The second terminal device receives voice sent by the first terminal device after the second terminal device connects to the first call.

In an implementation, the method further includes: Before the second terminal device sends the first signaling to the first terminal device, the second terminal device receives UPDATE signaling sent by the first terminal device based on the first call, where the first signaling is sent to the first terminal device in response to the UPDATE signaling.

In an implementation, an EPS fallback occurs on the second terminal device after a call initiated by the first terminal device is received and before the first signaling is to be received.

In an implementation, the first signaling is received based on completion of the EPS fallback by the second terminal device.

In an implementation, the method further includes: receiving a first switching instruction before a network standard of the second terminal device is configured as a second network standard, where that the network standard of the second terminal device is configured as the second network standard is executed in response to the first switching instruction.

In an implementation, the method further includes: Before the second terminal device receives the first switching instruction, the second terminal device sends 100 Trying signaling to the first terminal device in response to the first call initiated by the first terminal device, where the first switching instruction is received based on the 100 Trying signaling.

According to a second aspect, a communication method is provided, including: A second terminal device receives a second call initiated by a first terminal device. The second terminal device sends third signaling to the first terminal device at a first moment, where the third signaling includes 200 OK and a=curr:qos local sendrecv, the third signaling is sent before fourth signaling is received by the second terminal device, and the fourth signaling includes QCI=1. The second terminal device sends first 180 Ringing signaling to the first terminal device after the fourth signaling is received by the second terminal device and after first duration from the first moment. The second terminal device receives a third call initiated by the first terminal device after the second terminal device rejects the second call. The second terminal device sends fifth signaling to the first terminal device at a second moment, where the fifth signaling includes 200 OK and a=curr:qos local none, the fifth signaling is sent before sixth signaling is received by the second terminal device, and the sixth signaling includes QCI=1. The second terminal device sends second 180 Ringing signaling to the first terminal device after the sixth signaling is received by the second terminal device and after second duration from the second moment, where the second duration is greater than the first duration based on a fact that the fifth signaling includes a=curr:qos local none. The second terminal device receives the voice sent by the first terminal device after the second terminal device connects to the third call.

In an implementation, after the second terminal device sends the fourth signaling to the first terminal device, the method further includes: The second terminal device starts timing, where the second 180 Ringing signaling is sent based on a fact that timing duration is greater than preset duration.

According to a third aspect, a communication method is provided, including: A first terminal device sends first INVITE signaling to a second terminal device when the first terminal device initiates a fourth call to the second terminal device. After 180 Ringing signaling is received by the first terminal device, the first terminal device receives seventh signaling based on the fourth call, where the seventh signaling includes 200 OK and a=curr:qos local none, and the fourth call is connected at a third moment. The first terminal device sends second INVITE signaling to the second terminal device at a fourth moment based on a fact that the fourth call is connected, where the first INVITE signaling and the second INVITE signaling include a same SIP Call ID, the second INVITE signaling include a=sendrecv, and a voice sent by the second terminal device is not received by the first terminal device between the third moment and the fourth moment. The first terminal device receives, based on the second INVITE signaling, third signaling sent by the second terminal device, where the third signaling includes 200 OK and a=sendrecv. After the third signaling is received by the first terminal device, the first terminal device receives the voice sent by the second terminal device.

In an implementation, before the first terminal device sends second INVITE signaling to the second terminal device, the method further includes: The first terminal device sends third INVITE signaling to the second terminal device based on a fact that the fourth call is connected, where the third INVITE signaling includes a=sendonly information, and the first INVITE signaling and the third INVITE signaling include a same SIP Call ID. The first terminal device receives, based on the third INVITE signaling, fourth signaling sent by the second terminal device, where the fourth signaling includes 200 OK and a=recvonly.

According to a fourth aspect, a communication method is provided, including: A second terminal device receives first INVITE signaling sent by a first terminal device when the second terminal device receives a fourth call initiated by the first terminal device. The second terminal device sends seventh signaling to the first terminal device based on the fourth call, where the seventh signaling includes 200 OK and a=curr:qos local none, and the fourth call is connected at a third moment. The second terminal device receives, based on a fact that the fourth call is connected, second INVITE signaling sent by the first terminal device at a fifth moment, where the first INVITE signaling and the second INVITE signaling include a same SIP Call ID, the second INVITE signaling includes a=sendrecv, and a voice sent by the first terminal device is not received by the second terminal device between the third moment and the fifth moment. The second terminal device sends third signaling to the first terminal device in response to the second INVITE signaling, where the third signaling includes 200 OK and a=sendrecv. After the second terminal device sends the third signaling, the second terminal device receives the voice sent by the first terminal device.

In an implementation, before the second terminal device receives second INVITE signaling sent by the first terminal device, the method further includes: The second terminal device receives, based on a fact that the fourth call is connected, third INVITE signaling sent by the first terminal device, where the third INVITE signaling includes a=sendonly information, and the first INVITE signaling and the third INVITE signaling include a same SIP Call ID. The second terminal device sends fourth signaling to the first terminal device in response to the third INVITE signaling, where the fourth signaling includes 200 OK and a=recvonly.

According to a fifth aspect, a communication apparatus is provided, where the communication apparatus includes a processor, an antenna, and a memory. The memory is configured to store instructions, and the processor is configured to execute the instructions stored in the memory, to control the antenna to receive or send a signal, so as to perform the method according to any one of the above implementations.

According to a sixth aspect, a computer-readable storage medium is provided. The computer-readable storage medium stores a computer-executable program. When the computer-executable program is invoked by a computer, the computer is enabled to perform the method according to any one of the above implementations.

According to a seventh aspect, a chip system is provided, including a processor. The processor is configured to execute a computer-executable program, to enable a device installed with the chip system to perform the method according to any one of the above implementations.

DESCRIPTION OF EMBODIMENTS

Figure 1A:
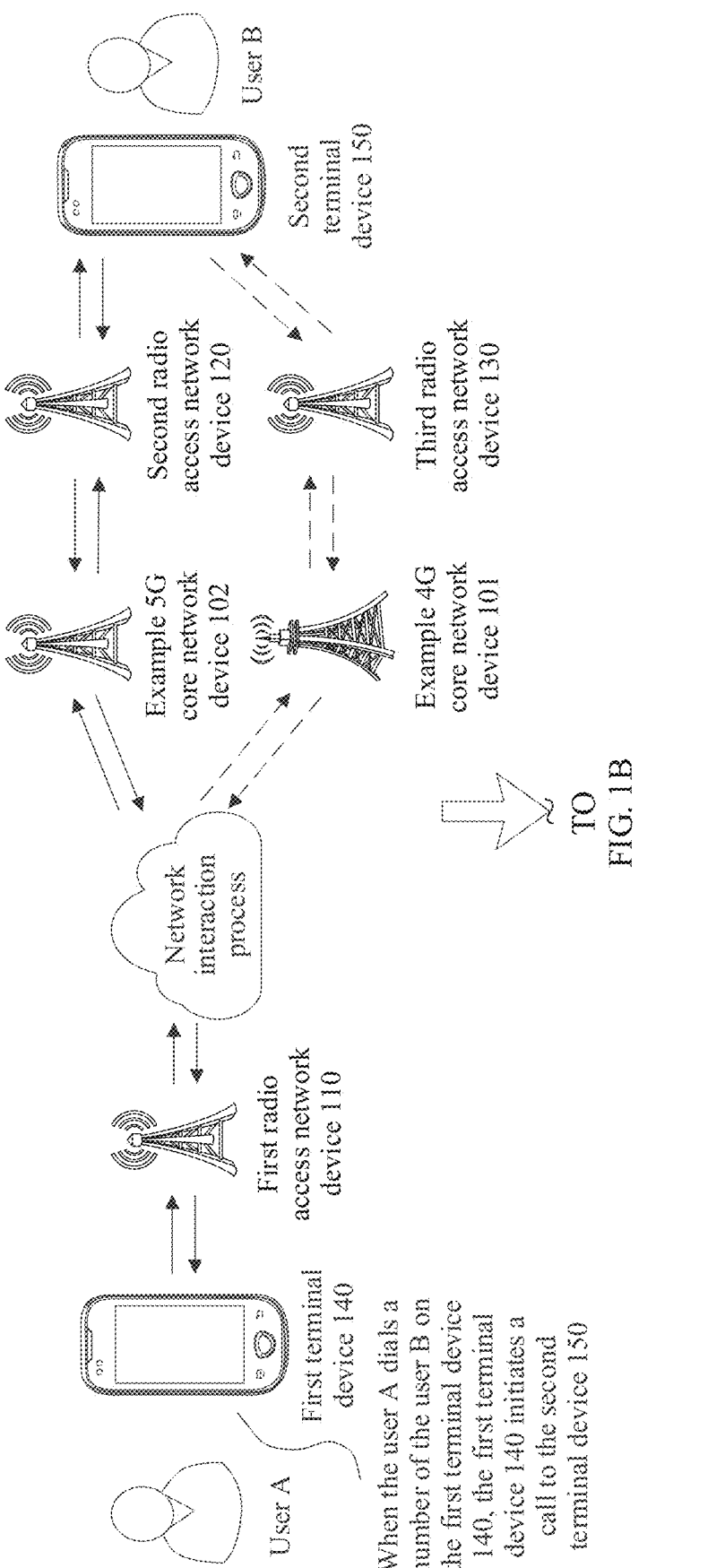
FIG. 1A TO FIG. 1C are diagrams showing an example of an application scenario according to an embodiment of this application.

The following describes technical solutions of embodiments in this application with reference to accompanying drawings. When the following description refers to the accompanying drawings, unless otherwise indicated, the same reference numerals in different drawings indicate the same or similar elements. Implementations described in the following example embodiments do not represent all implementations consistent with this application. On the contrary, the implementations are only examples of apparatuses and methods consistent with some aspects of this application as detailed in the appended claims.

The terms used in the embodiments of this application are merely for describing specific embodiments, but are not intended to limit this application. The terms "a", "said" and "the" of singular forms used in this application and the appended claims of this application are also intended to include plural forms, unless otherwise specified in the context clearly. "A plurality of" may be understood as "at least two", and "a plurality of items" may be understood as "at least two items". It should also be understood that, the term "and/or" used herein indicates and includes any or all possible combinations of one or more associated listed items.

In addition, although the terms first, second, third, and the like may be used in this application to describe various information, such information should not be limited to these terms. These terms are merely used to distinguish the same type of information from each other. For example, without departing from the scope of this application, first information may also be referred to as second information, and similarly, second information may also be referred to as first information. Depending on the context, the word "if" as used herein can be interpreted as "at the time of" or "when" or "in response to determining."

The technical solutions in the embodiments of this application may be applied to various communication systems, for example, a long term evolution (LTE) system, a universal mobile telecommunication system (UMTS), a worldwide interoperability for microwave access (WiMAX) communication system, a 5th generation (5G) system, a new radio (NR) system, or a future mobile communication system, vehicle-to-X (V2X), where the V2X may include vehicle to network (V2N), vehicle to vehicle (V2V), vehicle to infrastructure (V21), and vehicle to pedestrian (V2P), long term evolution-vehicle (LTE-V), internet of vehicles, machine type communication (MTC), internet of things (IoT), long term evolution-machine (LTE-M), machine to machine (M2M), and the like.

A terminal device in the embodiments of this application may alternatively be referred to as a user equipment (UE), a mobile station (MS), a mobile terminal (MT), an access terminal, a user unit, a user station, a mobile site, a mobile station, a remote station, a remote terminal, a mobile device, a user terminal, a terminal, a wireless communication device, a user agent, or a user apparatus. The terminal device may be a device that provides voice and/or data connectivity to a user, for example, a handheld device or a vehicle-mounted device with a wireless connection function. Currently, some examples of the terminal include a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal with cloud gaming, a wireless terminal in self-driving, a wireless terminal in a remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device and a computing device with a wireless communication function, another processing device, a vehicle-mounted device, or a wearable device connected to a wireless modem, a terminal device in a 5G network, or a terminal device in a future evolved public land mobile network (PLMN). This is not limited in the embodiments of this application.

The network referred to in the embodiments of this application is a core network and an access network device that are responsible for processing a voice service, and includes, for example, an internet protocol (IP) multimedia subsystem (IP multimedia subsystem, IMS) network or another network. The IMS network includes an IMS domain core network and an evolved packet core (EPC) network. The IMS domain core network include a serving-call session control function (S-CSCF), an interrogating-call session control function (I-CSCF), a proxy-call session control function (P-CSCF), a session border controller (SBC), and several dedicated servers, such as a multimedia telephony application server (MMTel AS). The I-CSCF may be disposed together with the S-CSCF, and may be referred to as "I/S-CSCF" for short. The SBC may be disposed together with the P-CSCF, and may be referred to as "SBC/P-CSCF" for short. The EPC may include a packet data network gateway (PGW), a serving gateway (SGW), and a mobile management entity (MME). The PGW may be disposed together with the SGW, and may be referred to as "SGW/PGW" for short.

The foregoing network elements are corresponding network elements in the IMS network in the conventional technology. They are not described in detail but only briefly herein. For example, the S-CSCF may be used for user registration, authentication control, session routing, and service trigger control, and maintain session state information. The I-CSCF may be used for assignment and query of an S-CSCF registered by a user. The P-CSCF may be used for proxy of signaling and a message. The SBC can provide secure access and media processing. The MMTel AS provides basic and supplementary services for a multimedia telephone. The MME is a core device of an EPC network. The SGW may be used to connect an IMS core network to a wireless network, and the PGW may be used to connect the IMS core network to an IP network.

A radio access network (RAN) device is an access device that allows a terminal device to access a mobile communication system in a wireless manner, and may be a base station NodeB, an evolved NodeB (eNB), a next generation NodeB (gNB) in a 5G mobile communication system, a transmission point, a base station in a future mobile communication system or an access node in a Wi-Fi system, one or more antenna panels of a base station in the 5G system, or may be a network node that forms a gNB or the transmission point, such as a baseband unit (BBU) or a distributed unit (DU). A specific technology and a specific device form used by the radio access network device are not limited in the embodiments of this application. In some deployments, the gNB may include a central unit (CU) and the DU, and the CU and the DU separately implement some functions of the gNB. For example, the CU is responsible for processing a non-real-time protocol and service, and implementing functions at radio resource control (RRC) and packet data convergence protocol (PDCP) layers. The DU is responsible for processing a physical layer protocol and real-time service, and implementing functions at radio link control (RLC), media access control (MAC), and physical (PHY) layers. The gNB may further include an active antenna unit (AAU). The AAU implements some physical layer processing functions, and functions related to radio frequency processing and an active antenna. Because information of the RRC layer eventually becomes information of the PHY layer, or is transformed from information of the PHY layer, under this architecture, higher layer signaling, such as RRC layer signaling, may alternatively be considered to be sent by the DU, or sent by DU+AAU. It should be noted that, a network device may be a device including one or more of a CU node, a DU node, and an AAU node. In addition, the CU may be used as a network device in an access network, or may be used as a network device in a core network (CN). This is not limited in this application.

The radio access network device and the terminal device may be deployed on land, including indoor or outdoor, or handheld or vehicle-mounted; or may be deployed on a water surface; or may alternatively be deployed on an airplane, a balloon, or a satellite in the air. Application scenarios of the radio access network device and the terminal device are not limited in the embodiments of this application. Communication between the radio access network device and the terminal device and communication between terminal devices may be performed by using a licensed spectrum, may be performed by using an unlicensed spectrum, or may be performed by using both a licensed spectrum and an unlicensed spectrum. Communication between the radio access network device and the terminal device and communication between terminal devices may be performed by using a spectrum less than 6 gigahertz (GHz), may be performed by using a spectrum greater than 6 GHz, or may be performed by using both a spectrum less than 6 GHz and a spectrum greater than 6 GHz. A spectrum resource used between the radio access network device and the terminal device is not limited in the embodiments of this application.

In the embodiments of this application, the terminal device or the network device includes a hardware layer, an operating system layer that runs at the hardware layer, and an application layer that runs at the operating system layer. The hardware layer includes hardware such as a central processing unit (CPU), a memory management unit (MMU), and a memory (which is also referred to as a main memory). The operating system may be any one or more computer operating systems for implementing service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in the embodiments of this application is not specifically limited, provided that a program that records code of the method provided in the embodiments of this application can be run to perform communication according to the method provided in the embodiments of this application. For example, the execution body of the method provided in the embodiments of this application may be a terminal device or a network device, or may be a functional module that can invoke the program and execute the program and that is in a terminal device or a network device.

In addition, aspects or features of this application may be implemented as methods, apparatuses, or products that use standard programming and/or engineering technologies. The term "product" used in this application may cover a computer program that can be accessed from any computer-readable device, carrier or medium. For example, the computer-readable medium may include but is not limited to: a magnetic storage device (such as a hard disk, a floppy disk, or a magnetic tape), an optical disc (such as a compact disc (CD) or a digital versatile disc (DVD)), a smart card, and a flash memory device (such as an erasable programmable read-only memory (EPROM), a card, a stick, or a key drive). Various storage media described herein may represent one or more devices and/or machine-readable media configured to store information. The term "machine-readable media" may include but is not limited to a radio channel and various other media that can store, include, and/or carry instructions and/or data.

It should be noted that explanations of signaling and terminology in this application may also be referred to explanations in a 3rd generation partnership project (3GPP) standard protocol, for example, 24.229, RFC3261, and RFC3262. Alphabetical cases and spaces of signaling in this application are merely examples, and are specifically defined in the standard protocol.

Figures 1A, 1B:
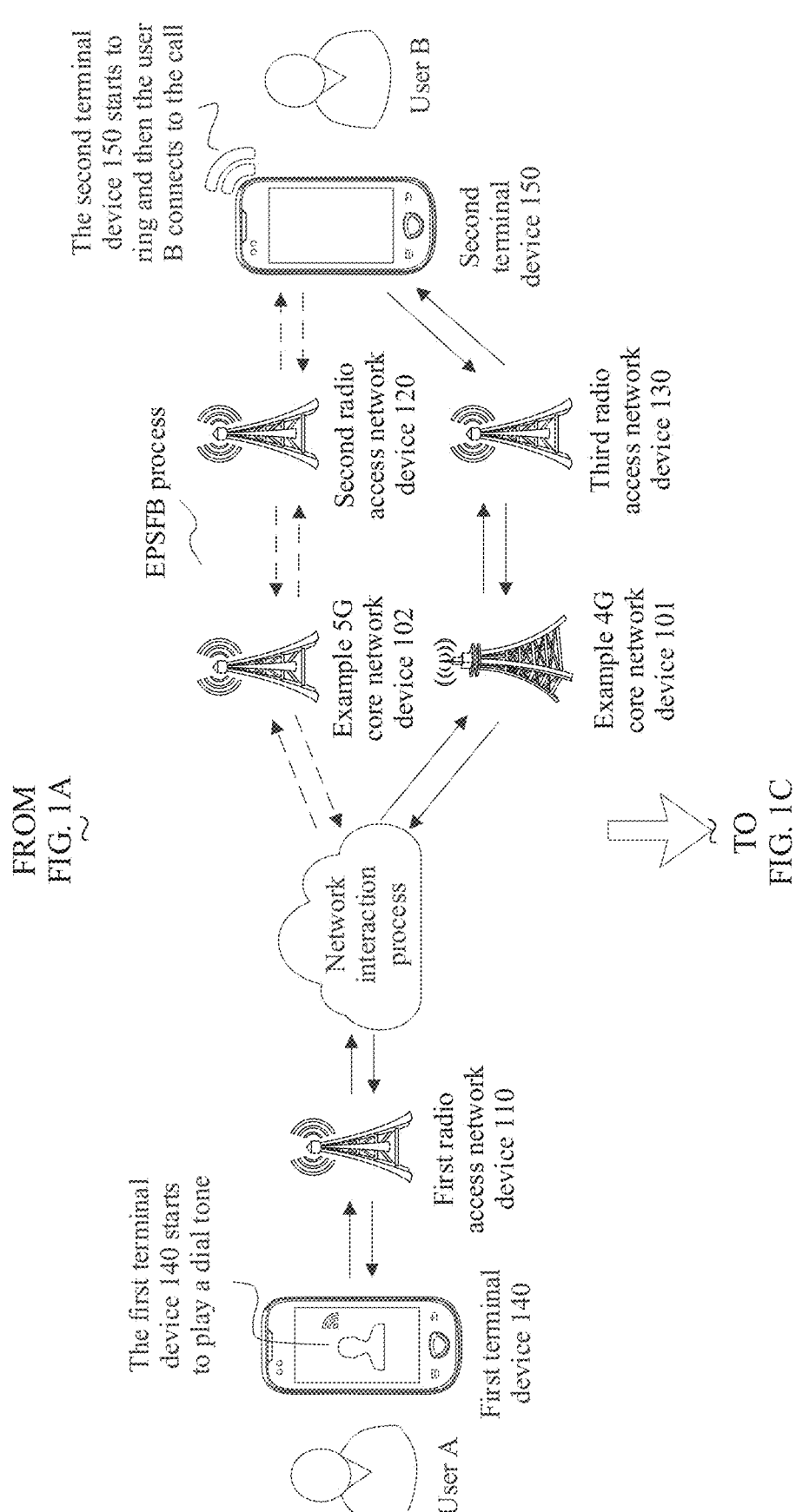
Figure 1C:
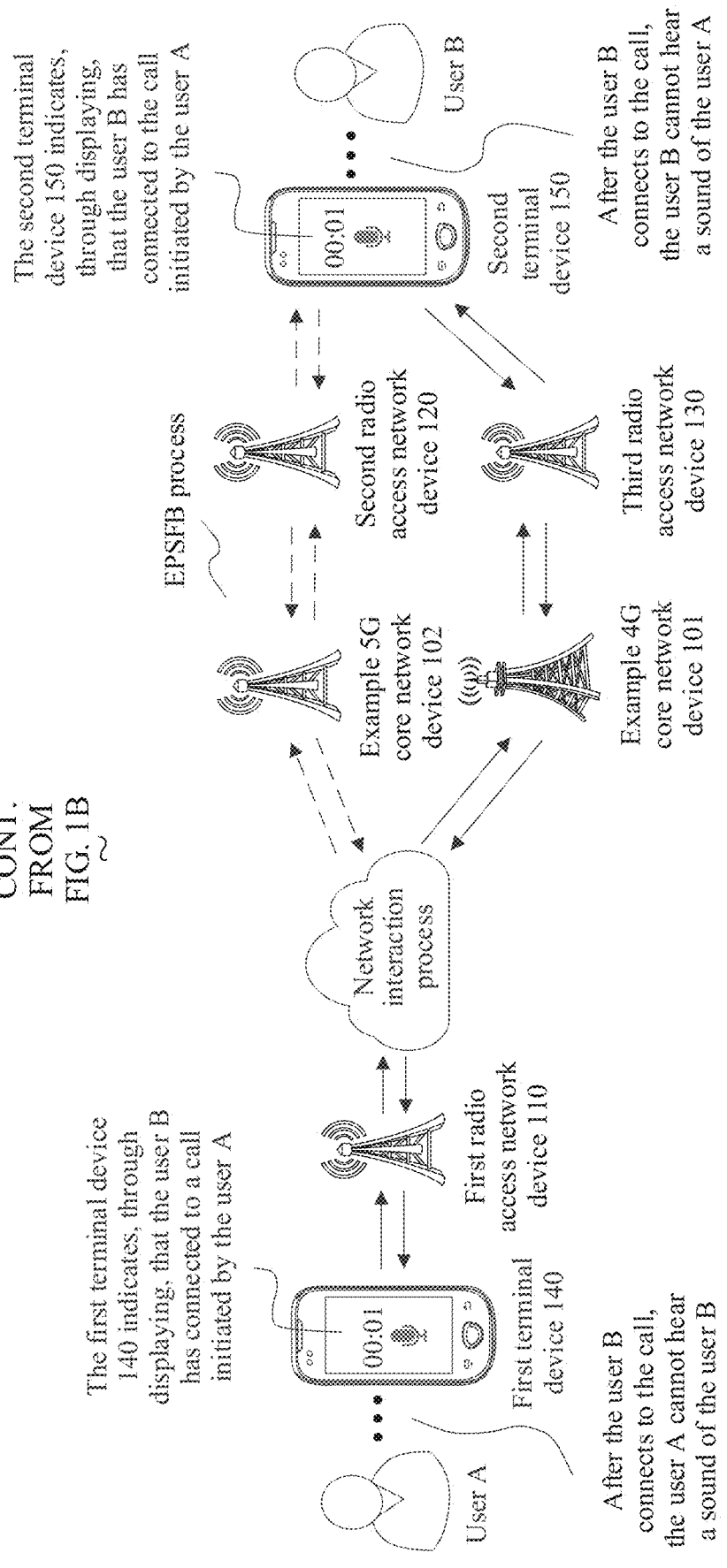

FIG. 1A to FIG. 1C are diagrams showing an example of an application scenario according to an embodiment of this application. FIG. 1A to FIG. 1C show a process of a call between a user A using a first terminal device 140 and a user B using a second terminal device 150. In the process of the call, the second terminal device 150 falls back from a 5G network to a 4G network, resulting in a problem of no sound, a call drop, or a call drop after no sound for the call. A first SIM card is configured on the first terminal device 140, and a second SIM card is configured on the second terminal device 150. The first SIM card is corresponding to a first phone number, and the second SIM card is corresponding to a second phone number. An operator of the first SIM card is different from an operator of the second SIM card. However, in some other cases, the operator of the first SIM card may alternatively be the same as the operator of the second SIM card. An operator of a SIM card is not limited in this embodiment of this application.

For example, the first terminal device 140 is connected to a first radio access network device 110 in a wireless manner. The first radio access network device 110 refers to a base station that the first terminal device 140 accesses under a specific condition, rather than a specific base station. The first radio access network device 110 may be a gNB base station, an eNB base station, or another base station that the first terminal device 140 needs to access under a specific condition. Specifically, when a network in which the second terminal device 150 is located is switched from 5G to 4G, the first radio access network device 110 may not be switched, or may be switched to meet a specific network requirement. To simplify and facilitate understanding, specific information and a switching process of a base station accessed by the first terminal device 140 are not shown in FIG. 1A to FIG. 1C, but are represented by using the first radio access network device 110 as an example.

For example, the second terminal device 150 is connected to a second radio access network device 120 and an example 5G core network device 102 in a wireless manner, or the second terminal device 150 is connected to a third radio access network device 130 and an example 4G core network device 101 in a wireless manner. The first radio access network device 110 interacts with the example 5G core network device 102 or the example 4G core network device 101. Each of the second radio access network device 120 and the third radio access network device 130 may be a gNB base station, an eNB base station, or another base station that the second terminal device 150 needs to access under a specific condition, depending on a situation of a network on which the second terminal device 150 resides. Specifically, when the network on which the second terminal device 150 resides is switched from 5G to 4G, the second terminal device 150 is switched from interacting with the second radio access network device 120 to interacting with the third radio access network device 130. With reference to FIG. 1A to FIG. 1C, a network accessed by the second radio access network device 120 is the 5G network, and a network accessed by the third radio access network device 130 is the 4G network. When the second terminal device 150 is connected to the second radio access network device 120 and the example 5G core network device 102 in a wireless manner, a 5G core network accessed by the second terminal device 150 is a first core network. When the second terminal device 150 is connected to the third radio access network device 130 and the example 4G core network device 101 in a wireless manner, a 4G core network accessed by the second terminal device 150 is a second core network.

To simplify and facilitate understanding, specific information and a switching process of a base station accessed by the second terminal device 150 are not shown in FIG. 1A to FIG. 1C, but are represented by using the second radio access network device 120 and the third radio access network device 130 as an example. To simplify and facilitate understanding, interaction between the first radio access network device 110 and the example 5G core network device 102 or the example 4G core network device 101 is not shown in FIG. 1A to FIG. 1C. The foregoing described signaling transmission interaction process, voice bearer establishment process, and the like are not limited to interaction between a terminal device and a base station device, and interaction between base station devices, but should further include another network device in the mobile communication system, which are not drawn in FIG. 1A to FIG. 1C to simplify and facilitate understanding.

It should be noted that a core network device and a radio access network device may be separate and different physical devices, or functions of a core network device and logical functions of a radio access network device may be integrated on a same physical device, or some functions of a core network device and some functions of a radio access network device may be integrated on one physical device. The terminal device may be fixed, or may be mobile. The first terminal device 140 and the second terminal device 150 may be used as user equipment to interact with the radio access network device and the core network device. The radio access network device includes but is not limited to a 2G radio access network, a 3G radio access network, a 4G radio access network, and a 5G radio access network, and the core network device includes but is not limited to a 2G core network, a 3G core network, a 4G core network, and a 5G core network.

It should be noted that a communication system architecture in FIG. 1A to FIG. 1C is for illustrative purposes only, and the foregoing descriptions do not constitute a limitation on a diagram of an architecture of a call test system in embodiments of this application. The mobile communication system applied in embodiments of this application includes but is not limited to the architecture shown in FIG. 1A to FIG. 1C. A signaling transmission interaction process, a process in which a voice bearer is established, and the like in embodiments of this application are not limited to interaction between the terminal device and the radio access network device, but should further include another network device in the mobile communication system, for example, the core network device, which is not shown in FIG. 2A and FIG. 2B to FIG. 11A and FIG. 11B. Each of the first radio access network device 110, the second radio access network device 120, and the third radio access network device 130 includes but is not limited to a 4G-long term evolution (4G-LTE) base station or a 5G-new radio (5G-NR) base station. Quantities and suppliers of core network devices, radio access network devices, and terminal devices included in the mobile communication system are not limited in the embodiments of this application. The radio access network device may be the first radio access network device 110, the second radio access network device 120, or the third radio access network device 130 in FIG. 1A to FIG. 1C, or may be an apparatus in an access network device. Interaction between the first radio access network device 110, the second radio access network device 120, or the third radio access network device 130 is not limited to interaction between a radio access network device and a core network device that are on a caller side and a radio access network device and a core network device that are on a called side, but is a complete interaction process between a caller side network and a called side network. In FIG. 1A to FIG. 1C, some or all of information exchanged among the terminal device, the core network device, and the access network device may be carried in an existing message, channel, signal, or signaling, or may be a newly defined message, channel, signal, or signaling. This is not specifically limited herein.

In a scenario shown in FIG. 1A to FIG. 1C, the user A uses the first terminal device 140, the user B uses the second terminal device 150, a phone number of the user A is the first phone number, and a phone number of the user B is the second phone number. The first SIM card is corresponding to the first phone number, and the second SIM card is corresponding to the second phone number. As shown in FIG. 1A to FIG. 1C, the user A dials the phone number of the user B by using the first terminal device 140. In this case, both the first terminal device 140 and the second terminal device 150 reside on the 5G network. It should be noted that, in this embodiment of this application, a resident network refers to a network in which the terminal device currently registers based on a SIM card.

In a dialing process, before the second terminal device 150 enters a ringing state or starts to ring, the network on which the second terminal device 150 resides falls back from 5G to 4G. For example, after the first terminal device 140 dials up, the second terminal device 150 falls back to the 4G network because the 5G network on which the second terminal device 150 currently resides supports IMS registration locally but does not support a 5G voice service (Voice-over NR). Alternatively, the second terminal device 150 supports the 5G network, but the user disables a 5G voice call function. After the first terminal device 140 dials up, the network on which the second terminal device 150 resides also falls back from the 5G network to the 4G network. Optionally, when the second terminal device 150 receives on a 5G network that does not support a telephone voice service function, a voice call from the user A, or the user B receives on a 5G network that supports a telephone voice service function by using a second terminal device 150 that does not support a 5G voice call function, a call from the user A, the network of the second terminal device 150 falls back from the 5G network to the 4G network. In this case, the 4G network carries a voice service of the second terminal device 150. After the voice call ends, the second terminal device 150 returns to the 5G network. This process is referred to as an evolved packet system (EPS) fallback (EPS Fallback, EPSFB) process. The evolved packet system fallback process may also be referred to as EPS Fallback, EPSFB, EPSFallback, EPS fallback, EPS backoff, and the like.

With reference to FIG. 1A to FIG. 1C, in a 4G voice call process, to avoid a problem of no sound, a call drop, or a call drop after no sound due to a voice bearer being not established after a call is answered, the terminal device performs a resource reservation negotiation operation with a network in advance in a call establishment process. To be specific, before the user B perceives ringing, the terminal device may complete establishment of the voice bearer and synchronize voice bearer states of the first terminal device 140 and the second terminal device 150 between the first terminal device 140 and the second terminal device 150 through a resource reservation negotiation process. When the voice bearer states of the first terminal device 140 and the second terminal device 150 are ready to enter a state in which a voice packet can be sent or received, the first terminal device 140 sends 180 Ringing signaling to the second terminal device 150, a call state of the second terminal device 150 is updated to a ringing state, and the second terminal device 150 starts to ring.

It should be noted that phrases such as "a voice bearer has been established" and "a voice bearer is established" in this application indicate the meaning of "establishment of a voice bearer is completed". In this application, the ringing state refers to a state in which a user, when there is an incoming call, has not answered the call and a called terminal device rings to remind the user of the incoming call. A ringing tone used when the ringing starts includes vibration, a color ring back tone, beep, or music, a song, recording, or video that is personalized. This is not limited herein. When the called terminal device rings, a caller terminal device may display information such as "The other party is ringing" to inform a caller user that the called terminal device has started to ring.

Because the second terminal device 150 falls back from the 5G network to the 4G network, after the second terminal device 150 receives a call from the first terminal device 140, a time point at which the establishment of the voice bearer is completed is later than establishment of the voice bearer in a normal situation. When establishment of the voice bearer of the first terminal device 140 is completed, the establishment of the voice bearer of the second terminal device 150 is not completed. The second terminal device 150 sends signaling indicating that the establishment of the voice bearer of the second terminal device 150 is not completed to the first terminal device 140, and further sends signaling indicating the first terminal device 140 to play a ringback tone. After the first terminal device 140 receives the signaling indicating the first terminal device 140 to play the ringback tone, the first terminal device 140 starts to play the ringback tone. After sending the signaling indicating the first terminal device 140 to play the ringback tone, the second terminal device 150 starts to ring. After the second terminal device 150 starts to ring, the user B answers a call, and the call between the first terminal device 140 and the second terminal device 150 is connected. If some core network operators do not normally refresh a resource reservation state in a voice bearer establishment process due to a network compatibility problem, there is a problem that a voice bearer of a terminal device is normal, but a state in which a voice packet can be sent or received of a core network on which the terminal device or another terminal device that talks with the terminal device resides is not synchronized, or a synchronization exception occurs. In a normal situation, if a voice bearer of a terminal device of either side fails to be established due to a problem on a terminal side or a network side, the called terminal will not enter the ringing state, avoiding a problem of no sound, a call drop, or a call drop after no sound after a call is answered. However, some abnormal signaling disorder may cause a problem that the voice bearer of the terminal device is established but the network side is still abnormal. As a result, there is a problem of no sound, a call drop, or a call drop after no sound after the call is connected, and user experience is severely affected. For example, in the foregoing scenario, if the network side receives the signaling indicating the first terminal device 140 to play the ringback tone, and then receives the signaling indicating that the establishment of the voice bearer of the second terminal device 150 is not completed, there is a problem of no sound, a call drop, or a call drop after no sound after the call is answered.

Figure 2A:
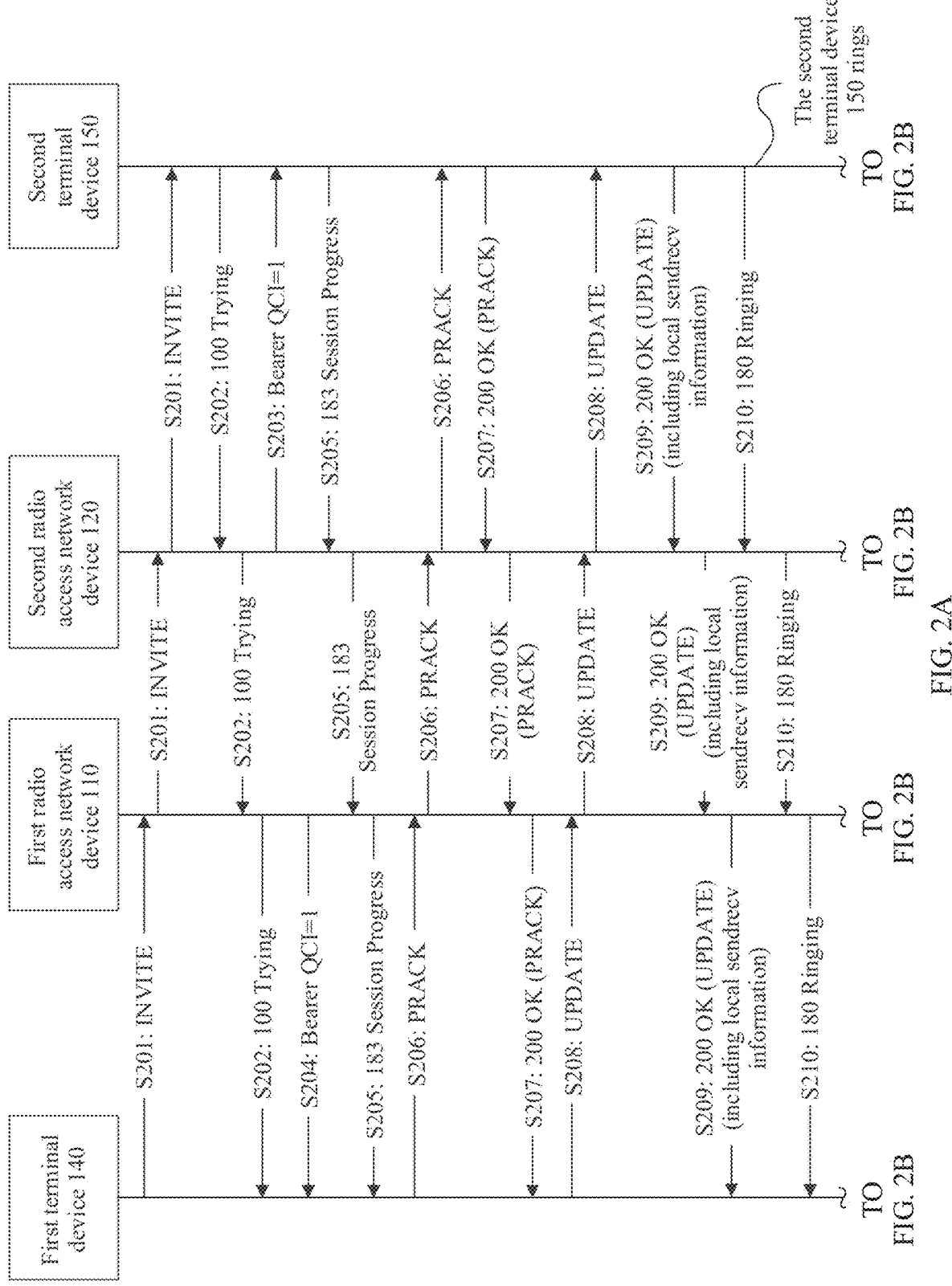
FIG. 2A and FIG. 2B are diagrams of signaling interaction of a voice call in a 5G network in a communication method according to an embodiment of this application.
Figure 2B:
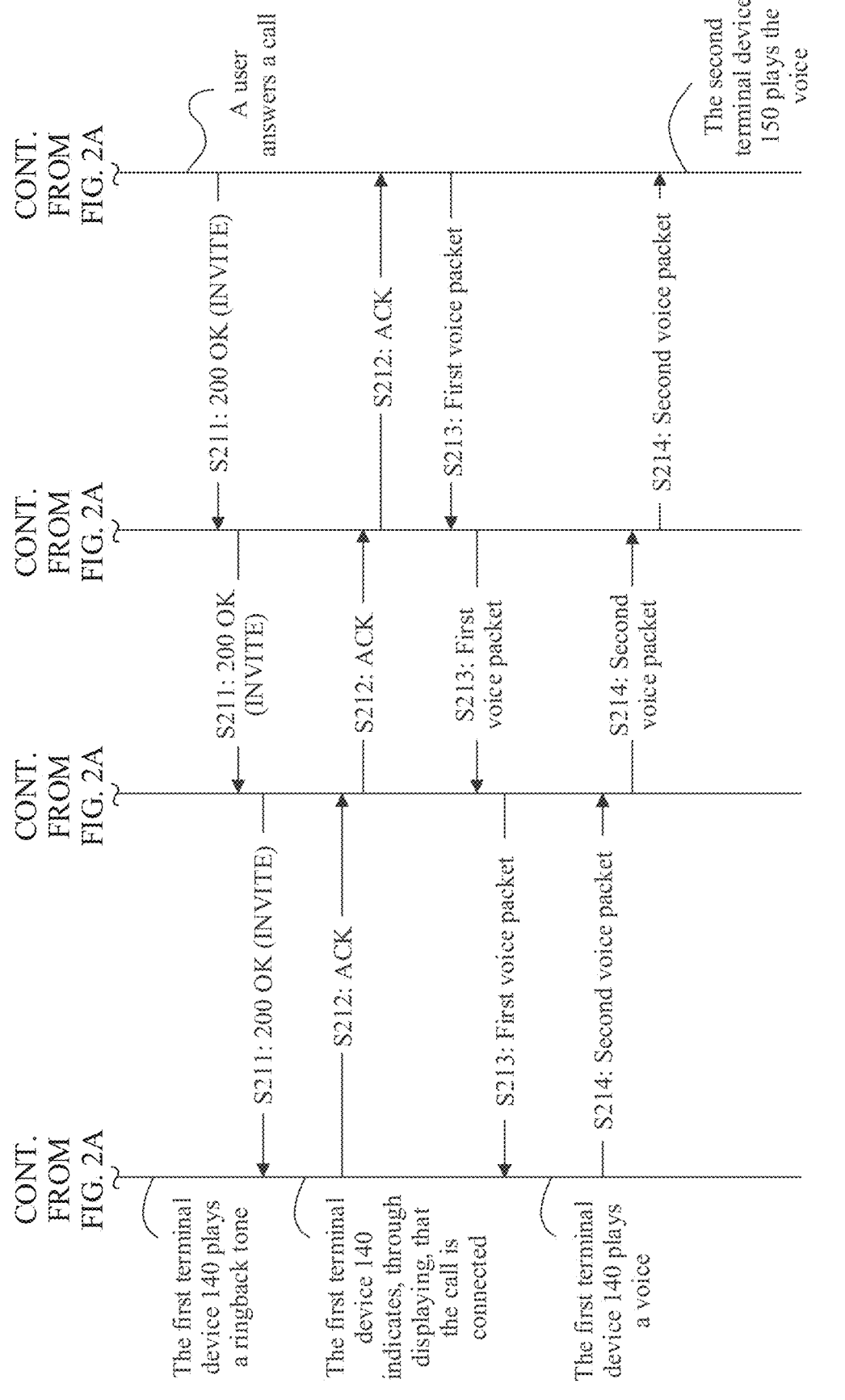

FIG. 2A and FIG. 2B are diagrams of signaling interaction of a voice call in a 5G network according to an embodiment of this application. With reference to FIG. 1A to FIG. 1C, the communication method described in this embodiment of this application is applied to the first terminal device 140, the second terminal device 150, the first radio access network device 110, and the second radio access network device 120 that are shown in FIG. 1A to FIG. 1C and FIG. 2A and FIG. 2B.

Optionally, in some embodiments, in a process in which the first terminal device 140 makes a call to the second terminal device 150, an EPSFB process does not occur. The first terminal device 140 may normally establish a session with the second terminal device 150, and a user may normally answer the call. For example, as shown in FIG. 2A and FIG. 2B, the following steps are included.

Step S201: The first terminal device 140 sends INVITE signaling to the second terminal device 150.

It should be noted that with reference to the scenario shown in FIG. 1A to FIG. 1C, when the user A dials a number of the user B on the first terminal device 140, the first terminal device 140 initiates a call to the second terminal device 150.

Optionally, when the user A dials the number of the user B on the first terminal device 140, the first terminal device 140 sends the INVITE signaling to the second terminal device 150.

Optionally, in response to the user A dials the number of the user B on the first terminal device 140, the first terminal device 140 sends the INVITE signaling to the second terminal device 150.

The INVITE signaling may be first request information, and the INVITE signaling may indicate that the first terminal device 140 initiates a call to the second terminal device 150.

Optionally, the first terminal device 140 may send the INVITE signaling to the first radio access network device 110. After receiving the INVITE signaling, the first radio access network device 110 sends the INVITE signaling received from the first terminal device 140 to the second radio access network device 120. After the second radio access network device 120 receives the INVITE signaling, the second radio access network device 120 sends the INVITE signaling received from the first radio access network device 110 to the second terminal device 150.

An occasion at which a first terminal device sends first request information is not limited in this embodiment of this application. For example, the first terminal device sends the first request information when a caller user initiates a voice call.

Optionally, after receiving the INVITE signaling, the second terminal device 150 may acknowledge, based on information that is included in the INVITE signaling and that the first terminal device 140 supports resource reservation, that the first terminal device 140 supports resource reservation. It should be noted that a support field in the INVITE signaling carries a precondition tag, and the precondition tag indicates that the first terminal device 140 supports resource reservation. After receiving the INVITE signaling, the second terminal device 150 may further determine whether the second terminal device 150 supports resource reservation. After it is acknowledged that the second terminal device 150 supports the resource reservation, the second terminal device 150 may further acknowledge a call state of the second terminal device 150. When a current terminal state CALL_STATE of the second terminal device 150 is an in-call IN_CALL state and a radio access technology (RAT) of a network on which the second terminal device 150 resides is NR, it indicates that the second terminal device 150 is in a process of a call, and the call is received in the 5G network.

Step S202: The second terminal device 150 sends 100 Trying signaling to the first terminal device 140.

The 100 Trying signaling may be first response information, and the 100 Trying signaling may indicate that the second terminal device 150 responds to the INVITE signaling sent by the first terminal device 140 to the second terminal device 150.

Optionally, the second terminal device 150 may send the 100 Trying signaling to the second radio access network device 120. After receiving the 100 Trying signaling, the second radio access network device 120 sends the 100 Trying signaling received from the second terminal device 150 to the first radio access network device 110. After the first radio access network device 110 receives the 100 Trying signaling, the first radio access network device 110 sends the 100 Trying signaling received from the second radio access network device 120 to the first terminal device 140.

Step S203: The second radio access network device 120 delivers a voice dedicated bearer establishment instruction to the second terminal device 150.

The voice dedicated bearer establishment instruction includes QCI=1. The voice dedicated bearer establishment instruction may be represented as an activate dedicated EPS bearer context request. The voice dedicated bearer establishment instruction may be a second voice bearer instruction. The voice dedicated bearer establishment instruction may indicate the second terminal device 150 to establish a second voice bearer, and the second voice bearer indicates that a voice resource of the second terminal device 150 has been reserved. The second voice bearer may be a logical path used to transmit a voice.

Optionally, step S203 is performed after the second radio access network device 120 receives the 100 Trying signaling. After the second radio access network device 120 receives the 100 Trying signaling, the second radio access network device 120 delivers the voice dedicated bearer establishment instruction to the second terminal device 150. After the second radio access network device 120 delivers the voice dedicated bearer establishment instruction to the second terminal device 150, the second radio access network device 120 indicates the second terminal device 150 to establish the second voice bearer.

A specific voice resource reservation state of the second voice bearer is not limited in this embodiment of this application. In this embodiment of this application, that the terminal device establishes the second voice bearer may be understood as that the resource reservation state is a normal state, that is, the terminal device is in a state in which a voice packet can be sent or received. A specific occasion at which the second radio access network device 120 delivers the voice dedicated bearer establishment instruction to the second terminal device 150 is not limited in this embodiment of this application. To be specific, step S203 may occur at another occasion after step S202 in which the second radio access network device 120 receives the 100 Trying signaling. For a specific implementation, refer to a 3GPP standard protocol and another related protocol.

Step S204: The first radio access network device 110 delivers a voice dedicated bearer establishment instruction to the first terminal device 140.

The voice dedicated bearer establishment instruction includes QCI=1. The voice dedicated bearer establishment instruction may be represented as an activate dedicated EPS bearer context request. The voice dedicated bearer establishment instruction may be a first voice bearer instruction. The voice dedicated bearer establishment instruction may indicate the first terminal device 140 to establish a first voice bearer, and the first voice bearer indicates that a voice resource of the first terminal device 140 has been reserved. The first voice bearer may be a logical path used to transmit a voice.

Optionally, step S204 is performed after the first radio access network device 110 receives the 100 Trying signaling. After the first radio access network device 110 receives the 100 Trying signaling, the first radio access network device 110 delivers the voice dedicated bearer establishment instruction to the first terminal device 140. After the first radio access network device 110 delivers the voice dedicated bearer establishment instruction to the first terminal device 140, the first radio access network device 110 indicates the first terminal device 140 to establish the first voice bearer.

A specific voice resource reservation state of the first voice bearer is not limited in this embodiment of this application. In this embodiment of this application, that the terminal device establishes the first voice bearer may be understood as that the resource reservation state is a normal state, that is, the terminal device is in a state in which a voice packet can be sent or received. A specific occasion at which the first radio access network device 110 delivers the voice dedicated bearer establishment instruction to the first terminal device 140 is not limited in this embodiment of this application. To be specific, step S204 may occur at another occasion after step S202 in which the first radio access network device 110 receives the 100 Trying signaling. For a specific implementation, refer to a 3GPP standard protocol and another related protocol.

Step S205: The second terminal device 150 sends 183 Session Progress signaling to the first terminal device 140.

The 183 session progress (Session Progress) signaling may be first session progress information, and the first session progress information includes information about a first handshake in a process of three handshakes (including the first handshake, a second handshake, and a third handshake) between the second terminal device and the first terminal device. The 183 Session Progress signaling may indicate that the second terminal device 150 performs voice coding negotiation with the first terminal device 140.

Optionally, after the second terminal device 150 sends the 100 Trying signaling to the second radio access network device 120, the second terminal device 150 sends the 183 Session Progress signaling to the second radio access network device 120. After the second radio access network device 120 receives the 183 Session Progress signaling, the second radio access network device 120 sends the 183 Session Progress signaling received from the second terminal device 150 to the first radio access network device 110. After the first radio access network device 110 receives the 183 Session Progress signaling, the first radio access network device 110 sends the 183 Session Progress signaling received from the second radio access network device 120 to the first terminal device 140.

Step S206: The first terminal device 140 sends PRACK signaling to the second terminal device 150.

The PRACK signaling may be first acknowledgment information, and the first acknowledgment information includes information about the second handshake in the three handshakes. The PRACK signaling may indicate that the first terminal device 140 acknowledges that the 183 Session Progress signaling sent by the second terminal device 150 has been received.

Optionally, after the first terminal device 140 receives the 183 Session Progress signaling, the first terminal device 140 sends the PRACK signaling to the first radio access network device 110. After the first radio access network device 110 receives the PRACK signaling, the first radio access network device 110 sends the PRACK signaling received from the first terminal device 140 to the second radio access network device 120. After the second radio access network device 120 receives the PRACK signaling, the second radio access network device 120 sends the PRACK signaling received from the first radio access network device 110 to the second terminal device 150.

Step S207: The second terminal device 150 sends 200 OK (PRACK) signaling to the first terminal device 140.

It should be noted that, in this case, the signaling sent is actually 200 OK signaling used to reply to the PRACK signaling. In this embodiment of this application, to facilitate description and distinguish different 200 OK signaling, signaling replied by 200 OK signaling that is used to reply to different signaling is marked in parentheses following the 200 OK signaling, to make a distinction. Here, the 200 OK signaling used to reply to the PRACK signaling is written as the 200 OK (PRACK) signaling. However, a writing method herein is only an example. A specific description of signaling actually sent is subject to a 3GPP standard protocol. For other 200 OK signaling with double brackets in this application, refer to this explanation.

The 200 OK (PRACK) signaling may be first 200 OK signaling. The 200 OK (PRACK) signaling may be first response information, and the first response information includes information about the third handshake in the three handshakes. The 200 OK (PRACK) signaling may indicate that the second terminal device 150 acknowledges that the PRACK signaling sent by the first terminal device 140 has been received.

Optionally, after the second terminal device 150 receives the PRACK signaling, the second terminal device 150 sends the 200 OK (PRACK) signaling to the second radio access network device 120. After the second radio access network device 120 receives the 200 OK (PRACK) signaling, the second radio access network device 120 sends the 200 OK (PRACK) signaling received from the second terminal device 150 to the first radio access network device 110. After the first radio access network device 110 receives the 200 OK (PRACK) signaling, the first radio access network device 110 sends the 200 OK (PRACK) signaling received from the second radio access network device 120 to the first terminal device 140.

Step S208: The first terminal device 140 sends UPDATE signaling to the second terminal device 150.

The UPDATE signaling may be first update information, and the UPDATE signaling may indicate that the first terminal device 140 has established the first voice bearer, that is, establishment of the first voice bearer is completed or the first voice bearer is established.

Optionally, after the first terminal device 140 receives the 200 OK (PRACK) signaling, the first terminal device 140 checks whether the first terminal device 140 has established the first voice bearer, that is, the establishment of the first voice bearer is completed or the first voice bearer is established. After the first terminal device 140 acknowledges that the first terminal device 140 has received the voice dedicated bearer establishment instruction delivered by the first radio access network device 110 in step S203, and completes the establishment of the first voice bearer based on the voice dedicated bearer establishment instruction, the first terminal device 140 sends the UPDATE signaling to the first radio access network device 110, and the UPDATE signaling includes information indicating that the first terminal device 140 has established the first voice bearer. After receiving the UPDATE signaling, the first radio access network device 110 sends the UPDATE signaling to the second radio access network device 120. After receiving the UPDATE signaling, the second radio access network device 120 sends the UPDATE signaling to the second terminal device 150.

After step S208, if the second terminal device 150 has not completed establishment of the second voice bearer, the second terminal device 150 responds to the UPDATE signaling, and returns signaling indicating that the establishment of the second voice bearer is not completed to the first terminal device 140. In some embodiments, information indicating that the establishment of the second voice bearer is not completed is sent to the first terminal device 140 through the 200 OK (UPDATE) signaling. After step S208, if the second terminal device 150 has completed the establishment of the second voice bearer, the 200 OK (UPDATE) signaling may carry the information indicating that the establishment of the second voice bearer is completed.

For example, with reference to FIG. 2A and FIG. 2B, a case in which the second terminal device 150 has completed the establishment of the second voice bearer after step S208 is described.

Step S209: The second terminal device 150 sends 200 OK (UPDATE) signaling to the first terminal device 140.

The 200 OK (UPDATE) signaling may be second 200 OK signaling. The 200 OK (UPDATE) signaling may indicate that the second terminal device 150 acknowledges that the UPDATE signaling sent by the first terminal device 140 has been received.

It should be noted that, in this case, the signaling sent is actually 200 OK signaling used to reply to the UPDATE signaling. In this embodiment of this application, to facilitate description and distinguish different 200 OK signaling, signaling replied by 200 OK signaling that is used to reply to different signaling is marked in parentheses following the 200 OK signaling, to make a distinction. Here, the 200 OK signaling used to reply to the UPDATE signaling is written as the 200 OK (UPDATE) signaling. However, a writing method herein is only an example. A specific description of signaling actually sent is subject to a 3GPP standard protocol. For other 200 OK (UPDATE) signaling in this application, refer to this explanation.

Optionally, after receiving the UPDATE signaling, the second terminal device 150 checks a voice bearer state of the second terminal device 150. Because the second terminal device 150 acknowledges that the second terminal device 150 has received the voice dedicated bearer establishment instruction delivered by the second radio access network device 120, and the establishment of the second voice bearer is completed, the 200 OK (UPDATE) signaling sent by the second terminal device 150 to the second radio access network device 120 includes a=curr:qos local sendrecv information, and the a=curr:qos local sendrecv information is a syntax of an SDP protocol. Optionally, the 200 OK (UPDATE) signaling may indicate that configuration of a voice bearer resource of the second terminal device 150 has been completed or that the establishment of the second voice bearer has been completed. Optionally, the 200 OK (UPDATE) signaling may indicate that the second terminal device 150 is in a state in which a voice packet can be sent or received. After receiving the 200 OK (UPDATE) signaling that includes the a=curr:qos local sendrecv information and that is from the second terminal device 150, the second radio access network device 120 sends the 200 OK (UPDATE) signaling to the first radio access network device 110. Based on a fact that the 200 OK (UPDATE) signaling that includes the a=curr:qos local sendrecv information is received by the first radio access network device 110, the first radio access network device 110 determines that a current called terminal device, that is, the second terminal device 150, is in a state in which a voice packet can be sent or received. The first radio access network device 110 is in a connected state, that is, a state in which a voice packet can be normally forwarded. After receiving the 200 OK (UPDATE) signaling that includes the a=curr:qos local sendrecv information, the first radio access network device 110 sends the 200 OK (UPDATE) signaling to the first terminal device 140.

Step S210: The second terminal device 150 sends 180 Ringing signaling to the first terminal device 140.

The 180 Ringing signaling may be first ring information, and the 180 Ringing signaling may indicate that the second terminal device 150 has established the second voice bearer and is ready to make a call.

Optionally, after the second terminal device 150 sends the 180 Ringing signaling, a call state of the second terminal device 150 is updated to a ringing state, and the second terminal device 150 starts to ring. The ringing state refers to a state in which a user, when there is an incoming call, has not answered the call and a called terminal device rings to remind the user of the incoming call. A ringing tone used when the ringing starts includes vibration, a color ring back tone, beep, or music, a song, recording, or video that is personalized. This is not limited herein. After the second radio access network device 120 receives the 180 Ringing signaling, the second radio access network device 120 sends the 180 Ringing signaling to the first radio access network device 110. After the first radio access network device 110 receives the 180 Ringing signaling, the first radio access network device 110 determines that a current called terminal, that is, the second terminal device 150, is in a state in which a voice packet can be sent or received, and the first radio access network device 110 is in a connected state, that is, a state in which a voice packet can be normally forwarded, and sends the 180 Ringing signaling to the first terminal device 140. After the first terminal device 140 receives the 180 Ringing signaling, a call state of the first terminal device 140 is updated to a ringback tone state, and the first terminal device 140 starts to play a ringback tone. The ringback tone state refers to a state in which a called user does not answer a call when the call succeeds and a caller terminal device sends a ringback tone to remind a user that the called user has not answered the call. The ringback tone includes vibration, a color ring back tone, beep, or music, a song, recording, or video that is personalized. This is not limited herein.

Step S211: The second terminal device 150 sends 200 OK (INVITE) signaling to the first terminal device 140.

It should be noted that with reference to the scenario shown in FIG. 1A to FIG. 1C, after the second terminal device 150 starts to ring, the user B answers a call on the second terminal device 150.

Optionally, when the user B answers the call on the second terminal device 150, the second terminal device 150 sends the 200 OK (INVITE) signaling to the first terminal device 140.

Optionally, in response to the user B answers the call on the second terminal device 150, the second terminal device 150 sends the 200 OK (INVITE) signaling to the first terminal device 140.

The 200 OK (INVITE) signaling may be third 200 OK signaling, and the 200 OK (INVITE) signaling may indicate that the second terminal device 150 responds to the first terminal device 140 that the second terminal device 150 has been prepared to send and receive a voice packet.

Optionally, after the second terminal device 150 starts to ring, the user B answers the call, and the second terminal device 150 sends the 200 OK (INVITE) signaling to the second radio access network device 120. The second radio access network device 120 sends the 200 OK (INVITE) signaling received from the second terminal device 150 to the first radio access network device 110. After the first radio access network device 110 receives the 200 OK (INVITE) signaling, the first radio access network device 110 sends the 200 OK (INVITE) signaling received from the second radio access network device 120 to the first terminal device 140. After the first terminal device 140 receives the 200 OK (INVITE) signaling, the first terminal device 140 indicates, through displaying, that the call is connected. Specifically, the first terminal device 140 may display, to a user, a user prompt such as "in a phone call", "in a call", "call in progress", "connected", or the like. Generally, additional call duration prompt may be displayed, such as "00:01", "00:02", "00:03", or the like.

It should be noted that an occasion at which the first terminal device 140 indicates, through displaying, that the call is connected may be after step S211 in which the first terminal device 140 receives the 200 OK (INVITE) signaling and before step S212 in which the first terminal device 140 sends ACK signaling to the second terminal device 150; or after step S212 in which the first terminal device 140 sends ACK signaling to the second terminal device 150. The occasion is not limited in this embodiment of this application.

Step S212: The first terminal device 140 sends ACK signaling to the second terminal device 150.

The ACK signaling may be second acknowledgment information, and the ACK signaling may indicate that the first terminal device 140 acknowledges to the second terminal device 150 that the first terminal device 140 has received the 200 OK (INVITE) signaling sent by the second terminal device 150 to the first terminal device 140.

Optionally, after the first terminal device 140 receives the 200 OK (INVITE) signaling, the first terminal device 140 sends the ACK signaling to the first radio access network device 110. The first radio access network device 110 sends the ACK signaling received from the first terminal device 140 to the second radio access network device 120. After the second radio access network device 120 receives the ACK signaling, the second radio access network device 120 sends the received ACK signaling to the second terminal device 150.

Step S213: The second terminal device 150 sends a first voice packet to the first terminal device 140.

The first voice packet may include an IMS RTP SN and Payload. The first voice packet may include voice data.

Optionally, after the second terminal device sends the 200 OK (INVITE) signaling, the second terminal device 150 sends the first voice packet to the second radio access network device 120. The second radio access network device 120 sends the first voice packet received from the second terminal device 150 to the first radio access network device 110. After receiving the first voice packet, the first radio access network device 110 sends the first voice packet to the first terminal device 140. After receiving the first voice packet, the first terminal device 140 plays a voice.

It should be noted that an occasion at which the second terminal device 150 sends the first voice packet to the first radio access network device 110 is not limited in this embodiment of this application. For example, after the second terminal device sends the 200 OK (INVITE) signaling, the second terminal device 150 sends the first voice packet to the first radio access network device 110. Alternatively, after the second terminal device receives the ACK signaling, the second terminal device 150 sends the first voice packet to the first radio access network device 110.

Step S214: The first terminal device 140 sends a second voice packet to the second terminal device 150.

The second voice packet may include an IMS RTP SN and Payload. The second voice packet may include voice data.

Optionally, after the first terminal device 140 sends the ACK signaling, or after the first terminal device 140 receives the 200 OK (INVITE) signaling, the first terminal device 140 sends the second voice packet to the first radio access network device 110. After receiving the second voice packet, the first radio access network device 110 sends the second voice packet to the second radio access network device 120. After receiving the second voice packet, the second radio access network device 120 sends the second voice packet to the second terminal device 150. After receiving the second voice packet, the second terminal device 150 plays the voice.

It should be noted that an occasion at which the first terminal device 140 sends the second voice packet to the first radio access network device 110 is not limited in this embodiment of this application. Step S214 and step S215 have no mutual triggering relationship and sequence, and the sequence of the two may be interchanged. In a call process, voice packets exchanged between a caller terminal device and a called terminal device are not limited to the first voice packet and the second voice packet. Details are not described in this embodiment of this application, and only the first voice packet and the second voice packet are used as examples to indicate an exchange process of user voice packets between the caller terminal device and the called terminal device in the call process.

Therefore, in a possible normal 5G call scenario, a user can normally make a voice call.

Figure 3A:
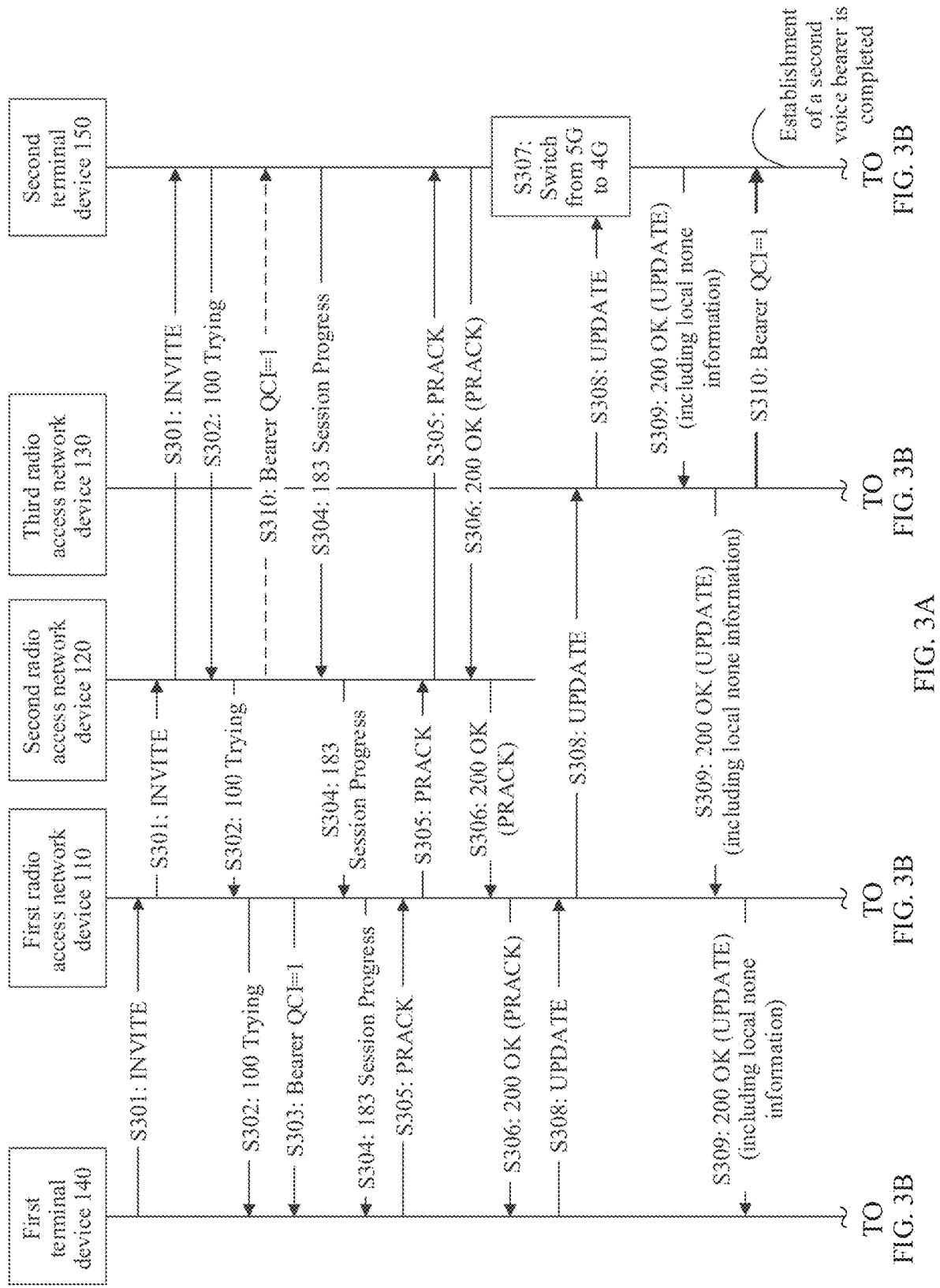
FIG. 3A and FIG. 3B are diagrams of signaling interaction of another voice call in an EPSFB scenario in a communication method according to an embodiment of this application.
Figure 3B:
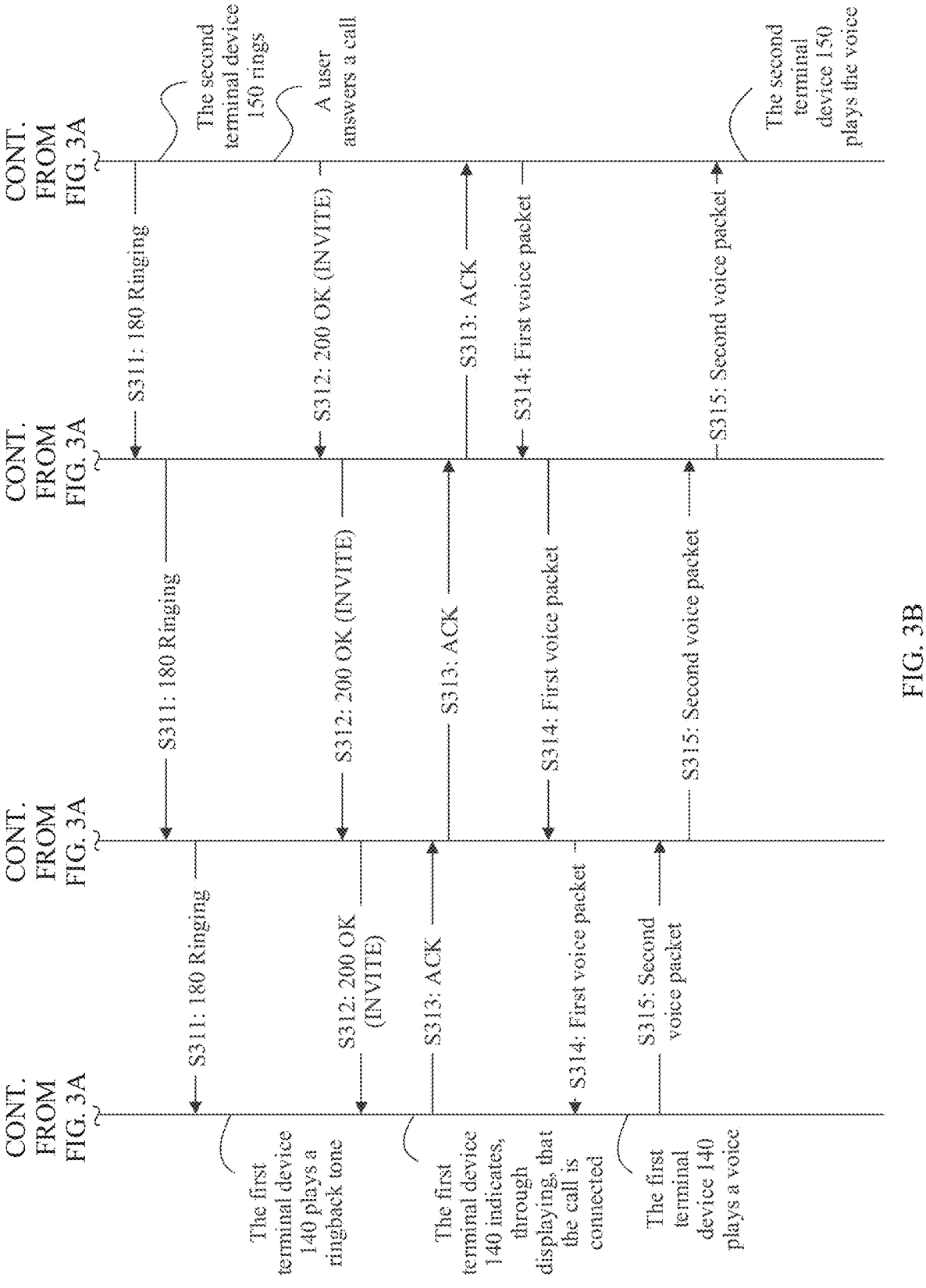

FIG. 3A and FIG. 3B are diagrams of signaling interaction of a voice call in an EPSFB scenario according to an embodiment of this application. With reference to FIG. 1A to FIG. 1C, the communication method described in this embodiment of this application is applied to the first terminal device 140, the second terminal device 150, the first radio access network device 110, the second radio access network device 120, and a third radio access network device 130 that are shown in FIG. 1A to FIG. 1C and FIG. 3A and FIG. 3B. For example, refer to FIG. 1A to FIG. 1C. The first terminal device 140 and the second terminal device 150 are connected to the first radio access network device 110 and the second radio access network device 120 or the third radio access network device 130 in a wireless manner. Each of the first radio access network device 110, the second radio access network device 120, or the third radio access network device 130 is connected to a network device such as a core network device corresponding to the first radio access network device 110, the second radio access network device 120, or the third radio access network device 130 in a wireless or wired manner, which is not shown in the figure.

Optionally, in some embodiments, in a process in which the first terminal device 140 makes a call to the second terminal device 150, signaling interaction is not disordered even if an EPSFB process occurs. The first terminal device 140 may normally establish a session with the second terminal device 150, and a user may normally answer the call. For example, as shown in FIG. 3A and FIG. 3B, the following steps are included.

Step S301: The first terminal device 140 sends INVITE signaling to the second terminal device 150.

It should be noted that with reference to the scenario shown in FIG. 1A to FIG. 1C, when the user A dials a number of the user B on the first terminal device 140, the first terminal device 140 initiates a call to the second terminal device 150.

Optionally, when the user A dials the number of the user B on the first terminal device 140, the first terminal device 140 sends the INVITE signaling to the second terminal device 150.

Optionally, in response to the user A dials the number of the user B on the first terminal device 140, the first terminal device 140 sends the INVITE signaling to the second terminal device 150.

The INVITE signaling may be first request information, and the INVITE signaling may indicate that the first terminal device 140 initiates a call to the second terminal device 150.

The INVITE signaling may be first INVITE signaling, and the INVITE signaling may be signaling that includes an invite.

Optionally, the first terminal device 140 may send the INVITE signaling to the first radio access network device 110. After receiving the INVITE signaling, the first radio access network device 110 sends the INVITE signaling received from the first terminal device 140 to the second radio access network device 120. After the second radio access network device 120 receives the INVITE signaling, the second radio access network device 120 sends the INVITE signaling received from the first radio access network device 110 to the second terminal device 150.

An occasion at which a first terminal device sends first request information is not limited in this embodiment of this application. For example, the first terminal device sends the first request information when a caller user initiates a voice call.

Optionally, after receiving the INVITE signaling, the second terminal device 150 may acknowledge, based on information that is included in the INVITE signaling and that the first terminal device 140 supports resource reservation, that the first terminal device 140 supports resource reservation. It should be noted that a support field in the INVITE signaling carries a precondition tag, and the precondition tag indicates that the first terminal device 140 supports resource reservation. After receiving the INVITE signaling, the second terminal device 150 may further determine whether the second terminal device 150 supports resource reservation. After it is acknowledged that the second terminal device 150 supports the resource reservation, the second terminal device 150 may further acknowledge a call state of the second terminal device 150. When a current terminal state CALL_STATE of the second terminal device 150 is an in-call IN_CALL state and a radio access technology (RAT) of a network on which the second terminal device 150 resides is NR, it indicates that the second terminal device 150 is in a process of a call, and the call is received in the 5G network.

Step S302: The second terminal device 150 sends 100 Trying signaling to the first terminal device 140.

The 100 Trying signaling may be first response information, and the 100 Trying signaling may indicate that the second terminal device 150 responds to the INVITE signaling sent by the first terminal device 140 to the second terminal device 150.

Optionally, the second terminal device 150 may send the 100 Trying signaling to the second radio access network device 120. After receiving the 100 Trying signaling, the second radio access network device 120 sends the 100 Trying signaling received from the second terminal device 150 to the first radio access network device 110. After the first radio access network device 110 receives the 100 Trying signaling, the first radio access network device 110 sends the 100 Trying signaling received from the second radio access network device 120 to the first terminal device 140.

Step S303: The first radio access network device 110 delivers a voice dedicated bearer establishment instruction to the first terminal device 140.

The voice dedicated bearer establishment instruction includes QCI=1 information. The voice dedicated bearer establishment instruction may be represented as an activate dedicated EPS bearer context request. The voice dedicated bearer establishment instruction may be a first voice bearer instruction. The voice dedicated bearer establishment instruction may indicate the first terminal device 140 to establish a first voice bearer, and the first voice bearer indicates that a voice resource of the first terminal device 140 has been reserved. The first voice bearer may be a logical path used to transmit a voice.

Optionally, step S204 is performed after the first radio access network device 110 receives the 100 Trying signaling. After the first radio access network device 110 receives the 100 Trying signaling, the first radio access network device 110 delivers the voice dedicated bearer establishment instruction to the first terminal device 140. After the first radio access network device 110 delivers the voice dedicated bearer establishment instruction to the first terminal device 140, the first radio access network device 110 indicates the first terminal device 140 to establish the first voice bearer.

A specific voice resource reservation state of the first voice bearer is not limited in this embodiment of this application. In this embodiment of this application, that the terminal device establishes the first voice bearer may be understood as that the resource reservation state is a normal state, that is, the terminal device is in a state in which the terminal device can perform subsequent sending and receiving of a voice packet. A specific occasion at which the first radio access network device 110 delivers the voice dedicated bearer establishment instruction to the first terminal device 140 is not limited in this embodiment of this application. To be specific, step S204 may occur at another occasion after step S202 in which the first radio access network device 110 receives the 100 Trying signaling. For a specific implementation, refer to a 3GPP standard protocol and another related protocol.

Step S304: The second terminal device 150 sends 183 Session Progress signaling to the first terminal device 140.

The 183 session progress (Session Progress) signaling may be first session progress information, and the first session progress information includes information about a first handshake in a process of three handshakes (including the first handshake, a second handshake, and a third handshake) between the second terminal device and the first terminal device. The 183 Session Progress signaling may indicate that the second terminal device 150 performs voice coding negotiation with the first terminal device 140.

Optionally, after the second terminal device 150 sends the 100 Trying signaling to the second radio access network device 120, the second terminal device 150 sends the 183 Session Progress signaling to the second radio access network device 120. After the second radio access network device 120 receives the 183 Session Progress signaling, the second radio access network device 120 sends the 183 Session Progress signaling received from the second terminal device 150 to the first radio access network device 110. After the first radio access network device 110 receives the 183 Session Progress signaling, the first radio access network device 110 sends the 183 Session Progress signaling received from the second radio access network device 120 to the first terminal device 140.

Step S305: The first terminal device 140 sends PRACK signaling to the second terminal device 150.

The PRACK signaling may be first acknowledgment information, and the first acknowledgment information includes information about the second handshake in the three handshakes. The PRACK signaling may indicate that the first terminal device 140 acknowledges that the 183 Session Progress signaling sent by the second terminal device 150 has been received.

Optionally, after the first terminal device 140 receives the 183 Session Progress signaling, the first terminal device 140 sends the PRACK signaling to the first radio access network device 110. After the first radio access network device 110 receives the PRACK signaling, the first radio access network device 110 sends the PRACK signaling received from the first terminal device 140 to the second radio access network device 120. After the second radio access network device 120 receives the PRACK signaling, the second radio access network device 120 sends the PRACK signaling received from the first radio access network device 110 to the second terminal device 150.

Step S306: The second terminal device 150 sends 200 OK (PRACK) signaling to the first terminal device 140.

It should be noted that, in this case, the signaling sent is actually 200 OK signaling used to reply to the PRACK signaling. In this embodiment of this application, to facilitate description and distinguish different 200 OK signaling, signaling replied by 200 OK signaling that is used to reply to different signaling is marked in parentheses following the 200 OK signaling, to make a distinction. Here, the 200 OK signaling used to reply to the PRACK signaling is written as the 200 OK (PRACK) signaling. However, a writing method herein is only an example. A specific description of signaling actually sent is subject to a 3GPP standard protocol. For other 200 OK (PRACK) signaling in this application, refer to this explanation.

The 200 OK (PRACK) signaling may be first 200 OK signaling. The 200 OK (PRACK) signaling may be first response information, and the first response information includes information about the third handshake in the three handshakes. The 200 OK (PRACK) signaling may indicate that the second terminal device 150 acknowledges that the PRACK signaling sent by the first terminal device 140 has been received.

Optionally, after the second terminal device 150 receives the PRACK signaling, the second terminal device 150 sends the 200 OK (PRACK) signaling to the second radio access network device 120. After the second radio access network device 120 receives the 200 OK (PRACK) signaling, the second radio access network device 120 sends the 200 OK (PRACK) signaling received from the second terminal device 150 to the first radio access network device 110. After the first radio access network device 110 receives the 200 OK (PRACK) signaling, the first radio access network device 110 sends the 200 OK (PRACK) signaling received from the second radio access network device 120 to the first terminal device 140.

Step S307: The second terminal device 150 switches from a 5G voice call to a 4G voice call.

Optionally, configuration of a network standard of the second terminal device 150 is changed from a first network standard to a second network standard, where the first network standard is 4G, and the second network standard is 5G.

Optionally, as shown in FIG. 3A and FIG. 3B, a process in which the second radio access network device 120 indicates the second terminal device 150 to switch to the 4G voice call is described. It should be noted that the process in which the second radio access network device 120 indicates the second terminal device 150 to switch to the 4G voice call may be implemented in a plurality of manners. The following steps show only one of the switching manner. Other implementations further include directly delivering a switching instruction without delivering a measurement instruction, implementing switching by delivering a mobilityFromNRCommand signaling switching instruction. This name is merely an example, and is specifically subject to a related protocol.

Figure 4:
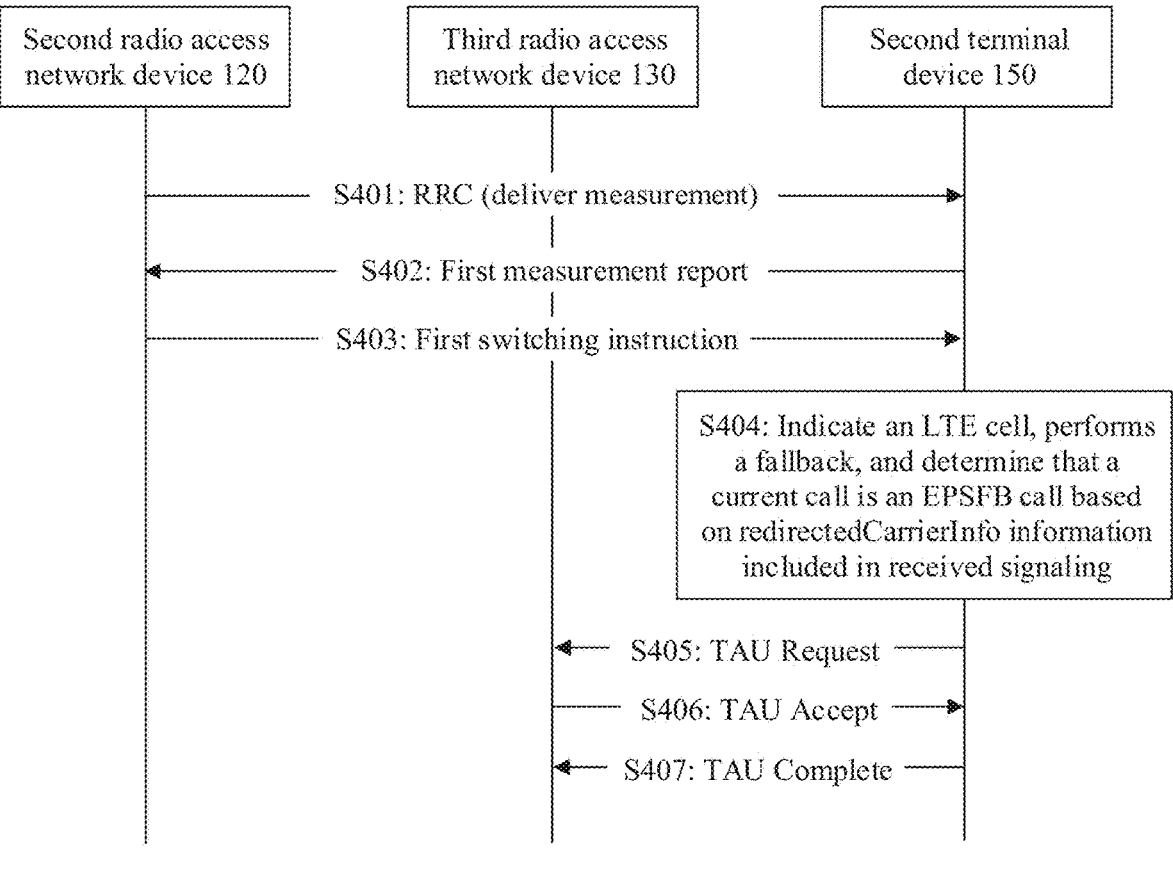
FIG. 4 is a schematic flowchart in which a terminal device switches from a 5G voice call to a 4G voice call in a communication method according to an embodiment of this application.

FIG. 4 is a schematic flowchart in which a second terminal device 150 switches from a 5G voice call to a 4G voice call.

Step S401: The second radio access network device 120 delivers RRC signaling to the second terminal device 150.

The RRC signaling may be represented as RRC Connection Reconfiguration. In this embodiment of this application, for ease of description, RRC signaling used to deliver measurement in this scenario is written as the RRC signaling, and a specific writing method of the signaling is subject to a related protocol. The RRC signaling may carry one measurement instruction delivered by the second radio access network device 120 to the second terminal device 150. Based on the measurement instruction, the second terminal device 150 measures a 4G LTE signal status, and is instructed to report an LTE measurement threshold. When a cell is found to meet a requirement of the threshold, the second terminal device 150 reports a measurement report.

It should be noted that the cell is described by a higher layer from a perspective of resource management, mobility management, or a service unit. Coverage of each network device may be divided into one or more cells. The cell may be an area within coverage of a wireless network of a network device. For example, a cell within NR network coverage is referred to as an NR cell, and a cell within LTE network coverage is referred to as an LTE cell. Signal quality strength of the cell may be represented by reference signal received power (RSRP) and reference signal received quality (RSRQ).

Step S402: The second terminal device 150 reports a first measurement report to the second radio access network device 120.

Optionally, after receiving the RRC signaling, the second terminal device 150 measures a network condition in which the second terminal device 150 is located based on the RRC signaling, and reports the first measurement report to the second radio access network device 120. A first measurement result refers to a measurement result of a network status of the terminal device.

Step S403: The second radio access network device 120 delivers a first switching instruction to the second terminal device 150.

Optionally, after the second radio access network device 120 receives the first measurement report and delivers the first switching instruction to the second terminal device 150, the second radio access network device 120 indicates the second terminal device 150 to hand over from 5G to 4G. After the second terminal device 150 receives the first switching instruction delivered by the second radio access network device 120, the second terminal device 150 returns response information, which is specifically subject to a related protocol. Details are not described herein again.

Optionally, after step S403, configuration of a network standard of the second terminal device 150 is changed from a first network standard to a second network standard, where the first network standard is 4G, and the second network standard is 5G.

It should be noted that in some embodiments, the second radio access network device 120 and the second terminal device 150 do not perform step S401 and step S402, and directly perform step S403.

Step S404: The second terminal device 150 falls back to an LTE cell that meets the requirement of the threshold based on redirectedCarrierInfo information included in the received signaling and based on the instruction of the second radio access network device 120, and determines that a current call is an EPSFB call.

Step S405: The second terminal device 150 reports TAU Request signaling to the third radio access network device 130.

The TAU Request signaling may be second request information, and the TAU Request signaling indicates that the second terminal device 150 requests the third radio access network device 130 to start to reside on the network, and updates a tracking area, to complete a function of accessing a 4G network.

Step S406: The third radio access network device 130 delivers TAU Accept signaling to the second terminal device 150.

The TAU Accept signaling may be sixth response information, and the TAU Accept signaling indicates that the third radio access network device 130 responds to the TAU Request signaling reported by the second terminal device 150.

Step S407: The second terminal device 150 reports TAU Complete signaling to the third radio access network device 130.

The TAU Complete signaling may be sixth acknowledgment information, and the TAU Complete signaling indicates that the second terminal device 150 acknowledges that the TAU Accept signaling delivered by the third radio access network device 130 is received.

As described above, refer to FIG. 3A and FIG. 3B. Step S401 to step S407 describe a specific process of step S307 that is in FIG. 3A and FIG. 3B and in which the second radio access network device 120 indicates the second terminal device 150 to hand over to the 4G voice call.

Step S308: The first terminal device 140 sends UPDATE signaling to the second terminal device 150.

The UPDATE signaling may be first update information, and the UPDATE signaling may indicate that the first terminal device 140 has established the first voice bearer, that is, establishment of the first voice bearer is completed or the first voice bearer is established.

Optionally, after the first terminal device 140 receives the 200 OK (PRACK) signaling, the first terminal device 140 checks whether the first terminal device 140 has established the first voice bearer, that is, the establishment of the first voice bearer is completed or the first voice bearer is established. After the first terminal device 140 acknowledges that the first terminal device 140 has received the voice dedicated bearer establishment instruction delivered by the first radio access network device 110 in step S303, and completes the establishment of the first voice bearer based on the voice dedicated bearer establishment instruction, the first terminal device 140 sends the UPDATE signaling to the first radio access network device 110, and the UPDATE signaling includes information indicating that the first terminal device 140 has established the first voice bearer. After receiving the UPDATE signaling, the first radio access network device 110 sends the UPDATE signaling to the third radio access network device 130. After receiving the UPDATE signaling, the third radio access network device 130 sends the UPDATE signaling to the second terminal device 150.

After step S308, if establishment of a second voice bearer of the second terminal device 150 is not completed, the second terminal device 150 responds to the UPDATE signaling, and returns signaling indicating that the establishment of the second voice bearer is not completed to the first terminal device 140. In some embodiments, the signaling indicating that the establishment of the second voice bearer is not completed is sent to the first terminal device 140 through the 200 OK (UPDATE) signaling. After step S308, if the second terminal device 150 has completed the establishment of the second voice bearer, the 200 OK (UPDATE) signaling may carry the signaling indicating that the establishment of the second voice bearer is completed.

For example, with reference to FIG. 3A and FIG. 3B, steps after step S308 are described when the establishment of the second voice bearer of the second terminal device 150 is not completed.

Step S309: The second terminal device 150 sends 200 OK (UPDATE) signaling to the first terminal device 140.

The 200 OK (UPDATE) signaling may indicate that the second terminal device 150 acknowledges that the UPDATE signaling sent by the first terminal device 140 has been received. The 200 OK (UPDATE) signaling may be fifth signaling, or the 200 OK (UPDATE) signaling may be seventh signaling.

It should be noted that, in this case, the signaling sent is actually 200 OK signaling used to reply to the UPDATE signaling. In this embodiment of this application, to facilitate description and distinguish different 200 OK signaling, signaling replied by 200 OK signaling that is used to reply to different signaling is marked in parentheses following the 200 OK signaling, to make a distinction. Here, the 200 OK signaling used to reply to the UPDATE signaling is written as the 200 OK (UPDATE) signaling. However, a writing method herein is only an example. A specific description of signaling actually sent is subject to a 3GPP standard protocol.

Optionally, after receiving the UPDATE signaling, the second terminal device 150 checks a voice bearer state of the second terminal device 150. When the second terminal device 150 acknowledges that the second terminal device 150 has not received a voice dedicated bearer establishment instruction delivered by the third radio access network device 130, that is, when the establishment of the second voice bearer is not completed, the 200 OK (UPDATE) signaling sent by the second terminal device 150 to the third radio access network device 130 includes a=curr:qos local none information. The a=curr:qos local none information is a syntax of an SDP protocol. The 200 OK (UPDATE) signaling may indicate information that the establishment of the second voice bearer of the second terminal device 150 is not completed. After receiving the 200 OK (UPDATE) signaling that includes the a=curr:qos local none information and that is from the second terminal device 150, the third radio access network device 130 sends the 200 OK (UPDATE) signaling that includes the a=curr:qos local none information to the first radio access network device 110. Based on a fact that the 200 OK (UPDATE) signaling that includes the a=curr:qos local none information is received by the first radio access network device 110, the first radio access network device 110 determines that a current called terminal device, that is, the second terminal device 150, is not in a state in which a voice packet can be sent or received, and the first radio access network device 110 is in a non-connected state, that is, a state in which a voice packet cannot be normally forwarded. After receiving the 200 OK (UPDATE) signaling, the first radio access network device 110 sends the 200 OK (UPDATE) to the first terminal device 140.

Step S310: The third radio access network device 130 delivers a voice dedicated bearer establishment instruction to the second terminal device 150.

The voice dedicated bearer establishment instruction may be second signaling, the voice dedicated bearer establishment instruction may be fourth signaling, or the voice dedicated bearer establishment instruction may be sixth signaling. The voice dedicated bearer establishment instruction may carry QCI=1 information. The voice dedicated bearer establishment instruction may be indicated as an activate dedicated EPS bearer context request. The voice dedicated bearer establishment instruction may be a second voice bearer instruction. The voice dedicated bearer establishment instruction may indicate that the third radio access network device 130 indicates the second terminal device 150 to establish a second voice bearer, and the second voice bearer may indicate a voice resource reservation state of the second terminal device 150. The voice dedicated bearer establishment instruction may be represented as second signaling, and the second signaling includes QCI=1.

Optionally, in this embodiment of this application, step S310 is performed after step S307 in which the second terminal device 150 has been switched to a 4G voice scheme. After the third radio access network device 130 delivers the voice dedicated bearer establishment instruction to the second terminal device 150, the third radio access network device 130 indicates the second terminal device 150 to establish the second voice bearer. A specific voice resource reservation state of the second voice bearer is not limited in this embodiment of this application. In this embodiment of this application, that the terminal device establishes the second voice bearer may be understood as that the resource reservation state is a normal state, that is, the terminal device is in a state in which the terminal device can perform subsequent sending and receiving of a voice packet.

It should be noted that with reference to FIG. 2A and FIG. 2B, if an EPSFB does not occur, in some implementations, the second radio access network device 120 may deliver the voice dedicated bearer establishment instruction to the second terminal device 150 after step S302 in which the second radio access network device 120 receives the 100 Trying signaling. Because the EPSFB occurs, with reference to FIG. 3A and FIG. 3B, the third radio access network device 130 delivers the voice dedicated bearer establishment instruction only after the second radio access network device 120 delivers the switching instruction and a network on which the second terminal device 150 resides is switched to 4G. As a result, in a call process, a time point at which the second terminal device 150 completes the establishment of the second voice bearer is delayed due to an EPSFB process.

Optionally, in some implementations, the third radio access network device 130 does not deliver the voice dedicated bearer establishment instruction immediately after the second radio access network device 120 delivers the switching instruction and the network on which the second terminal device 150 resides is switched to 4G. In other words, a time point at which the second terminal device 150 receives the voice dedicated bearer establishment instruction may be earlier than a time point at which the second terminal device 150 receives the UPDATE signaling, or may be later than a time point at which the second terminal device 150 receives the UPDATE signaling. A specific occasion at which the third radio access network device 130 delivers the voice dedicated bearer establishment instruction is not limited in this embodiment of this application. For a specific implementation, refer to a 3GPP standard protocol.

Step S311: The second terminal device 150 sends 180 Ringing signaling to the first terminal device 140.

The 180 Ringing signaling may be first ring information, and the 180 Ringing signaling may indicate that the second terminal device 150 has established the second voice bearer and is ready to make a call.

Optionally, after the second terminal device 150 sends the 180 Ringing signaling, a call state of the second terminal device 150 is updated to a ringing state, and the second terminal device 150 starts to ring. The ringing state refers to a state in which a user, when there is an incoming call, has not answered the call and a called terminal device rings to remind the user of the incoming call. A ringing tone used when the ringing starts includes vibration, a color ring back tone, beep, or music, a song, recording, or video that is personalized. This is not limited herein. After the third radio access network device 130 receives the 180 Ringing signaling, the third radio access network device 130 sends the 180 Ringing signaling to the first radio access network device 110. After the first radio access network device 110 receives the 180 Ringing signaling, the first radio access network device 110 determines that a current called terminal, that is, the second terminal device 150, is in a state in which a voice packet can be sent or received, and the first radio access network device 110 is in a connected state, that is, a state in which a voice packet can be normally forwarded, and sends the 180 Ringing signaling to the first terminal device 140. After the first terminal device 140 receives the 180 Ringing signaling, a call state of the first terminal device 140 is updated to a ringback tone state, and the first terminal device 140 starts to play a ringback tone. The ringback tone state refers to a state in which a called user does not answer a call when the call succeeds and a caller terminal device sends a ringback tone to remind a user that the called user has not answered the call. The ringback tone includes vibration, a color ring back tone, beep, or music, a song, recording, or video that is personalized. This is not limited herein.

It should be noted that signaling transmission in step S309 is not delayed due to a delay problem of interaction between a first core network and a second core network accessed by the first terminal device 140 and the second terminal device 150, the 200 OK (UPDATE) signaling is normally transmitted to the first terminal device 140, and a problem of disorder of the 200 OK (UPDATE) signaling and the 180 Ringing signaling does not occur.

Step S312: The second terminal device 150 sends 200 OK (INVITE) signaling to the first terminal device 140.

It should be noted that with reference to the scenario shown in FIG. 1A to FIG. 1C, after the second terminal device 150 starts to ring, the user B answers a call on the second terminal device 150.

Optionally, when the user B answers the call on the second terminal device 150, the second terminal device 150 sends the 200 OK (INVITE) signaling to the first terminal device 140.

Optionally, in response to the user B answers the call on the second terminal device 150, the second terminal device 150 sends the 200 OK (INVITE) signaling to the first terminal device 140.

The 200 OK (INVITE) signaling may be third 200 OK signaling, and the 200 OK (INVITE) signaling may indicate that the second terminal device 150 responds to the first terminal device 140 that the second terminal device 150 has been prepared to send and receive a voice packet.

Optionally, after the second terminal device 150 starts to ring, the user B answers the call, and the second terminal device 150 sends the 200 OK (INVITE) signaling to the third radio access network device 130. The third radio access network device 130 sends the 200 OK (INVITE) signaling received from the second terminal device 150 to the first radio access network device 110. After the first radio access network device 110 receives the 200 OK (INVITE) signaling, the first radio access network device 110 sends the 200 OK (INVITE) signaling received from the third radio access network device 130 to the first terminal device 140. After the first terminal device 140 receives the 200 OK (INVITE) signaling, the first terminal device 140 indicates, through displaying, that the call is connected. Specifically, the first terminal device 140 may display, to a user, a user prompt such as "in a phone call", "in a call", "call in progress", "connected", or the like. Generally, additional call duration prompt may be displayed, such as "00:01", "00:02", "00:03", or the like.

It should be noted that an occasion at which the first terminal device 140 indicates, through displaying, that the call is connected may be after step S312 in which the first terminal device 140 receives the 200 OK (INVITE) signaling and before step S313 in which the first terminal device 140 sends ACK signaling to the second terminal device 150; or after step S313 in which the first terminal device 140 sends ACK signaling to the second terminal device 150. This occasion is not limited in this embodiment of this application.

Step S313: The first terminal device 140 sends ACK signaling to the second terminal device 150.

The ACK signaling may be second acknowledgment information, and the ACK signaling may indicate that the first terminal device 140 acknowledges to the second terminal device 150 that the first terminal device 140 has received the 200 OK (INVITE) signaling sent by the second terminal device 150 to the first terminal device 140.

Optionally, after the first terminal device 140 receives the 200 OK (INVITE) signaling, the first terminal device 140 sends the ACK signaling to the first radio access network device 110. The first radio access network device 110 sends the ACK signaling received from the first terminal device 140 to the third radio access network device 130. After the third radio access network device 130 receives the ACK signaling, the third radio access network device 130 sends the received ACK signaling to the second terminal device 150.

Step S314: The second terminal device 150 sends a first voice packet to the first terminal device 140.

The first voice packet may include an IMS RTP SN and Payload. The first voice packet may include voice data.

Optionally, after the second terminal device sends the 200 OK (INVITE) signaling, the second terminal device 150 sends the first voice packet to the third radio access network device 130. The third radio access network device 130 sends the first voice packet received from the second terminal device 150 to the first radio access network device 110. After receiving the first voice packet, the first radio access network device 110 sends the first voice packet to the first terminal device 140. After receiving the first voice packet, the first terminal device 140 plays a voice.

It should be noted that an occasion at which the second terminal device 150 sends the first voice packet to the first radio access network device 110 is not limited in this embodiment of this application. For example, after the second terminal device sends the 200 OK (INVITE) signaling, the second terminal device 150 sends the first voice packet to the first radio access network device 110. Alternatively, after the second terminal device receives the ACK signaling, the second terminal device 150 sends the first voice packet to the first radio access network device 110.

Step S315: The first terminal device 140 sends a second voice packet to the second terminal device 150.

The second voice packet may include an IMS RTP SN and Payload. The second voice packet may include voice data.

Optionally, after the first terminal device 140 sends the ACK signaling, the first terminal device 140 sends the second voice packet to the first radio access network device 110. After receiving the second voice packet, the first radio access network device 110 sends the second voice packet to the third radio access network device 130. After receiving the second voice packet, the third radio access network device 130 sends the second voice packet to the second terminal device 150. After receiving the second voice packet, the second terminal device 150 plays the voice.

It should be noted that an occasion at which the first terminal device 140 sends the second voice packet to the first radio access network device 110 is not limited in this embodiment of this application. Step S314 and step S315 have no mutual triggering relationship and sequence, and the sequence of the two may be interchanged. In a call process, voice packets exchanged between a caller terminal device and a called terminal device are not limited to the first voice packet and the second voice packet. Details are not described in this embodiment of this application, and only the first voice packet and the second voice packet are used as examples to indicate an exchange process of user voice packets between the caller terminal device and the called terminal device in the call process.

Therefore, in some possible scenarios, because there is no disorder between the 200 OK (UPDATE) signaling and the 180 Ringing signaling, a user can normally make a voice call even in the EPSFB scenario.

Figure 5A:
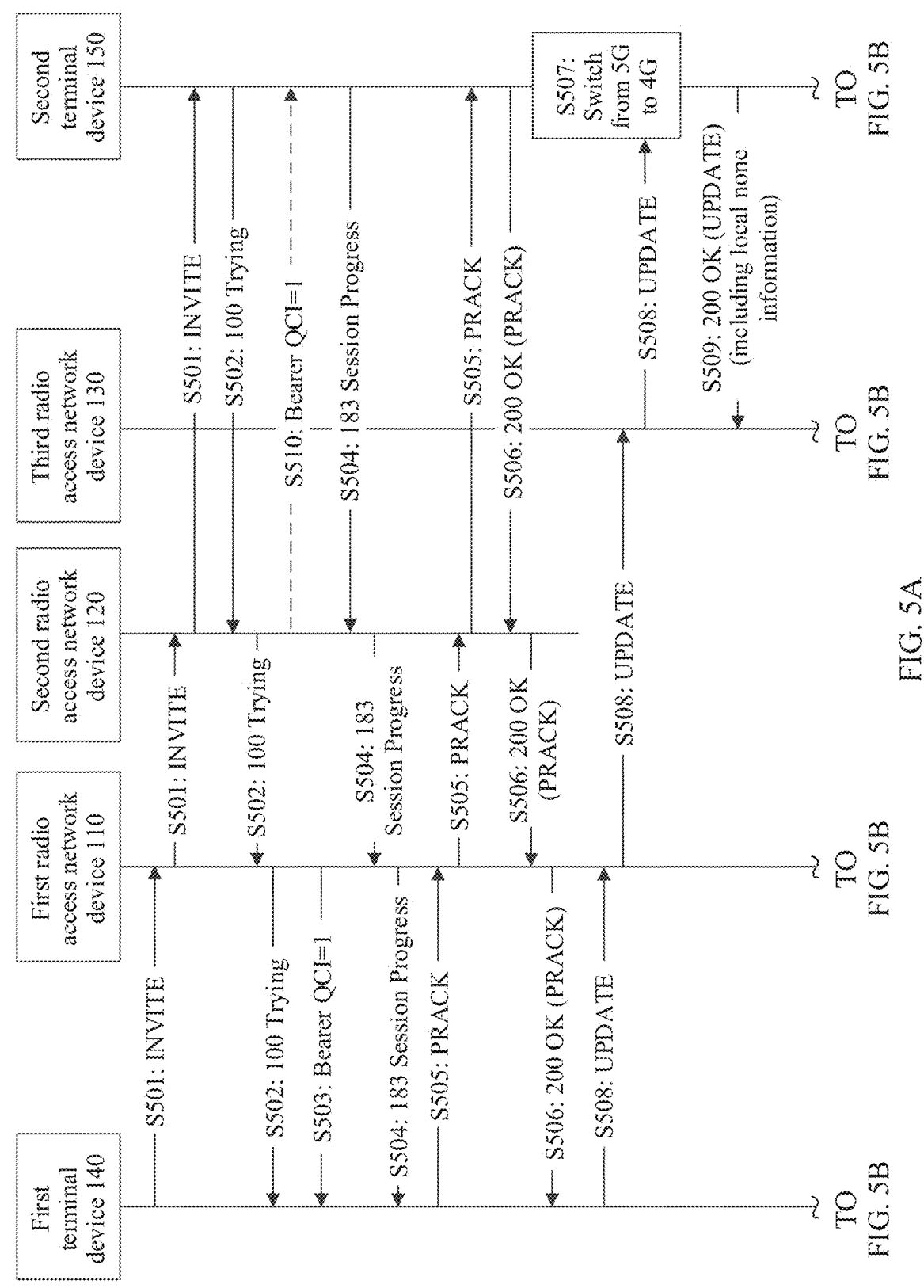
FIG. 5A and FIG. 5B are diagrams of signaling interaction of another voice call in an EPSFB scenario in a communication method according to an embodiment of this application.
Figure 5B:
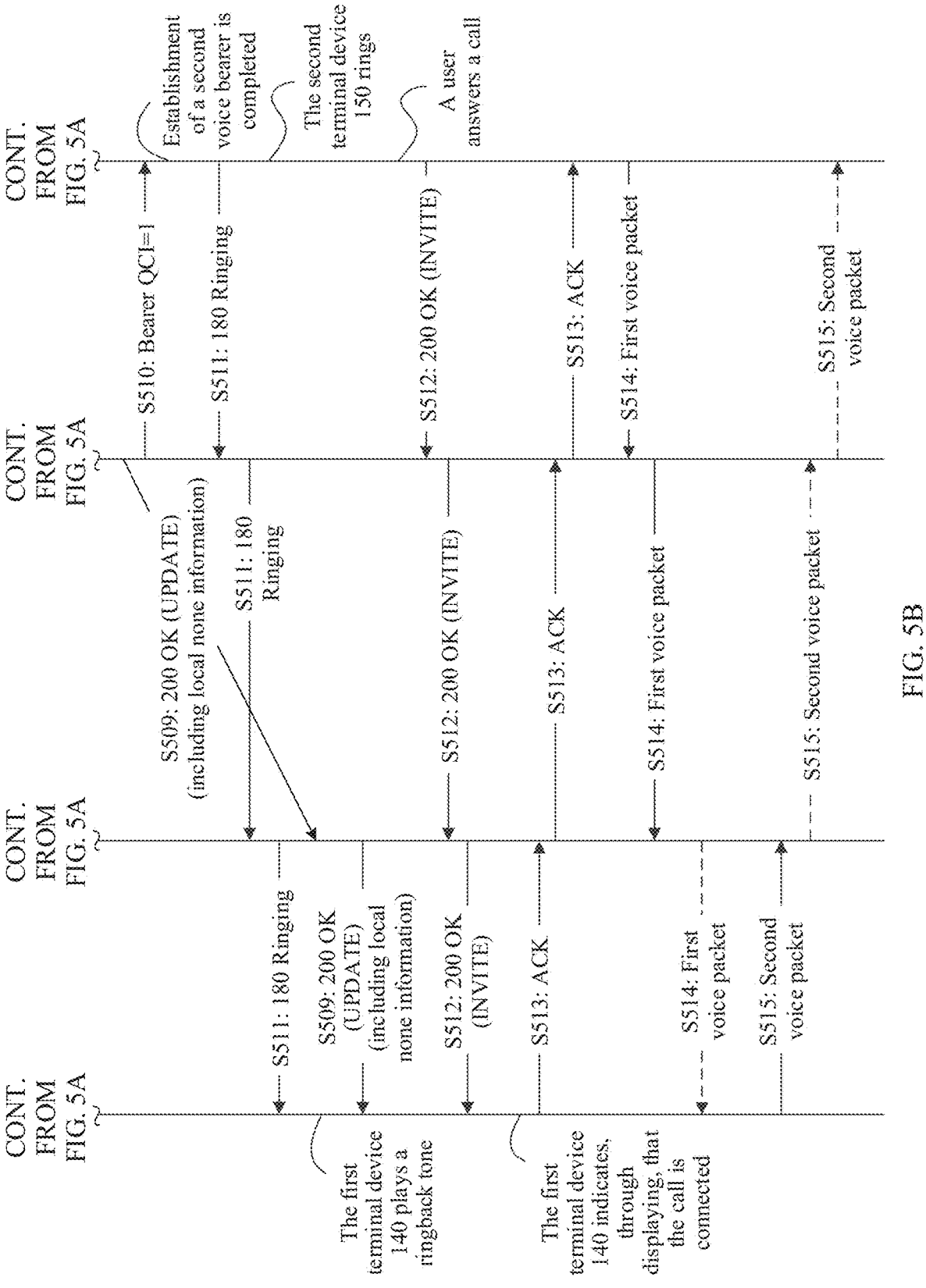

As shown in FIG. 5A and FIG. 5B, in some other embodiments, with reference to the EPSFB scenario shown in FIG. 3A and FIG. 3B, there may be disorder between the 200 OK (UPDATE) signaling and the 180 Ringing signaling. After step S308 shown in FIG. 3A and FIG. 3B, a signaling interaction process in an abnormal scenario shown in FIG. 5A and FIG. 5B includes the following steps.

It should be noted that step S501 to step S508 in FIG. 5A and FIG. 5B are the same as step S301 to step S308 in FIG. 3A and FIG. 3B. For related descriptions, refer to the descriptions in step S301 to step S308. Details are not described herein again.

Step S509: The second terminal device 150 sends 200 OK (UPDATE) signaling to the first terminal device 140.

Optionally, after receiving the UPDATE signaling, the second terminal device 150 checks a voice bearer state of the second terminal device 150. The second terminal device 150 acknowledges that the second terminal device 150 has not received the voice dedicated bearer establishment instruction delivered by the third radio access network device 130, that is, the establishment of the second voice bearer is not completed, the 200 OK (UPDATE) signaling sent by the second terminal device 150 to the third radio access network device 130 includes a=curr:qos local none information, and the a=curr:qos local none information is a syntax of an SDP protocol. The 200 OK (UPDATE) signaling may indicate information that the establishment of the second voice bearer of the second terminal device 150 is not completed. After receiving the 200 OK (UPDATE) signaling that includes the a=curr:qos local none information and that is from the second terminal device 150, the third radio access network device 130 sends the 200 OK (UPDATE) signaling that includes the a=curr:qos local none information to the first radio access network device 110. Based on a fact that the 200 OK (UPDATE) signaling that includes the a=curr:qos local none information is received by the first radio access network device 110, the first radio access network device 110 determines that a current called terminal device, that is, the second terminal device 150, is not in a state in which a voice packet can be sent or received, and the first radio access network device 110 is in a non-connected state, that is, a state in which a voice packet cannot be normally forwarded. After receiving the 200 OK (UPDATE) signaling, the first radio access network device 110 sends the 200 OK (UPDATE) to the first terminal device 140.

There may be a problem of network compatibility between a first core network and a second core network accessed by the first terminal device 140 and the second terminal device 150, and a signaling sending delay may be caused due to an EPSFB process of the second terminal device 150, which finally leads to a problem of signaling disorder. Due to the problem of signaling disorder in which signaling transmission in step S509 is delayed, the 200 OK (UPDATE) signaling cannot be normally transmitted to the first terminal device 140. Because transmission of the 200 OK (UPDATE) signaling is delayed between the third radio access network device 130 and the first radio access network device 110, the first terminal device 140 first receives the 180 Ringing signaling in the following step S511, and then receives the 200 OK (UPDATE) signaling that includes the a=curr:qos local none information.

Figure 7:
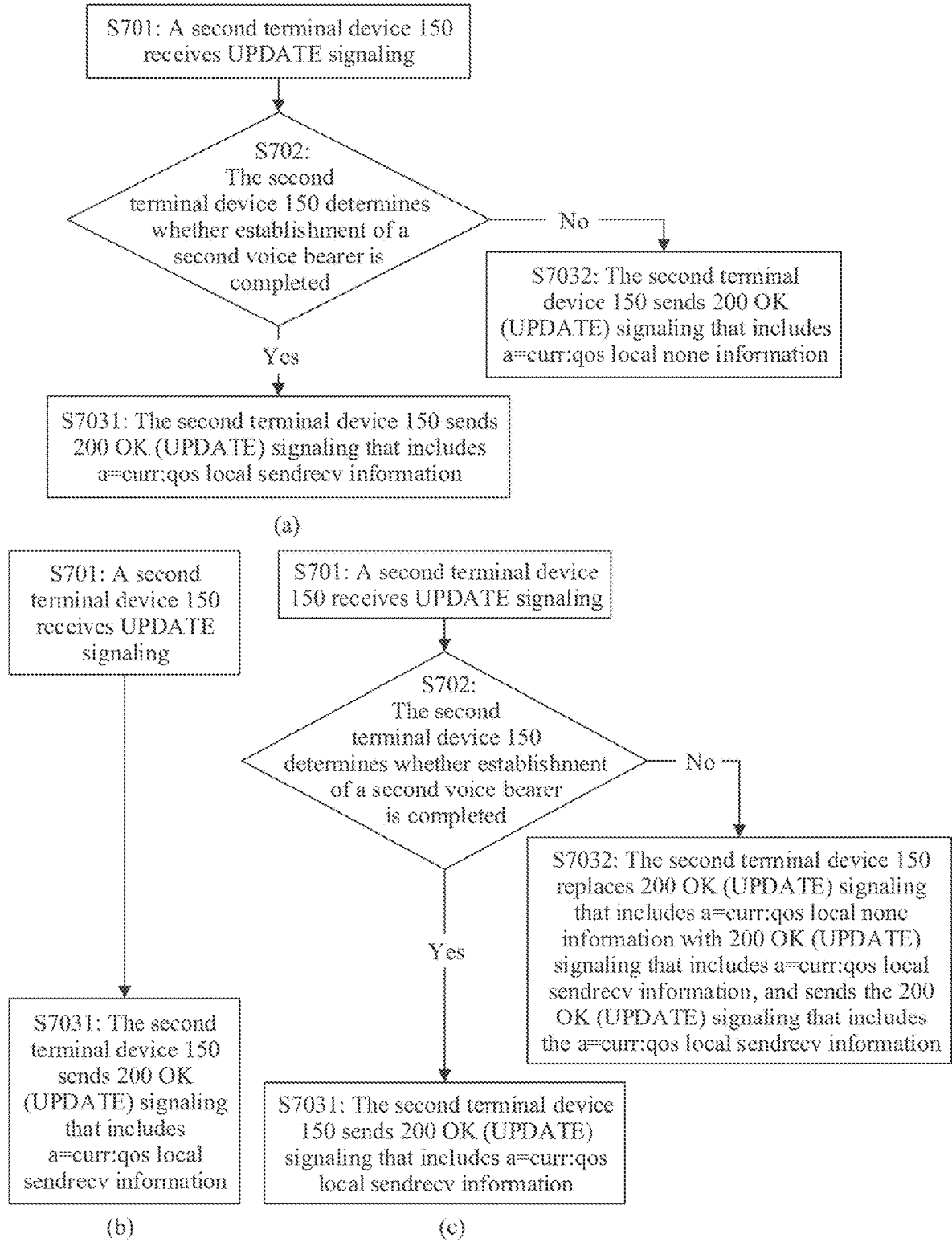
FIG. 7 is a schematic flowchart of a communication method according to an embodiment of this application.

Optionally, FIG. 7(*a*) is a determining logic of the second terminal device 150 before the second terminal device 150 sends the 200 OK (UPDATE) signaling. After the second terminal device 150 receives the UPDATE signaling, the second terminal device 150 determines whether the establishment of the second voice bearer is completed. When the establishment of the second voice bearer is completed, the 200 OK (UPDATE) signaling sent by the second terminal device 150 includes the a=curr:qos local sendrecv information. When the establishment of the second voice bearer is not completed, the 200 OK (UPDATE) signaling sent by the second terminal device 150 includes the a=curr:qos local none information.

It should be noted that, in some other implementations, information included in the 200 OK (UPDATE) signaling sent by the second terminal device 150 to the first terminal device 140 may be different, and is specifically depending on the voice bearer state of the second terminal device 150. After receiving the UPDATE signaling, the second terminal device 150 checks a voice bearer state of the second terminal device 150. After the second terminal device 150 acknowledges that the second terminal device 150 has received the voice dedicated bearer establishment instruction delivered by the third radio access network device 130, and when the establishment of the second voice bearer is completed, the 200 OK (UPDATE) signaling sent by the second terminal device 150 to the third radio access network device 130 includes the a=curr:qos local sendrecv information. The 200 OK (UPDATE) signaling may enable the first radio access network device 110 to normally send and receive a voice packet. After the third radio access network device 130 receives the 200 OK (UPDATE) signaling, the third radio access network device 130 sends the 200 OK (UPDATE) signaling to the first radio access network device 110. After the first radio access network device 110 receives the 200 OK (UPDATE) signaling, the first radio access network device 110 sends the 200 OK (UPDATE) signaling to the first terminal device 140. Therefore, after the second terminal device 150 receives the UPDATE signaling, and when the establishment of the second voice bearer of the second terminal device 150 is completed, the second terminal device 150 may send the 200 OK (UPDATE) signaling that includes the a=curr:qos local sendrecv information to the first radio access network device 110, that is, the first radio access network device 110 may normally send and receive a voice packet.

Step S510: The third radio access network device 130 delivers a voice dedicated bearer establishment instruction to the second terminal device 150.

It should be noted that step S510 is the same as step S310. For related descriptions, refer to the descriptions in step S310. Details are not described herein again.

Step S511: The second terminal device 150 sends 180 Ringing signaling to the first terminal device 140.

The 180 Ringing signaling may be first ring information, and the 180 Ringing signaling may indicate that the second terminal device 150 has established the second voice bearer and is ready to make a call.

Optionally, after the second terminal device 150 sends 180 Ringing signaling, a call state of the second terminal device 150 is updated to a ringing state, and the second terminal device 150 starts to ring. The ringing state refers to a state in which a user, when there is an incoming call, has not answered the call and a called terminal device rings to remind the user of the incoming call. A ringing tone used when the ringing starts includes vibration, a color ring back tone, beep, or music, a song, recording, or video that is personalized. This is not limited herein. After the third radio access network device 130 receives the 180 Ringing signaling, the third radio access network device 130 sends the 180 Ringing signaling to the first radio access network device 110. After the first radio access network device 110 receives the 180 Ringing signaling, the first radio access network device 110 determines that a current called terminal, that is, the second terminal device 150, is in a state in which a voice packet can be sent or received, and the first radio access network device 110 is in a connected state, that is, a state in which a voice packet can be normally forwarded, and sends the 180 Ringing signaling to the first terminal device 140. After the first terminal device 140 receives the 180 Ringing signaling, a call state of the first terminal device 140 is updated to a ringback tone state, and the first terminal device 140 starts to play a ringback tone. The ringback tone state refers to a state in which a called user does not answer a call when the call succeeds and a caller terminal device sends a ringback tone to remind a user that the called user has not answered the call. The ringback tone includes vibration, a color ring back tone, beep, or music, a song, recording, or video that is personalized. This is not limited herein.

It should be noted that because of the problem of signaling disorder due to interaction between the first core network and the second core network accessed by the first terminal device 140 and the second terminal device 150, signaling transmission in step S509 is delayed, and the 200 OK (UPDATE) signaling cannot been normally transmitted to the first terminal device 140. Because transmission of the 200 OK (UPDATE) signaling is delayed between the third radio access network device 130 and the first radio access network device 110, the first terminal device 140 first receives the 180 Ringing signaling in step S511, and then receives the 200 OK (UPDATE) signaling that includes the a=curr:qos local none information in step S509.

Step S512: The second terminal device 150 sends 200 OK (INVITE) signaling to the first terminal device 140.

Step S513: The first terminal device 140 sends ACK signaling to the second terminal device 150.

It should be noted that step S512 and step S513 are the same as step S312 and step S313 in FIG. 3A and FIG. 3B. For related descriptions, refer to the descriptions in step S312 and step S313. Details are not described herein again.

Step S514: The second terminal device 150 sends a first voice packet to the first radio access network device 110.

The first voice packet may include an IMS RTP SN and Payload. The first voice packet may include voice data.

Optionally, after the second terminal device sends the 200 OK (INVITE) signaling, the second terminal device 150 sends the first voice packet to the third radio access network device 130. The third radio access network device 130 sends the first voice packet received from the second terminal device 150 to the first radio access network device 110. Based on step S509, the first radio access network device 110 cannot normally forward a voice packet, and the first radio access network device 110 cannot further send the first voice packet to the first terminal device 140.

It should be noted that an occasion at which the second terminal device 150 sends the first voice packet to the first radio access network device 110 is not limited in this embodiment of this application. For example, after the second terminal device sends the 200 OK (INVITE) signaling, the second terminal device 150 sends the first voice packet to the first radio access network device 110. Alternatively, after the second terminal device receives the ACK signaling, the second terminal device 150 sends the first voice packet to the first radio access network device 110.

Step S515: The first terminal device 140 sends a second voice packet to the first radio access network device 110.

The second voice packet may include an IMS RTP SN and Payload. The second voice packet may include voice data.

Optionally, after the first terminal device 140 sends the ACK signaling, the first terminal device 140 sends the second voice packet to the first radio access network device 110. Based on step S509, the first radio access network device 110 cannot normally forward a voice packet, and the first radio access network device 110 cannot further send the second voice packet to the third radio access network device 130.

It should be noted that an occasion at which the first terminal device 140 sends the second voice packet to the first radio access network device 110 is not limited in this embodiment of this application. For example, after the second terminal device 150 sends the first voice packet to the first radio access network device 110, the first terminal device 140 sends the second voice packet to the first radio access network device 110. Alternatively, before the second terminal device 150 sends the first voice packet to the first radio access network device 110, the first terminal device 140 sends the second voice packet to the first radio access network device 110.

It should be noted that an occasion at which the first terminal device 140 sends the second voice packet to the first radio access network device 110 is not limited in this embodiment of this application. Step S514 and step S515 have no mutual triggering relationship and sequence, and the sequence of the two may be interchanged. In a call process, voice packets exchanged between a caller terminal device and a called terminal device are not limited to the first voice packet and the second voice packet. Details are not described in this embodiment of this application, and only the first voice packet and the second voice packet are used as examples to indicate an exchange process of user voice packets between the caller terminal device and the called terminal device in the call process.

In an EPSFB process, the terminal device needs to fall back from a 5G network bearer state to a 4G network bearer state. This process consumes a specific period of time, and the establishment of the second voice bearer can only be completed after a network switching is completed. Therefore, in the EPSFB process, the establishment of the second voice bearer is completed at a later time point. Further, because the establishment of the second voice bearer is completed at a later time point, when the second terminal device 150 receives the UPDATE signaling in step S508, the establishment of the second voice bearer is not completed. Because the establishment of the second voice bearer is not completed, in step S509, the 200 OK (UPDATE) signaling sent by the second terminal device 150 to the first terminal device 140 includes the a=curr:qos local none information, and the a=curr:qos local none information is a syntax of an SDP protocol. The 200 OK (UPDATE) signaling may indicate information that the establishment of the second voice bearer of the second terminal device 150 is not completed.

For example, with reference to step S509 to step S515 and the scenario shown in FIG. 1A to FIG. 1C, after receiving the 180 Ringing signaling in step S511, the first radio access network device 110 receives the 200 OK (UPDATE) signaling in step S509. In step S511, after receiving the 180 Ringing signaling, the third radio access network device 130 sends the 180 Ringing signaling to the first radio access network device 110. In step S511, after the first radio access network device 110 receives the 180 Ringing signaling, the first radio access network device 110 determines that a current called terminal, that is, the second terminal device 150, is in a state in which a voice packet can be sent or received, and the first radio access network device 110 is in a connected state, that is, a state in which a voice packet can be normally forwarded, and sends the 180 Ringing signaling to the first terminal device 140. After the first terminal device 140 receives the 180 Ringing signaling, the first terminal device 140 starts to play a ringback tone, the second terminal device 150 starts to ring, and the user B may answer a call. However, because there is the problem of network compatibility between the first core network and the second core network accessed by the first terminal device 140 and the second terminal device 150, signaling transmission may be delayed, resulting in the problem of signaling disorder. To be specific, signaling transmission in step S509 is delayed, and the 200 OK (UPDATE) signaling that includes the a=curr:qos local none information cannot be normally transmitted to the first terminal device 140. Because transmission of the 200 OK (UPDATE) signaling is delayed between the third radio access network device 130 and the first radio access network device 110, the first radio access network device 110 first receives the 180 Ringing signaling in step S511, and then receives the 200 OK (UPDATE) signaling that includes the a=curr:qos local none information in step S509. After receiving the 200 OK (UPDATE) signaling that includes the a=curr:qos local none information in step S509, the first radio access network device 110 determines that a current called terminal, that is, the second terminal device 150, is not in a state in which a voice packet can be sent or received, and the first radio access network device 110 is in a non-connected state, that is, a state in which a voice packet cannot be normally forwarded.

A user call is abnormal due to the foregoing two problems: (1) The establishment of the second voice bearer is completed at a later time point due to an EPSFB, as a result, the 200 OK (UPDATE) signaling sent by the second terminal device 150 to the first terminal device 140 includes the a=curr:qos local none information. (2) The problem of network compatibility between the first core network and the second core network leads to the problem of signaling disorder. The third radio access network device 130 sends the 200 OK (UPDATE) signaling that includes the a=curr: qos local none information to the first radio access network device 110. Based on a fact that the first radio access network device 110 receives the 200 OK (UPDATE) signaling that includes the a=curr:qos local none information, the first radio access network device 110 cannot normally forward a voice packet. After the user B answers the call, although the first terminal device 140 and the second terminal device 150 start to send voice packets, because the first radio access network device 110 cannot normally forward the voice packet, the user A cannot hear a sound of the user B through the first terminal device 140 during the call. The user B cannot hear a sound of the user A through the second terminal device 150 during the call. Optionally, in some embodiments, after a terminal device does not receive a voice packet for specific duration, a call drops. The call drop may be manifested as that the call ends automatically after a period of time. The call drop refers to abnormal release in a communication process of a user.

Figure 6A:
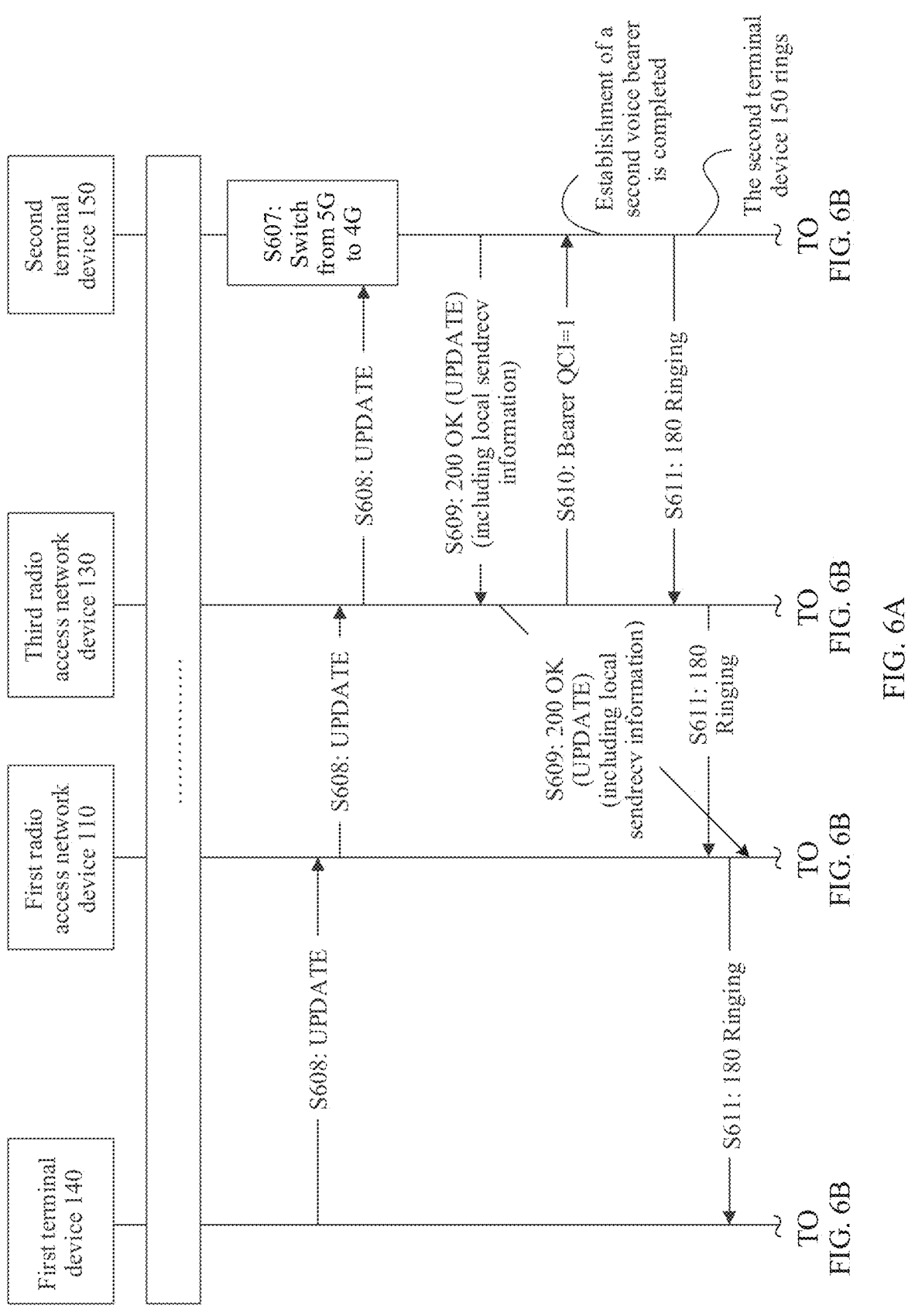
FIG. 6A and FIG. 6B are diagrams of signaling interaction of another voice call in an EPSFB scenario in a communication method according to an embodiment of this application.
Figure 6B:
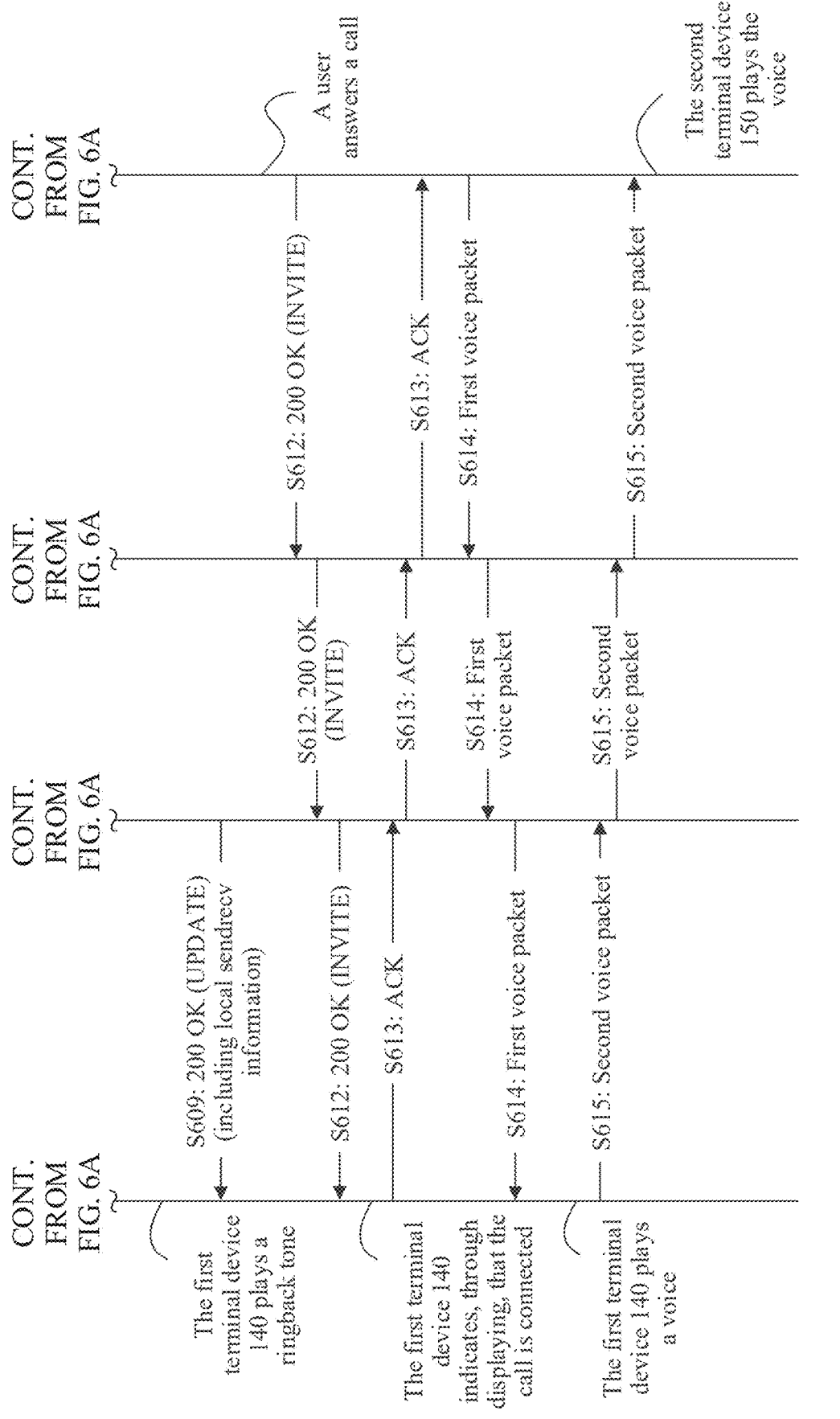

Optionally, in some other embodiments, to resolve a problem that a user cannot hear a sound after answering a call in the implementation corresponding to FIG. 5A and FIG. 5B, a communication method shown in FIG. 6A and FIG. 6B is provided. Steps before step S609 are respectively the same as step S301 to step S308 in FIG. 3A and FIG. 3B. For related descriptions, refer to the descriptions in step S301 to step S308. Details are not described herein again. In and after step S609, the method corresponding to FIG. 6A and FIG. 6B may further include the following steps.

Step S609: The second terminal device 150 sends 200 OK (UPDATE) signaling to the first terminal device 140.

The 200 OK (UPDATE) signaling may be second response information, and the 200 OK (UPDATE) signaling may indicate information that the second terminal device 150 responds UPDATE signaling to the first terminal device 140. The 200 OK (UPDATE) signaling may be first signaling, or the 200 OK (UPDATE) signaling may be third signaling.

It should be noted that, in this case, the signaling sent is actually 200 OK signaling used to reply to the UPDATE signaling. In this embodiment of this application, to facilitate description and distinguish different 200 OK signaling, signaling replied by 200 OK signaling that is used to reply to different signaling is marked in parentheses following the 200 OK signaling, to make a distinction. Here, the 200 OK signaling used to reply to the UPDATE signaling is written as the 200 OK (UPDATE) signaling. However, a writing method herein is only an example. A specific description of signaling actually sent is subject to a 3GPP standard protocol.

Optionally, after receiving the UPDATE signaling, the second terminal device 150 checks a voice bearer state of the second terminal device 150. After the second terminal device 150 acknowledges that the second terminal device 150 has not received the voice dedicated bearer establishment instruction delivered by the third radio access network device 130, that is, the establishment of the second voice bearer is not completed, the 200 OK (UPDATE) signaling sent by the second terminal device 150 to the third radio access network device 130 includes a=curr:qos local sendrecv information. The 200 OK (UPDATE) signaling may enable the first radio access network device 110 to normally forward a voice packet. After receiving the 200 OK (UPDATE) signaling from the second terminal device 150, the third radio access network device 130 sends the 200 OK (UPDATE) signaling that includes the a=curr:qos local sendrecv information to the first radio access network device 110. The 200 OK (UPDATE) signaling that includes the a=curr:qos local sendrecv information is received by the first radio access network device 110, the first radio access network device 110 determines that a current called terminal, that is, the second terminal device 150, is not in a state in which a voice packet can be sent or received, and the first radio access network device 110 is in a connected state, that is, a state in which a voice packet can be normally forwarded. In addition, the first radio access network device 110 sends the 200 OK (UPDATE) signaling that includes the a=curr:qos local sendrecv information to the first terminal device 140. The 200 OK (UPDATE) signaling that includes the a=curr:qos local sendrecv information may be the first signaling, and the first signaling includes 200 OK and a=curr:qos local sendrecv.

The 200 OK (UPDATE) signaling received by the first radio access network device 110 from the third radio access network device 130 includes the a=curr:qos local sendrecv information, and may enable the first radio access network device 110 to normally forward the voice packet. This avoids a situation in which, after the first radio access network device 110 receives the 200 OK (UPDATE) signaling that includes the a=curr:qos local none information, the first radio access network device 110 cannot normally forward the voice packet, and as a result, a user cannot hear a sound after answering a call.

Optionally, FIG. 7(b) is a possible determining logic before the second terminal device 150 sends the 200 OK (UPDATE) signaling in an improvement scheme. After the second terminal device 150 receives the UPDATE signaling, the second terminal device 150 sends the 200 OK (UPDATE) signaling that includes the a=curr:qos local none information to the first terminal device 140. The 200 OK (UPDATE) signaling that includes the a=curr:qos local sendrecv information may be the first signaling, and the first signaling includes 200 OK and a=curr:qos local sendrecv.

Optionally, FIG. 7(c) is another possible determining logic before the second terminal device 150 sends the 200

OK (UPDATE) signaling in an improvement scheme. After the second terminal device 150 receives the UPDATE signaling, the second terminal device 150 determines whether the establishment of the second voice bearer is completed. When the establishment of the second voice bearer is completed, the second terminal device 150 sends the 200 OK (UPDATE) signaling that includes the a=curr:qos local sendrecv information to the first terminal device 140. When the establishment of the second voice bearer is not completed, the second terminal device 150 replaces the 200 OK (UPDATE) signaling that includes the a=curr:qos local none information and that is shown in FIG. 7(a) with the 200 OK (UPDATE) signaling that includes the a=curr:qos local sendrecv information, and sends the 200 OK (UPDATE) signaling that includes the a=curr:qos local sendrecv information to the first terminal device 140. The 200 OK (UPDATE) signaling that includes the a=curr:qos local sendrecv information may be the first signaling, and the first signaling includes 200 OK and a=curr:qos local sendrecv.

Optionally, in some embodiments, after receiving the UPDATE signaling, the second terminal device 150 may further perform the following three determining processes: (1) determining that the first terminal device 140 supports resource reservation through a resource reservation flag bit of the first terminal device 140; (2) determining that the second terminal device 150 supports resource reservation based on a fact that a support field in the received INVITE signaling carries a precondition tag; and (3) determining that a current call is an EPSFB call with reference to step S404. When the second terminal device 150 determines that the foregoing three conditions are met, the second terminal device 150 is shown in FIG. 7(b). The second terminal device 150 sends the 200 OK (UPDATE) signaling that includes the a=curr:qos local none information to the first terminal device 140. An occasion for executing the foregoing determining processes is not limited in this embodiment of this application.

Optionally, in some embodiments, after receiving the UPDATE signaling, the second terminal device 150 may further perform the following three determining processes: (1) determining that the first terminal device 140 supports resource reservation through a resource reservation flag bit of the first terminal device 140; (2) determining that the second terminal device 150 supports resource reservation based on a fact that a support field in the received INVITE signaling carries a precondition tag; and (3) determining that a current call is an EPSFB call with reference to step S404. When the second terminal device 150 determines that the foregoing three conditions are met, the second terminal device 150 is shown in FIG. 7(c). When the establishment of the second voice bearer is completed, the second terminal device 150 sends the 200 OK (UPDATE) signaling that includes the a=curr:qos local sendrecv information to the first terminal device 140. When the establishment of the second voice bearer is not completed, the second terminal device 150 replaces the 200 OK (UPDATE) signaling that includes the a=curr:qos local none information and that is shown in FIG. 7(a) with the 200 OK (UPDATE) signaling that includes the a=curr:qos local sendrecv information, and sends the 200 OK (UPDATE) signaling that includes the a=curr:qos local sendrecv information to the first terminal device 140. The 200 OK (UPDATE) signaling that includes the a=curr:qos local sendrecv information may be the first signaling, and the first signaling includes 200 OK and a=curr:qos local sendrecv. An occasion for executing the foregoing determining processes is not limited in this embodiment of this application.

Step S610: The third radio access network device 130 delivers a voice dedicated bearer establishment instruction to the second terminal device 150.

The voice dedicated bearer establishment instruction may be represented as second signaling, and the second signaling includes QCI=1.

The voice dedicated bearer establishment instruction may be second signaling, the voice dedicated bearer establishment instruction may be fourth signaling, or the voice dedicated bearer establishment instruction may be sixth signaling. The voice dedicated bearer establishment instruction may carry QCI=1 information. The voice dedicated bearer establishment instruction may be indicated as an activate dedicated EPS bearer context request (Activate dedicated EPS bearer context request). The voice dedicated bearer establishment instruction may be a second voice bearer instruction. The voice dedicated bearer establishment instruction may indicate that the third radio access network device 130 indicates the second terminal device 150 to establish a second voice bearer, and the second voice bearer may indicate a voice resource reservation state of the second terminal device 150.

Optionally, in this embodiment of this application, step S610 is performed after step S607 in which the second terminal device 150 has been switched to a 4G voice scheme. After the third radio access network device 130 delivers the voice dedicated bearer establishment instruction to the second terminal device 150, the third radio access network device 130 indicates the second terminal device 150 to establish the second voice bearer. A specific voice resource reservation state of the second voice bearer is not limited in this embodiment of this application. In this embodiment of this application, that the terminal device establishes the second voice bearer may be understood as that the resource reservation state is a normal state, that is, the terminal device is in a state in which the terminal device can perform subsequent sending and receiving of a voice packet.

It should be noted that with reference to FIG. 3A and FIG. 3B, if an EPSFB does not occur, in some implementations, the second radio access network device 120 may deliver the voice dedicated bearer establishment instruction to the second terminal device 150 after step S302 in which the second radio access network device 120 receives the 100 Trying signaling. Because the EPSFB occurs, with reference to FIG. 3A and FIG. 3B, the third radio access network device 130 delivers the voice dedicated bearer establishment instruction only after the second radio access network device 120 delivers the switching instruction and a network on which the second terminal device 150 resides is switched to 4G. As a result, in a call process, a time point at which the second terminal device 150 completes the establishment of the second voice bearer is delayed due to an EPSFB process.

Optionally, in some implementations, the third radio access network device 130 does not deliver the voice dedicated bearer establishment instruction immediately after the second radio access network device 120 delivers the switching instruction and the network on which the second terminal device 150 resides is switched to 4G. In other words, a time point at which the second terminal device 150 receives the voice dedicated bearer establishment instruction may be earlier than a time point at which the second terminal device 150 receives the UPDATE signaling, or may be later than a time point at which the second terminal device 150 receives the UPDATE signaling. A specific occasion at which the third radio access network device 130 delivers the voice dedicated bearer establishment instruction is not limited in this embodiment of this application. For a specific implementation, refer to a 3GPP standard protocol.

Step S611: The second terminal device 150 sends 180 Ringing signaling to the first terminal device 140.

The 180 Ringing signaling may be first ring information, and the 180 Ringing signaling may indicate that the second terminal device 150 has established the second voice bearer and is ready to make a call.

Optionally, in some implementations, after receiving the voice dedicated bearer establishment instruction, the second terminal device 150 sends the 180 Ringing signaling to the first terminal device 140.

Optionally, in some implementations, after the establishment of the second voice bearer is completed, the second terminal device 150 sends the 180 Ringing signaling to the first terminal device 140.

Optionally, in some implementations, based on a fact that the establishment of the second voice bearer is completed, the second terminal device 150 sends the 180 Ringing signaling to the first terminal device 140.

Optionally, after the second terminal device 150 sends the 180 Ringing signaling, a call state of the second terminal device 150 is updated to a ringing state, and the second terminal device 150 starts to ring. The ringing state refers to a state in which a user, when there is an incoming call, has not answered the call and a called terminal device rings to remind the user of the incoming call. A ringing tone used when the ringing starts includes vibration, a color ring back tone, beep, or music, a song, recording, or video that is personalized. This is not limited herein. After the third radio access network device 130 receives the 180 Ringing signaling, the third radio access network device 130 sends the 180 Ringing signaling to the first radio access network device 110. After the first radio access network device 110 receives the 180 Ringing signaling, the first radio access network device 110 determines that a current called terminal, that is, the second terminal device 150, is in a state in which a voice packet can be sent or received, and the first radio access network device 110 is in a connected state, that is, a state in which a voice packet can be normally forwarded, and sends the 180 Ringing signaling to the first terminal device 140. After the first terminal device 140 receives the 180 Ringing signaling, a call state of the first terminal device 140 is updated to a ringback tone state, and the first terminal device 140 starts to play a ringback tone. The ringback tone state refers to a state in which a called user does not answer a call when the call succeeds and a caller terminal device sends a ringback tone to remind a user that the called user has not answered the call. The ringback tone includes vibration, a color ring back tone, beep, or music, a song, recording, or video that is personalized. This is not limited herein.

Step S612: The second terminal device 150 sends 200 OK (INVITE) signaling to the first terminal device 140.

Step S613: The first terminal device 140 sends ACK signaling to the second terminal device 150.

Step S614: The second terminal device 150 sends a first voice packet to the first terminal device 140.

Step S615: The first terminal device 140 sends a second voice packet to the second terminal device 150.

It may be understood that step S612 to step S615 in FIG. 6A and FIG. 6B are respectively the same as step S312 to step S315 in FIG. 3A and FIG. 3B. For related descriptions, refer to the descriptions in step S312 to step S315. Details are not described herein again.

Therefore, in this embodiment of this application, the 200 OK (UPDATE) signaling received by the first radio access network device 110 does not include the a=curr:qos local none information, but includes the a=curr:qos local sendrecv information. The first radio access network device 110 may normally forward a voice packet. In this embodiment of this application, even if the establishment of the second voice bearer is completed at a later time point, the second terminal device 150 does not send the 200 OK (UPDATE) signaling that includes the a=curr:qos local none information to the first terminal device 140, but sends the 200 OK (UPDATE) signaling that includes the a=curr:qos local sendrecv information. Therefore, whether there is signaling disorder between the 180 Ringing and the 200 OK (UPDATE) signaling, a case in which dual-terminal no sound, call drop, or call drop after no sound does not occur in a call process between a caller terminal and a called terminal.

Figure 8A:
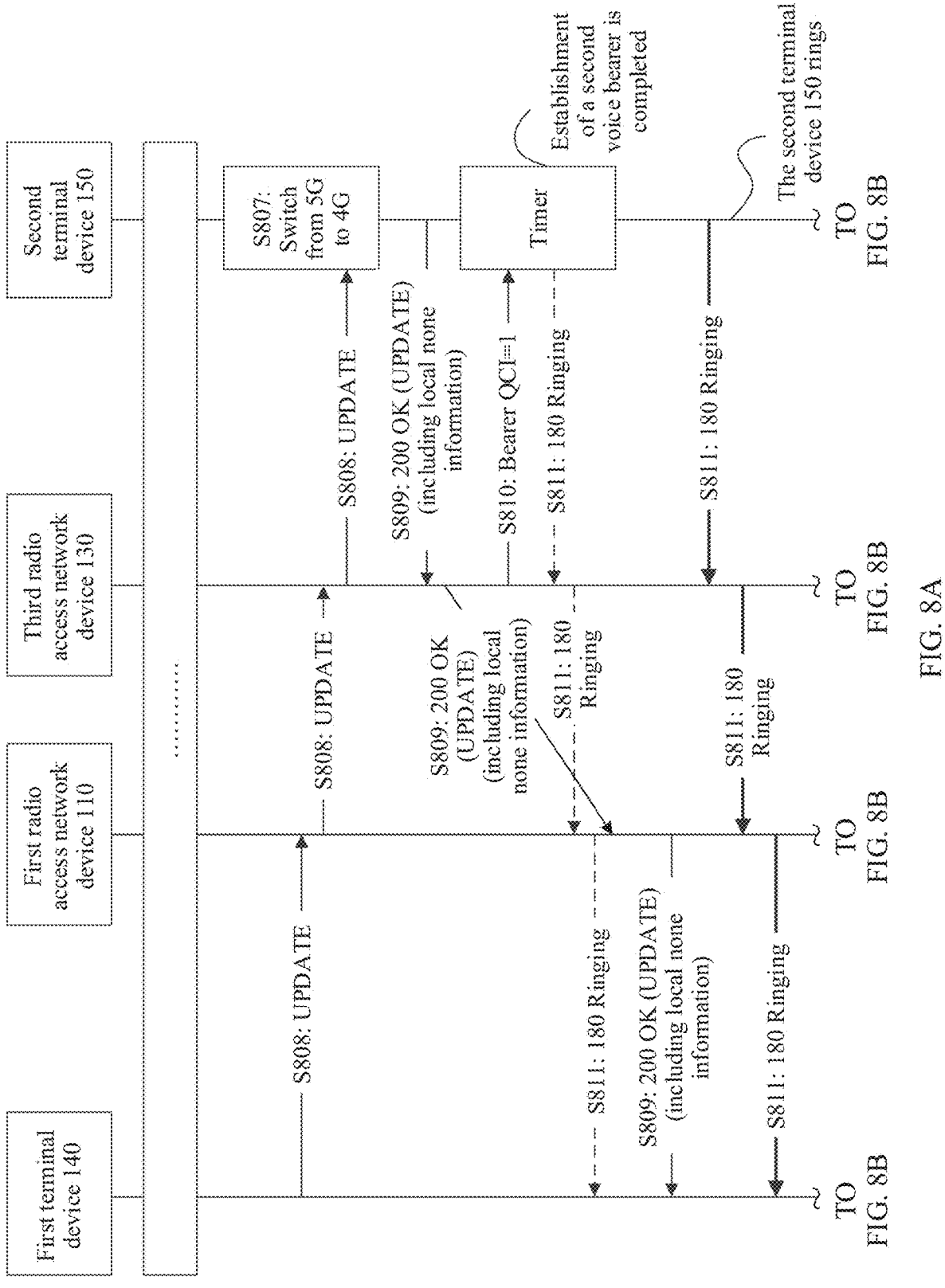
FIG. 8A and FIG. 8B are diagrams of signaling interaction of another voice call in an EPSFB scenario in a communication method according to an embodiment of this application.
Figure 8B:
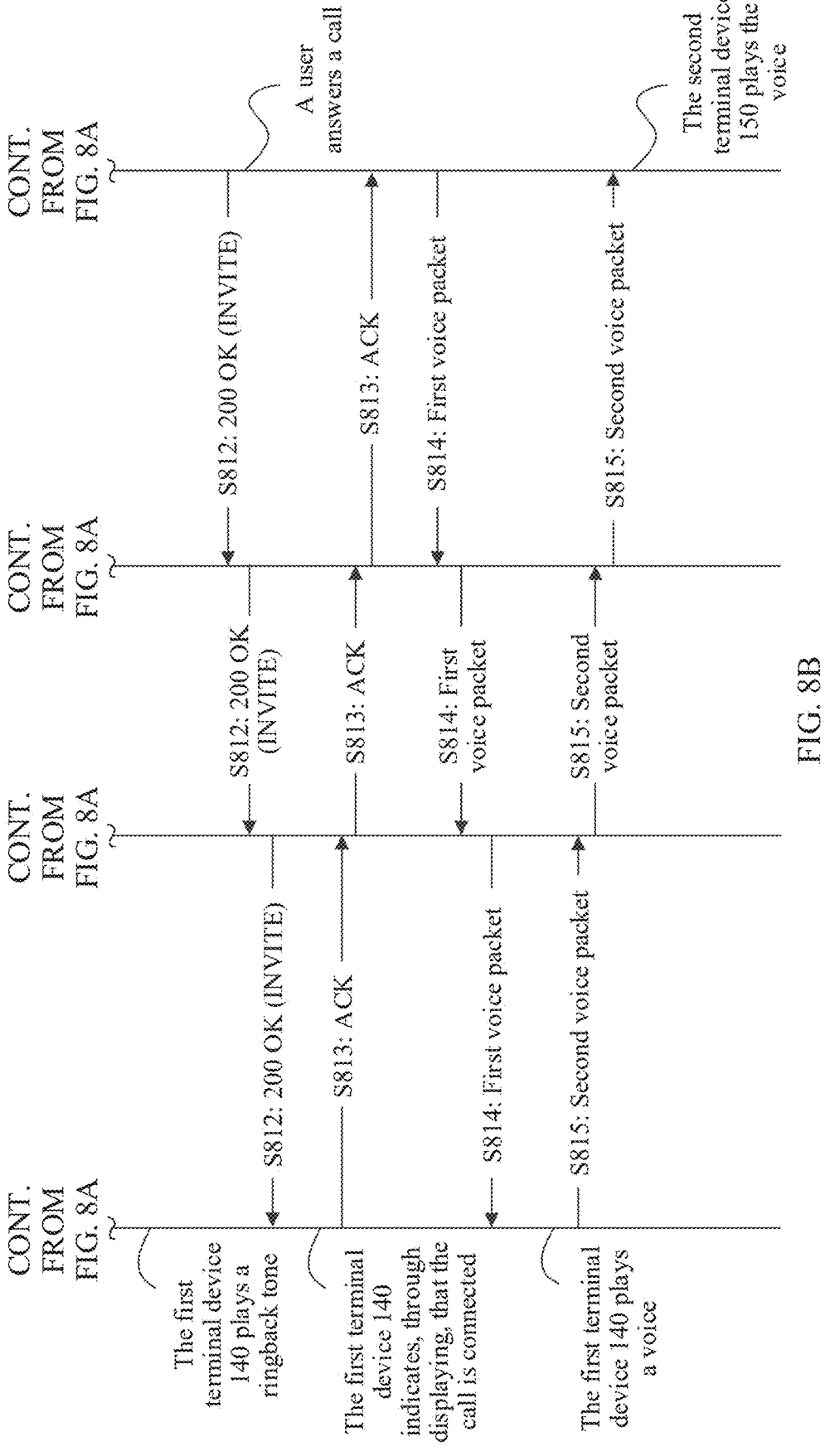

Optionally, in some other embodiments, to resolve a problem that a user cannot hear a sound after answering a call in the implementation corresponding to FIG. 5A and FIG. 5B, as shown in FIG. 8A and FIG. 8B, another optimization scheme is provided to avoid a problem of dual-terminal no sound, call drop, or call drop after no sound in a call process between a caller terminal and a called terminal due to signaling disorder between 180 Ringing and 200 OK (UPDATE) signaling on a network side. Steps before step S809 are respectively the same as step S301 to step S308 in FIG. 3A and FIG. 3B. For related descriptions, refer to the descriptions in step S301 to step S308. For related descriptions, refer to the descriptions in step S301 to step S308. Details are not described herein again. In and after step S809, the method corresponding to FIG. 8A and FIG. 8B may further include the following steps.

Step S809: The second terminal device 150 sends the 200 OK (UPDATE) signaling to the third radio access network device 130, and then starts a timer.

The timer may be represented as 180_delay_timer. The timer may enable the second terminal device 150 to delay sending of the 180 Ringing signaling for a specific period of time, and the specific period of time is not limited in this embodiment of this application. For ease of description, the timer is written as the 180_delay_timer. The name is merely an example. The timer may be another form of timer during actual application. Starting the timer may be represented as that the second terminal device 150 starts timing, and the 180 Ringing signaling is sent based on a fact that timing duration is greater than preset duration.

Optionally, in an implementation, after receiving the UPDATE signaling, the second terminal device 150 checks a voice bearer state of the second terminal device 150. The second terminal device 150 acknowledges that the second terminal device 150 has not received a voice dedicated bearer establishment instruction delivered by the third radio access network device 130, that is, the establishment of the second voice bearer is not completed, the second terminal device 150 sends the 200 OK (UPDATE) signaling to the third radio access network device 130. The 200 OK (UPDATE) signaling includes a=curr:qos local none information, and the 200 OK (UPDATE) signaling may indicate information that the establishment of the second voice bearer of the second terminal device 150 is not completed. After sending the 200 OK (UPDATE) signaling to the third radio access network device 130, the second terminal device 150 starts the 180_delay_timer.

Optionally, in another implementation, after receiving the UPDATE signaling, the second terminal device 150 checks a voice bearer state of the second terminal device 150. When the second terminal device 150 acknowledges that the second terminal device 150 has not received the voice dedicated bearer establishment instruction delivered by the third radio access network device 130, that is, when the establishment of the second voice bearer is not completed, the second terminal device 150 starts the 180_delay_timer. After the second terminal device 150 starts the 180_delay_timer, the second terminal device 150 starts timing. After the timing ends, the second terminal device 150 sends the 200 OK (UPDATE) signaling to the third radio access network device 130, and the 200 OK (UPDATE) signaling includes the a=curr:qos local none information.

Figure 9:
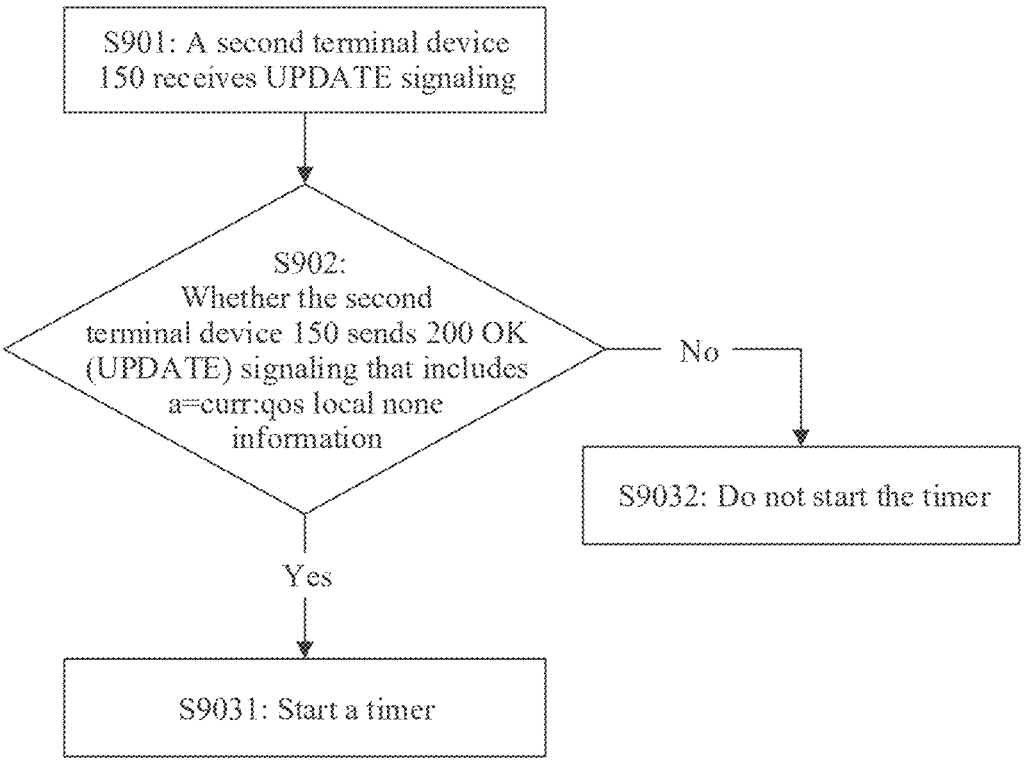
FIG. 9 is another schematic flowchart of a communication method according to an embodiment of this application.

Optionally, with reference to FIG. 9, after the second terminal device 150 receives the UPDATE signaling, the second terminal device 150 determines whether the second terminal device 150 sends the 200 OK (UPDATE) signaling that includes the a=curr:qos local none information. When the second terminal device 150 sends the 200 OK (UPDATE) signaling that includes the a=curr:qos local none information, the timer is started. When the second terminal device 150 sends the 200 OK (UPDATE) signaling that does not include the a=curr:qos local none information, the timer is not started. An occasion for executing the foregoing determining processes is not limited in this embodiment of this application.

Optionally, in some embodiments, after sending the 200 OK (UPDATE) signaling to the third radio access network device 130, the second terminal device 150 may further perform the following four determining processes: (1) determining that the first terminal device 140 supports resource reservation through a resource reservation flag bit of the first terminal device 140; (2) determining that the second terminal device 150 supports resource reservation based on a fact that a support field in the received INVITE signaling carries a precondition tag; (3) determining that a current call is an EPSFB call with reference to step S404; and (4) determining that the sent 200 OK (UPDATE) signaling includes the a=curr:qos local none information. When the second terminal device 150 determines that the foregoing four conditions are met, the second terminal device 150 starts the timer. An occasion for executing the foregoing determining processes is not limited in this embodiment of this application.

It should be noted that, starting time of the 180_delay_timer may be after the second terminal device 150 sends the 200 OK (UPDATE) signaling to the third radio access network device 130, and before the third radio access network device 130 delivers the voice dedicated bearer establishment instruction to the second terminal device 150. The starting time may alternatively be after the third radio access network device 130 delivers the voice dedicated bearer establishment instruction to the second terminal device 150.

Step S810: The third radio access network device 130 delivers the voice dedicated bearer establishment instruction to the second terminal device 150.

It should be noted that step S810 in FIG. 8A and FIG. 8B is the same as step S310 in FIG. 3A and FIG. 3B. For related descriptions, refer to the descriptions in step S310. Details are not described herein again.

Step S811: The second terminal device 150 sends the 180 Ringing signaling to the first terminal device 140 after the 180_delay_timer expires.

Optionally, after the second terminal device 150 finds that the establishment of the second voice bearer of the second terminal device 150 is completed through detection, the second terminal device 150 sends the 180 Ringing signaling only after the 180_delay_timer expires. After the second terminal device 150 sends the 180 Ringing signaling, a call state of the second terminal device 150 is updated to a ringing state, and the second terminal device 150 starts to ring. The ringing state refers to a state in which a user, when there is an incoming call, has not answered the call and a called terminal device rings to remind the user of the incoming call. A ringing tone used when the ringing starts includes vibration, a color ring back tone, beep, or music, a song, recording, or video that is personalized. This is not limited herein. After the third radio access network device 130 receives the 180 Ringing signaling, a network of the third radio access network device 130 is set to a connected state. The first radio access network device 110 determines that a current called terminal, that is, the second terminal device 150, is in a state in which a voice packet can be sent or received, and the first radio access network device 110 is set to a connected state, that is, a state in which a voice packet can be normally forwarded, and sends the 180 Ringing signaling to the first terminal device 140. After the first terminal device 140 receives the 180 Ringing signaling, a call state of the first terminal device 140 is updated to a ringback tone state, and the first terminal device 140 starts to play a ringback tone. The ringback tone state refers to a state in which a called user does not answer a call when the call succeeds and a caller terminal device sends a ringback tone to remind a user that the called user has not answered the call. The ringback tone includes vibration, a color ring back tone, beep, or music, a song, recording, or video that is personalized. This is not limited herein.

In some implementations, preset duration for timing of the 180_delay_timer is greater than duration in which the third radio access network device 130 sends the 200 OK (UPDATE) signaling to the first terminal device 140. Therefore, this embodiment of this application provides a method for ensuring that a time point at which the first radio access network device 110 receives the 180Ringing signaling is later than a time point at which the first radio access network device 110 receives the 200 OK (UPDATE) signaling, so that the first radio access network device 110 can normally forward a voice packet. It may be understood that the preset duration of the 180_delay_timer in this embodiment of this application may be duration that can ensure that the 180_delay_timer completes the foregoing effect, such as 0.3 s and 0.5 s. This waiting duration is not limited in this embodiment of this application.

Step S812 to step S815 in FIG. 8A and FIG. 8B are the same as step S312 to step S315 in FIG. 3A and FIG. 3B. For related descriptions, refer to the descriptions in step S312 to step S315. Details are not described herein again.

In step S809 to step S811 shown in FIG. 8A and FIG. 8B, the second terminal device 150 sends the 200 OK (UPDATE) signaling to the third radio access network device 130, and then starts the 180_delay_timer, so that the second terminal device 150 sends the 180 Ringing signaling to the first terminal device 140 only after the 180_delay_timer expires. In this embodiment of this application, it is ensured that the first radio access network device 110 first receives the 200 OK (UPDATE) signaling that includes a=curr:qos local none information, and then receives the 180 Ringing signaling, so that a network status of the first radio access network device 110 can be refreshed to a state in which a voice packet can be normally forwarded. This embodiment of this application provides a communication method for coping with the dual-terminal no sound, call drop, or call drop after no sound in the call process between the caller terminal and the called terminal due to the signaling disorder between the 180 Ringing and 200 OK (UPDATE) signaling on the network side, ensuring a normal voice for a terminal device in an abnormal scenario.

Figure 10A:
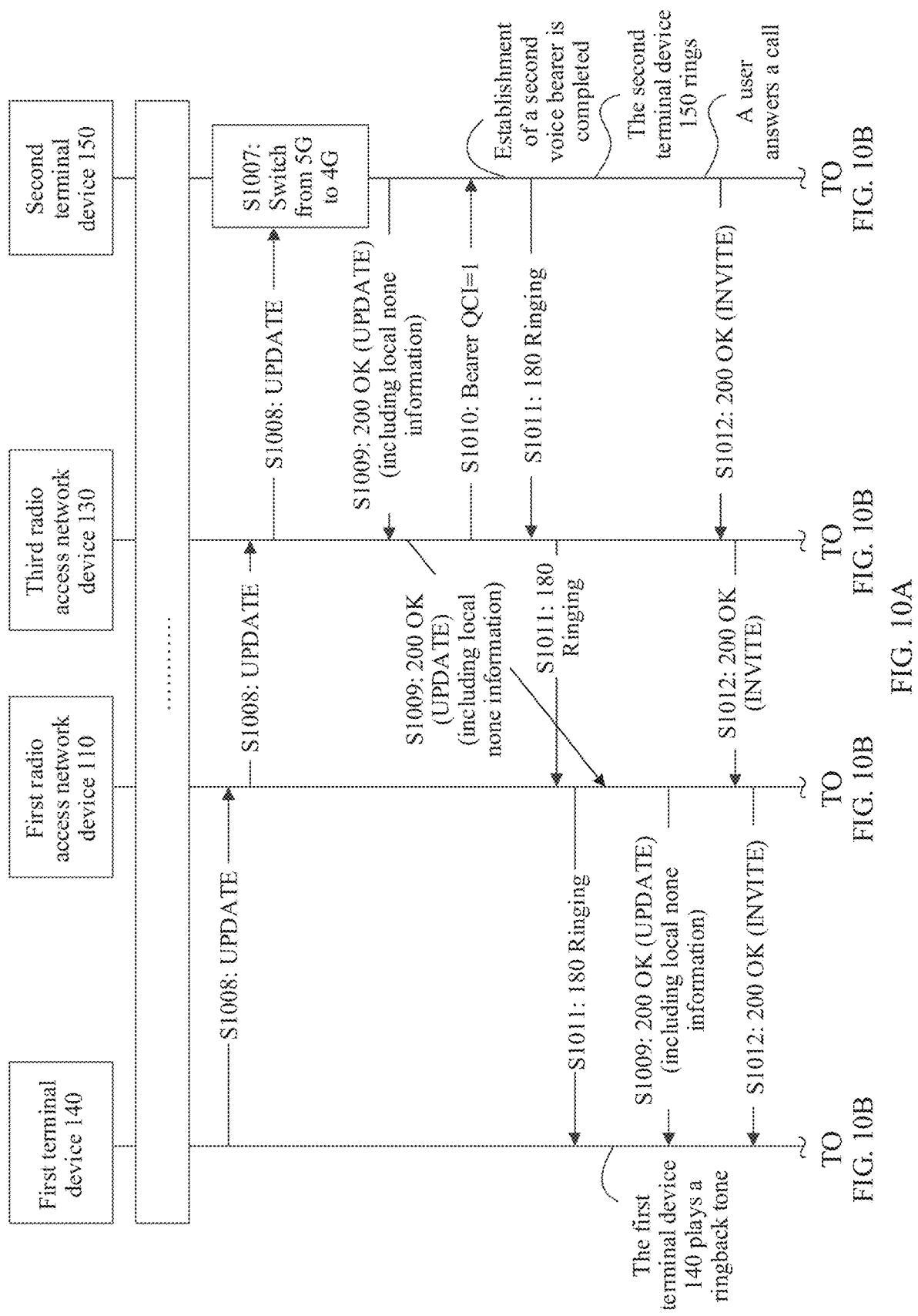
FIG. 10A to FIG. 10C are diagrams of signaling interaction of another voice call in an EPSFB scenario in a communication method according to an embodiment of this application.
Figure 10B:
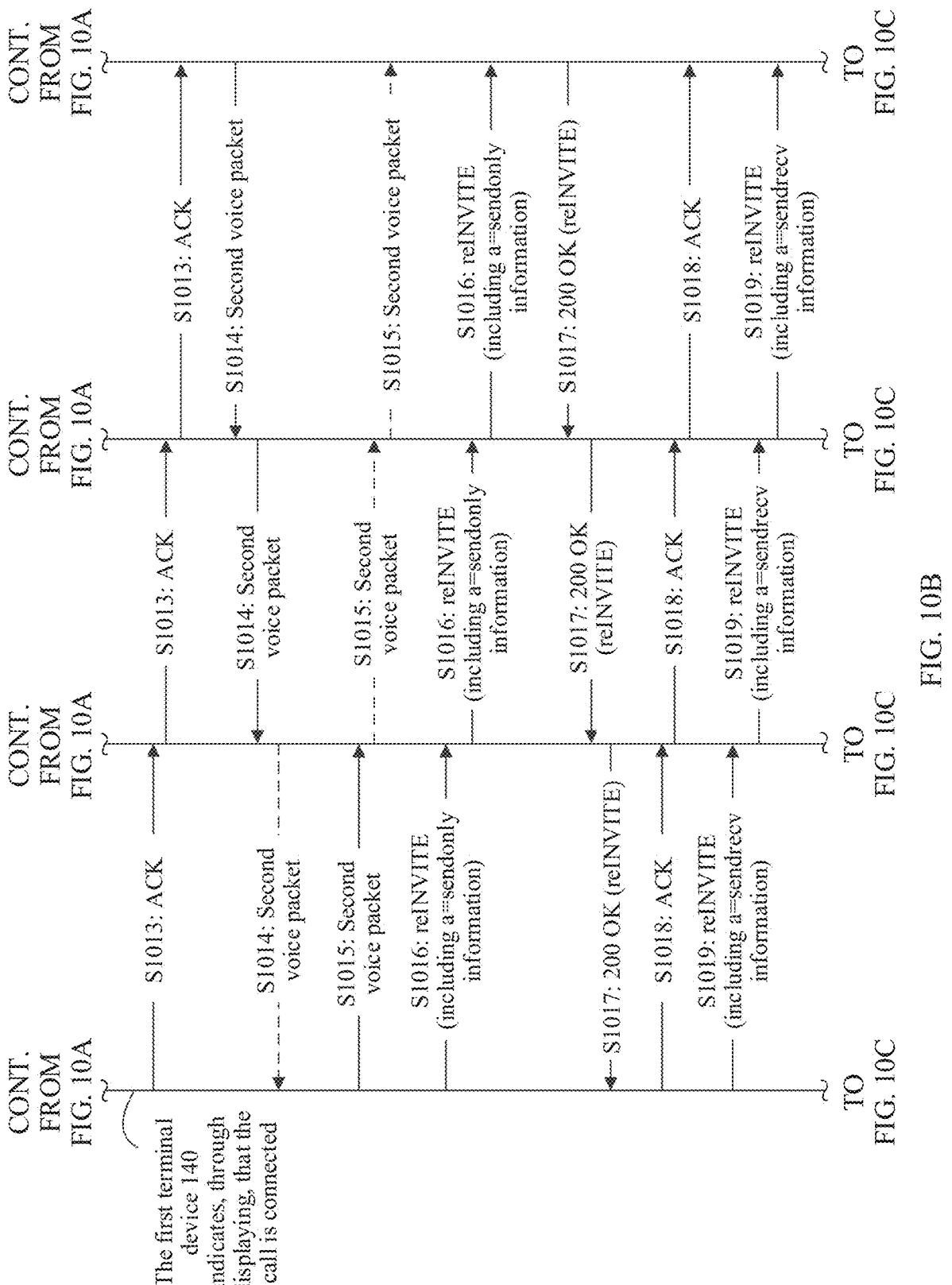
Figure 10C:
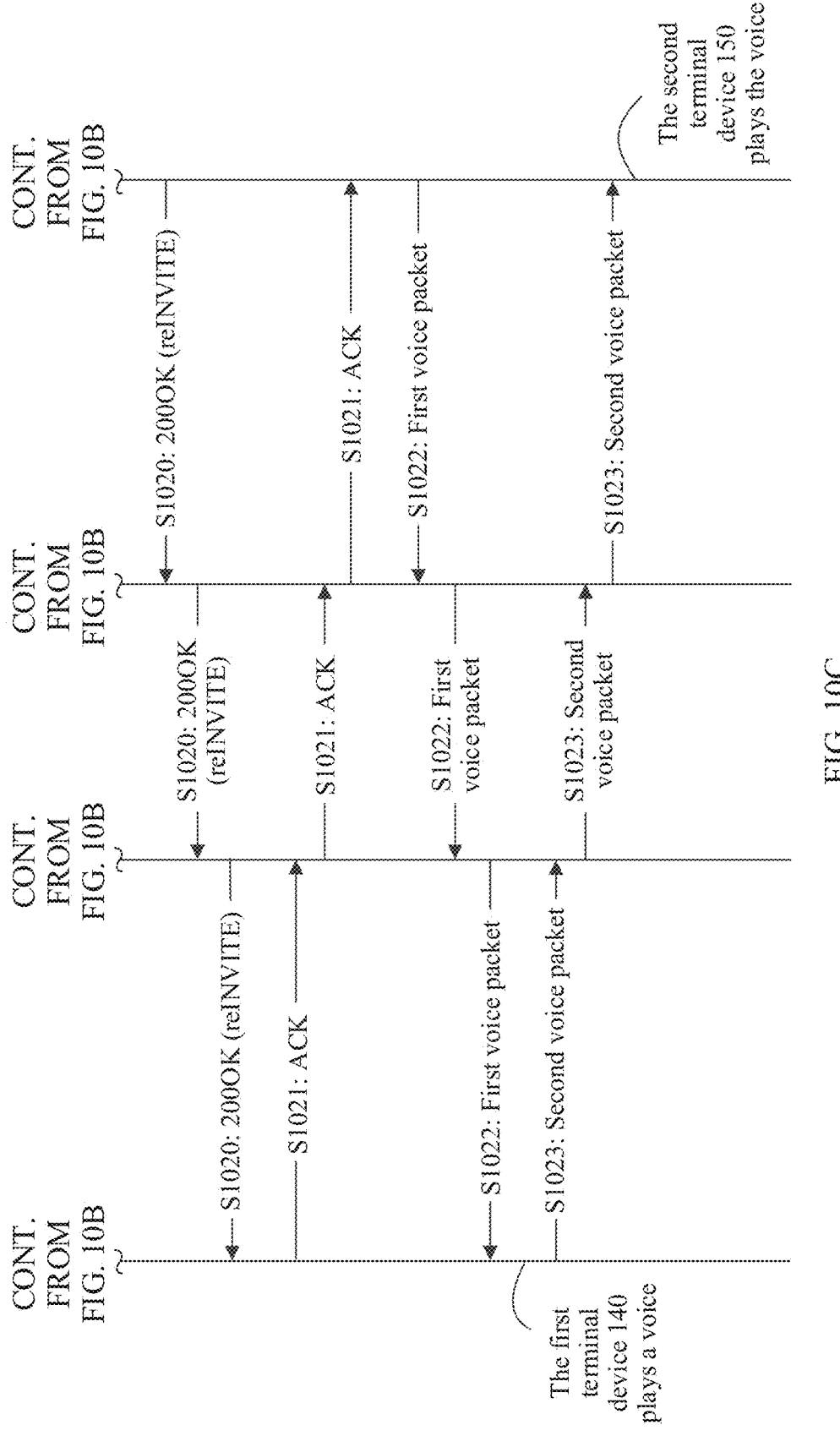

Optionally, in some other embodiments, to resolve a problem that a user cannot hear a sound after answering a call in the implementation corresponding to FIG. 5A and FIG. 5B, another communication method shown in FIG. 10A to FIG. 10C is provided. With reference to FIG. 3A and FIG. 3B, steps before step S1007 are respectively the same as step S301 to step S306 in FIG. 3A and FIG. 3B. For related descriptions, refer to the descriptions in step S301 to step S306. Details are not described herein again. With reference to FIG. 5A and FIG. 5B, in the method shown in FIG. 10A to FIG. 10C, step S1007 to step S1015 are consistent with step S507 to step S515 in FIG. 5A and FIG. 5B. After step S1013, the first terminal device 140 and the second terminal device 150 cannot receive a voice from each other. After step S1015, the method shown in FIG. 10A to FIG. 10C further includes the following steps.

Step S1016: The first terminal device 140 sends first reINVITE signaling to the second terminal device 150.

The first reINVITE signaling may be first re-request information. The first reINVITE signaling includes a=sendonly information, and the first reINVITE signaling may indicate that the first terminal device 140 notifies the second terminal device 150 that the first terminal device 140 is currently in a sendonly state.

The first reINVITE signaling may be third INVITE signaling, and the first reINVITE signaling may include an invite. The first reINVITE signaling may include an INVITE. The reINVITE signaling may be written in other forms, such as INVITE signaling, reinvite signaling, and re-invite signaling, which are subject to a related protocol. However, in this application, the reINVITE signaling is written in a unified manner for convenience of describing and representing differences from the INVITE signaling in other steps. The first reINVITE signaling includes a same SIP Call ID as the INVITE signaling in step S1001, that is, step S301. For other reINVITE signaling in this application, refer to the descriptions herein.

Optionally, the first terminal device 140 determines, based on the 180 Ringing signaling and the 200 OK (UPDATE) signaling that are received in a call establishment process, that when the following conditions of (1) the 180 Ringing signaling is first received, and then the 200 OK (UPDATE) signaling is received; and (2) in addition, the 200 OK (UPDATE) signaling includes a=curr:qos local none information are met, the first terminal device 140 sends the first reINVITE signaling to the first radio access network device 110. After receiving the first reINVITE signaling, the first radio access network device 110 sends the first reINVITE signaling to the third radio access network device 130. After receiving the first reINVITE signaling, the third radio access network device 130 sends the first reINVITE signaling to the second terminal device 150.

Figure 12:
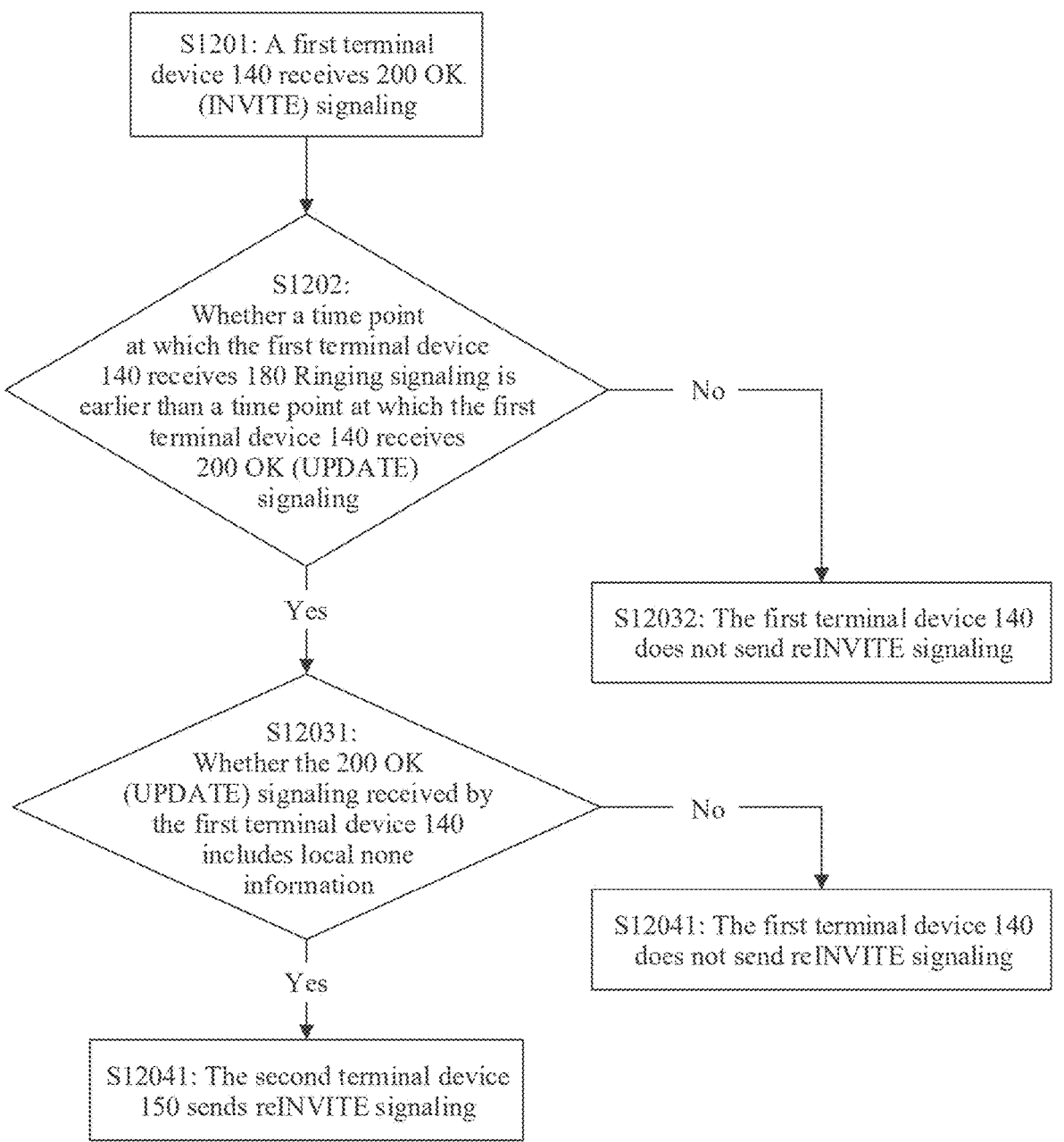
FIG. 12 is another schematic flowchart of a communication method according to an embodiment of this application.

Optionally, with reference to FIG. 12, after the first terminal device 140 receives the 200 OK (INVITE) signaling, the first terminal device 140 determines whether a time point at which the first terminal device 140 receives the 180 Ringing signaling is earlier than a time point at which the first terminal device 140 receives the 200 OK (UPDATE) signaling. When the time point at which the first terminal device 140 receives the 180 Ringing signaling is later than the time point at which the first terminal device 140 receives the 200 OK (UPDATE) signaling, the first terminal device 140 does not send the first reINVITE signaling. When the time point at which the first terminal device 140 receives the 180 Ringing signaling is earlier than the time point at which the first terminal device 140 receives the 200 OK (UPDATE) signaling, the first terminal device 140 determines whether the 200 OK (UPDATE) signaling received by the first terminal device 140 includes local none information. When the 200 OK (UPDATE) signaling received by the first terminal device 140 does not include the local none information, the first terminal device 140 does not send the first reINVITE signaling. When the 200 OK (UPDATE) signaling received by the first terminal device 140 includes the local none information, the first terminal device 140 sends the first reINVITE signaling.

Optionally, in some embodiments, the first terminal device 140 may further perform the following four determining processes: (1) determining that the first terminal device 140 supports resource reservation through a resource reservation flag bit of the first terminal device 140; (2) determining that the second terminal device 150 supports resource reservation based on a fact that a support field in the received INVITE signaling carries a precondition tag; (3) determining that a current call is an EPSFB call with reference to step S404; and (4) determining that the 180 Ringing signaling is first received, and then the 200 OK (UPDATE) signaling is received, and the 200 OK (UPDATE) signaling includes the a=curr:qos local none information. When the first terminal device 140 determines that the foregoing four conditions are met, the first terminal device 140 sends the first reINVITE signaling to the second terminal device 150, and performs the following steps. An occasion for executing the foregoing determining processes is not limited in this embodiment of this application.

Step S1017: The second terminal device 150 sends first 200 OK (reINVITE) signaling to the first terminal device 140.

The first 200 OK (reINVITE) signaling may be fourth 200 OK signaling. The first 200 OK (reINVITE) signaling may indicate that the second terminal device 150 notifies the first terminal device 140 that the second terminal device 150 has received the first reINVITE signaling, and notifies the first terminal device 140 that the second terminal device 150 is currently in a recvonly state. The first 200 OK (reINVITE) signaling includes a=recvonly.

The first 200 OK (reINVITE) signaling may be written in other forms, such as 200 OK signaling and 200 OK (REINVITE) signaling, which are subject to a related protocol. However, in this application, the 200 OK (reINVITE) signaling is written in a unified manner for convenience of describing and representing differences from the 200 OK signaling in other steps. For other 200 OK (reINVITE) signaling in this application, refer to the descriptions herein.

Optionally, after the second terminal device 150 receives the first reINVITE signaling, the second terminal device 150 sends the first 200 OK (reINVITE) signaling to the third radio access network device 130. After receiving the first 200 OK (reINVITE) signaling, the third radio access network device 130 sends the first 200 OK (reINVITE) signaling to the first radio access network device 110. After receiving the first 200 OK (reINVITE) signaling, the first radio access network device 110 sends the first 200 OK (reINVITE) signaling to the first terminal device 140.

Step S1018: The first terminal device 140 sends first ACK signaling to the second terminal device 150.

The first ACK signaling may be third acknowledgment information, and the first ACK signaling may indicate that the first terminal device 140 acknowledges to the second terminal device 150 that the first terminal device 140 has received the first 200 OK (reINVITE) signaling sent by the second terminal device 150 to the first terminal device 140.

Optionally, after the first terminal device 140 receives the first 200 OK (reINVITE) signaling, the first terminal device

140 sends the first ACK signaling to the first radio access network device 110. The first radio access network device 110 sends the first ACK signaling received from the first terminal device 140 to the third radio access network device 130. After the third radio access network device 130 receives the first ACK signaling, the third radio access network device 130 sends the received first ACK signaling to the second terminal device 150.

Step S1019: The first terminal device 140 sends second reINVITE signaling to the second terminal device 150.

The second reINVITE signaling may be second re-request information. The second reINVITE signaling includes a=sendrecv information, and the second reINVITE signaling may indicate that the first terminal device 140 notifies the second terminal device 150 that the first terminal device 140 is currently in a sendrecv state. The second reINVITE signaling may be second INVITE signaling, and the second reINVITE signaling may include an invite. The second reINVITE signaling includes a same SIP Call ID as the first INVITE signaling in step S1001, that is, step S301.

Optionally, the first terminal device 140 sends the second reINVITE signaling to the first radio access network device 110. After receiving the second reINVITE signaling, the first radio access network device 110 sends the second reINVITE signaling to the third radio access network device 130. After receiving the second reINVITE signaling, the third radio access network device 130 sends the second reINVITE signaling to the second terminal device 150.

Step S1020: The second terminal device 150 sends second 200 OK (reINVITE) signaling to the first terminal device 140.

The second 200 OK (reINVITE) signaling may be fifth response information. The second 200 OK (reINVITE) signaling may indicate that the second terminal device 150 notifies the first terminal device 140 that the second terminal device 150 has received the second reINVITE signaling, and notifies the first terminal device 140 that the second terminal device 150 is currently in a sendrecv state. The second 200 OK (reINVITE) signaling includes 200 OK and a=sendrecv.

Optionally, after the second terminal device 150 receives the second reINVITE signaling, the second terminal device 150 sends the second 200 OK (reINVITE) signaling to the third radio access network device 130. After receiving the second 200 OK (reINVITE) signaling, the third radio access network device 130 sends the second 200 OK (reINVITE) signaling to the first radio access network device 110. After receiving the second 200 OK (reINVITE) signaling that includes the sendrecv information, the first radio access network device 110 determines that a state of normally sending and receiving a voice packet is recovered. After receiving the second 200 OK (reINVITE) signaling, the first radio access network device 110 sends the second 200 OK (reINVITE) signaling to the first terminal device 140.

Step S1021: The first terminal device 140 sends second ACK signaling to the second terminal device 150.

The second ACK signaling may be fourth acknowledgment information, and the second ACK signaling may indicate that the first terminal device 140 acknowledges to the second terminal device 150 that the first terminal device 140 has received the second 200 OK (reINVITE) signaling sent by the second terminal device 150 to the first terminal device 140 for a second time.

Optionally, after the first terminal device 140 receives the second 200 OK (reINVITE) signaling, the first terminal device 140 sends the second ACK signaling to the first radio access network device 110. The first radio access network device 110 sends the second ACK signaling received from the first terminal device 140 to the third radio access network device 130. After the third radio access network device 130 receives the second ACK signaling, the third radio access network device 130 sends the received second ACK signaling to the second terminal device 150.

It should be noted that step S1022 and step S1023 in FIG. 10A to FIG. 10C are respectively the same as step S314 and step S315 in FIG. 3A and FIG. 3B. For related descriptions, refer to the descriptions in step S314 and step S315. Details are not described herein again.

In step S1016 to step S1021 shown in FIG. 10A to FIG. 10C, when the condition described in step S1016 is met, the first terminal device 140 actively sends the first reINVITE signaling and the second reINVITE signaling to the second terminal device 150, where the first reINVITE signaling and the second reINVITE signaling respectively include the a=sendonly information and the a=sendrecv information. The first radio access network device 110 determines that the second terminal device is in a state in which a voice packet can be normally sent or received, so that the first radio access network device 110 is set to a state in which a voice packet can be normally forwarded. Therefore, the user B can normally hear a sound after a phone call is connected, ensuring a normal voice for a terminal device in an abnormal scenario.

Figure 11A:
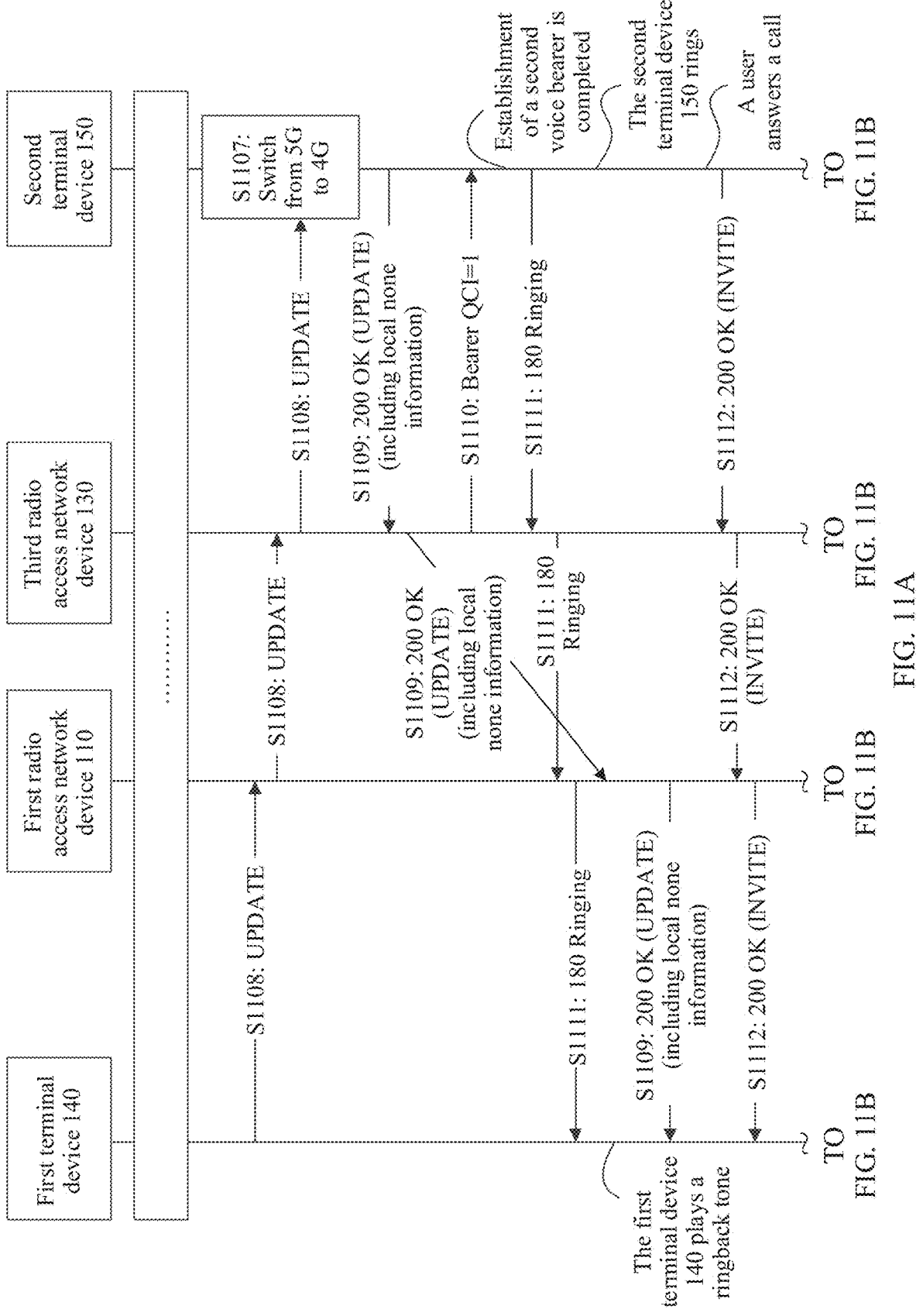
FIG. 11A and FIG. 11B are diagrams of signaling interaction of another voice call in an EPSFB scenario in a communication method according to an embodiment of this application.
Figure 11B:
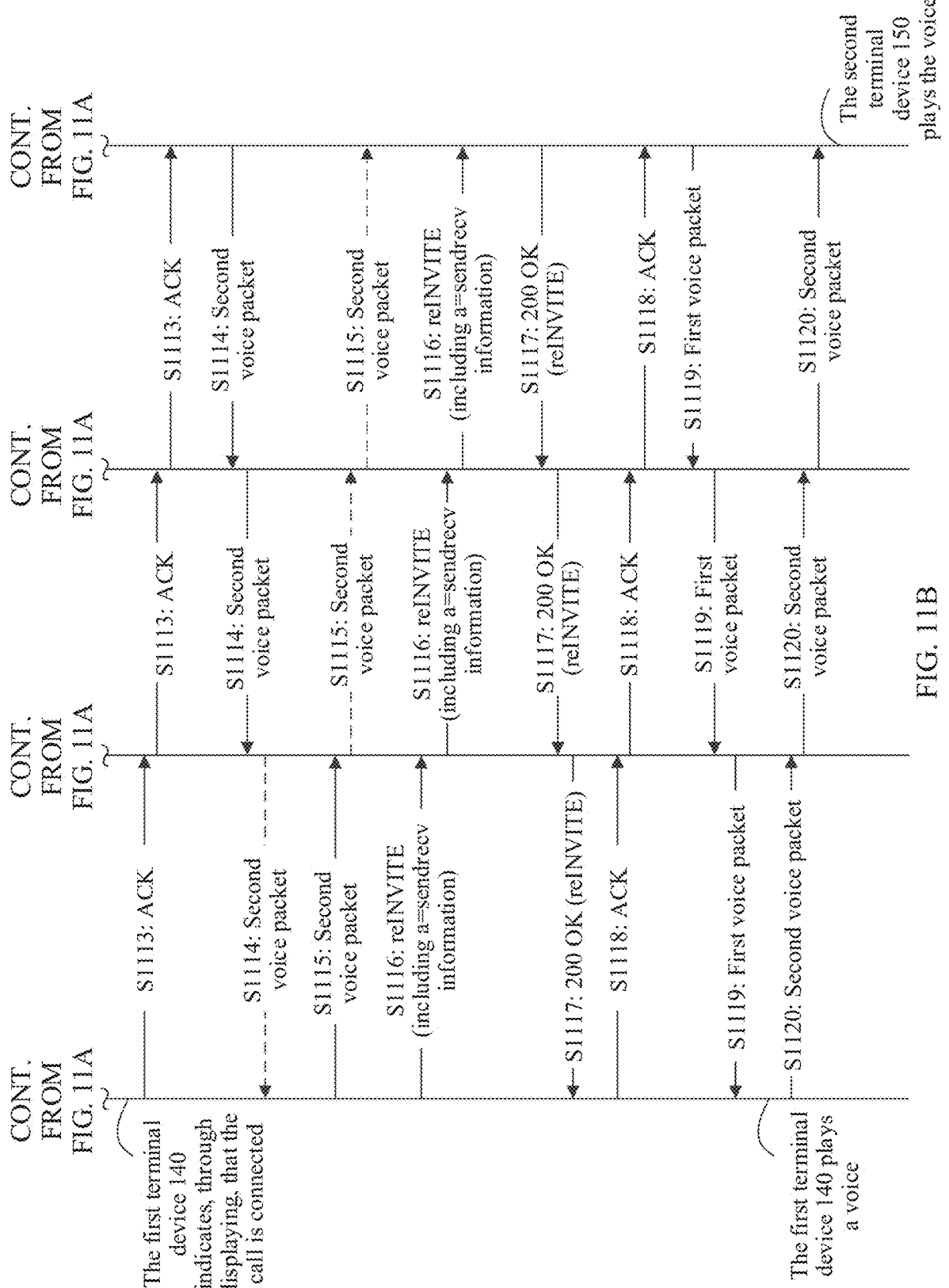

Optionally, in some other embodiments, to resolve a problem that a user cannot hear a sound after answering a call in the implementation corresponding to FIG. 5A and FIG. 5B, another communication method shown in FIG. 11A and FIG. 11B is provided. With reference to FIG. 3A and FIG. 3B, steps before step S1107 are respectively the same as step S301 to step S308 in FIG. 3A and FIG. 3B. For related descriptions, refer to the descriptions in step S301 to step S308. Details are not described herein again. With reference to FIG. 5A and FIG. 5B, in the method shown in FIG. 11A and FIG. 11B, step S1109 to step S1115 are consistent with step S509 to step S515 in FIG. 5A and FIG. 5B. After step S1113, the first terminal device 140 and the second terminal device 150 cannot receive a voice from each other. After step S1115, the method shown in FIG. 11A and FIG. 11B further includes the following steps.

Step S1116: The first terminal device 140 sends third reINVITE signaling to the second terminal device 150.

The third reINVITE signaling may be third re-request information. The third reINVITE signaling includes a=sendrecv information, and the third reINVITE signaling may indicate that the first terminal device 140 notifies the second terminal device 150 that the first terminal device 140 is currently in a sendrecv state. The third reINVITE signaling may be second INVITE signaling, and the third reINVITE signaling may include an invite. The third reINVITE signaling includes a same SIP Call ID as the first INVITE signaling in step S1001, that is, step S301.

Optionally, the first terminal device 140 determines, based on the 180 Ringing signaling and the 200 OK (UPDATE) signaling that are received in a call establishment process, that when the following conditions of (1) the 180 Ringing signaling is first received, and then the 200 OK (UPDATE) signaling is received; and (2) in addition, the 200 OK (UPDATE) signaling includes a=curr:qos local none information are met, the first terminal device 140 sends the third reINVITE signaling to the first radio access network device 110; after receiving the third reINVITE signaling, the first radio access network device 110 sends the third reINVITE signaling to the third radio access network device 130; and after receiving the third reINVITE signaling, the third radio access network device 130 sends the third reINVITE signaling to the second terminal device 150.

Optionally, with reference to FIG. 12, after the first terminal device 140 receives the 200 OK (INVITE) signaling, the first terminal device 140 determines whether a time point at which the first terminal device 140 receives the 180 Ringing signaling is earlier than a time point at which the first terminal device 140 receives the 200 OK (UPDATE) signaling. When the time point at which the first terminal device 140 receives the 180 Ringing signaling is later than the time point at which the first terminal device 140 receives the 200 OK (UPDATE) signaling, the first terminal device 140 does not send the reINVITE signaling. When the time point at which the first terminal device 140 receives the 180 Ringing signaling is earlier than the time point at which the first terminal device 140 receives the 200 OK (UPDATE) signaling, the first terminal device 140 determines whether the 200 OK (UPDATE) signaling received by the first terminal device 140 includes local none information. When the 200 OK (UPDATE) signaling received by the first terminal device 140 does not include the local none information, the first terminal device 140 does not send the reINVITE signaling. When the 200 OK (UPDATE) signaling received by the first terminal device 140 includes the local none information, the first terminal device 140 sends the reINVITE signaling.

Optionally, in some embodiments, the first terminal device 140 may further perform the following four determining processes: (1) determining that the first terminal device 140 supports resource reservation through a resource reservation flag bit of the first terminal device 140; (2) determining that the second terminal device 150 supports resource reservation based on a fact that a support field in the received INVITE signaling carries a precondition tag; (3) determining that a current call is an EPSFB call with reference to step S404; and (4) determining that the 180 Ringing signaling is first received, and then the 200 OK (UPDATE) signaling is received, and the 200 OK (UPDATE) signaling includes the a=curr:qos local none information. When the first terminal device 140 determines that the foregoing four conditions are met, the first terminal device 140 sends the third reINVITE signaling to the second terminal device 150, and performs the following steps. An occasion for executing the foregoing determining processes is not limited in this embodiment of this application.

Step S1117: The second terminal device 150 sends third 200 OK (reINVITE) signaling to the first terminal device 140.

The third 200 OK (reINVITE) signaling may be fifth 200 OK signaling. The third 200 OK (reINVITE) signaling may indicate that the second terminal device 150 notifies the first terminal device 140 that the second terminal device 150 has received the third reINVITE signaling, and notifies the first terminal device 140 that the second terminal device 150 is currently in a sendrecv state. The third 200 OK (reINVITE) signaling includes 200 OK and a=sendrecv.

Optionally, after the second terminal device 150 receives the third reINVITE signaling, the second terminal device 150 sends the third 200 OK (reINVITE) signaling to the third radio access network device 130. After receiving the third 200 OK (reINVITE) signaling, the third radio access network device 130 sends the third 200 OK (reINVITE) signaling to the first radio access network device 110. After receiving the third 200 OK (reINVITE) signaling that includes the sendrecv information, the first radio access network device 110 recovers to a state of normally sending and receiving a voice packet. After receiving the third 200

OK (reINVITE) signaling, the first radio access network device 110 sends the third 200 OK (reINVITE) signaling to the first terminal device 140.

Step S1118: The first terminal device 140 sends ACK signaling to the second terminal device 150.

The ACK signaling may be fifth acknowledgment information, and the ACK signaling may indicate that the first terminal device 140 acknowledges to the second terminal device 150 that the first terminal device 140 has received the third 200 OK (reINVITE) signaling sent by the second terminal device 150 to the first terminal device 140.

Optionally, after the first terminal device 140 receives the third 200 OK (reINVITE) signaling, the first terminal device 140 sends the ACK signaling to the first radio access network device 110. The first radio access network device 110 sends the ACK signaling received from the first terminal device 140 to the third radio access network device 130. After the third radio access network device 130 receives the ACK signaling, the third radio access network device 130 sends the received ACK signaling to the second terminal device 150.

It should be noted that step S1119 and step S1120 in FIG. 11A and FIG. 11B are respectively the same as step S314 and step S315 in FIG. 3A and FIG. 3B. For related descriptions, refer to the descriptions in step S314 and step S315. Details are not described herein again.

In step S1118 to step S1120 shown in FIG. 11A and FIG. 11B, when the condition described in step S1118 is met, the first terminal device 140 actively sends the reINVITE signaling to the second terminal device 150, where the reIN-VITE signaling includes the a=sendrecv information. After receiving the third 200 OK (reINVITE) signaling, a network status of the first radio access network device 110 determines that the second terminal device 150 can normally send or receive a voice packet, and a state of the first radio access network device 110 is set to a state in which a voice packet can be normally sent or received. Therefore, the user B can normally hear a sound after a phone call is connected, ensuring a normal voice for a terminal device in an abnormal scenario.

It should be noted that the interaction diagrams shown in FIG. 2A and FIG. 2B to FIG. 12 are merely for ease of understanding, and are not intended to limit the embodiments of this application to the examples shown in the figures. Actually, a person skilled in the art may perform equivalent transformation based on the examples in FIG. 2A and FIG. 2B to FIG. 12 to obtain more implementations.

The foregoing describes in detail the communication methods provided in the embodiments of this application with reference to FIG. 2A and FIG. 2B to FIG. 12. An apparatus embodiment of this application is described in detail below with reference to FIG. 13. It should be noted that a communication apparatus in this embodiment of this application may execute the various communication methods in the foregoing embodiments of this application. That is, for a specific operating process of the following various products, refer to corresponding processes in the foregoing method embodiments.

The processing methods for call requests provided in the embodiments of this application may all be applied to an electronic device supporting calls such as a mobile phone, a tablet computer, a desktop computer, a laptop computer, a notebook computer, an ultra-mobile personal computer (UMPC), a handheld computer, a netbook, a personal digital assistant (PDA), a wearable electronic device, or a smart-watch. The foregoing UE may alternatively be a type of the electronic device.

Figure 13:
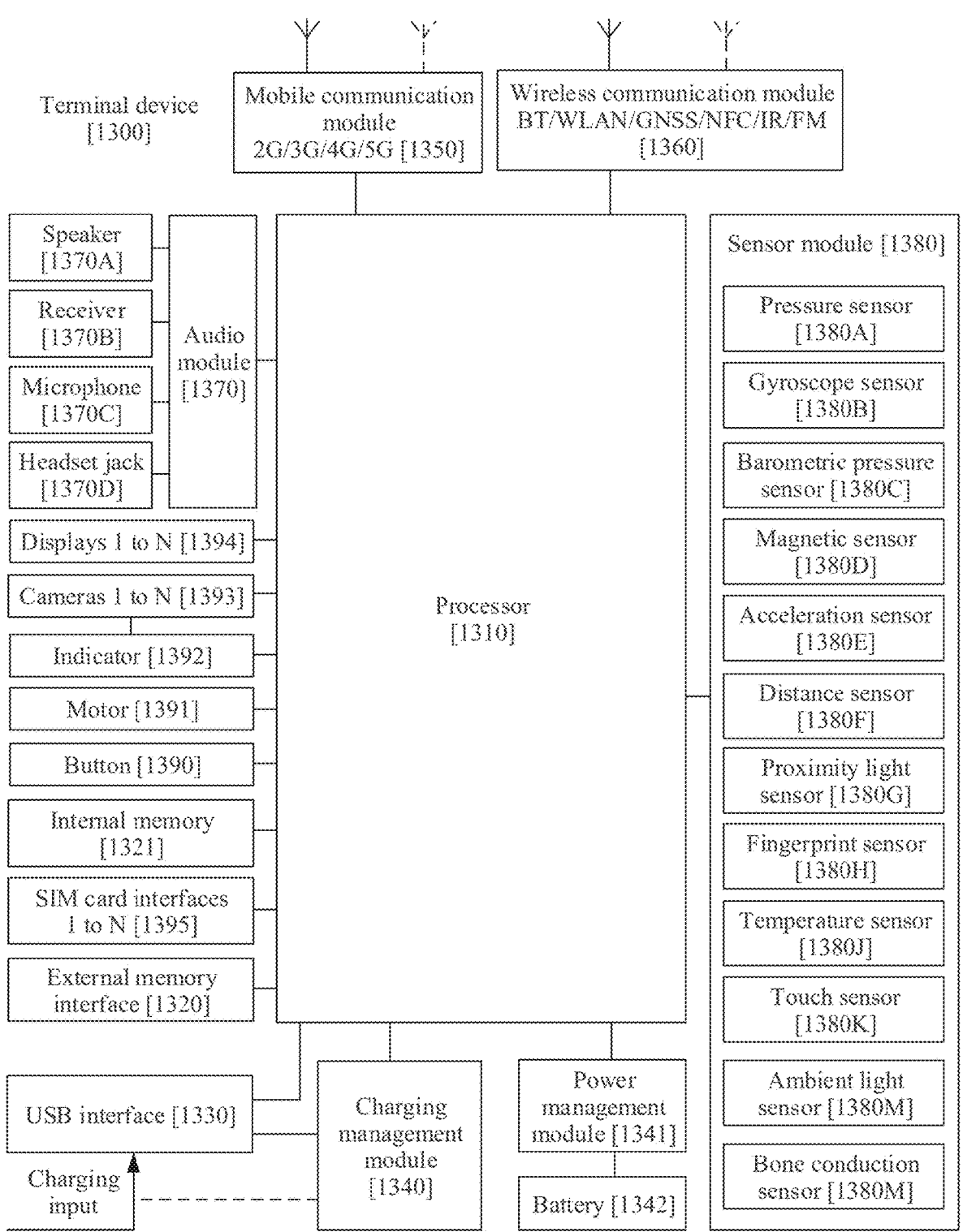
FIG. 13 is a schematic diagram of composition of an electronic device according to an embodiment of this application.

For example, a hardware structure of a terminal device is described. FIG. 13 is a schematic diagram of a structure of an example of a terminal device according to an embodiment of this application. A terminal device 1300 may include a processor 1310, a power management module 1341, a battery 1342, an audio module 1370, a sensor module 1380, and a display 1394.

The sensor module includes a touch sensor 1380K. The touch sensor 1380K may be a touchscreen, or may be also referred to as a "touch panel". The touch sensor 1380K may be disposed together with the display 1394. The touch sensor 1380K and the display 1394 form a touchscreen, which is also referred to as a "touchscreen". The touch sensor 1380K is configured to detect a touch operation performed on or near the touch sensor 1380K. The touch sensor may transmit the detected touch operation to an application processor, to determine a touch event type. The touch sensor may provide, by using the display 1394, a visual output related to the touch operation. In some other embodiments, the touch sensor 1380K may be disposed on a surface of the terminal device 1300, and is located at a position different from that of the display 1394. The display 1394 is configured to display an image, a video, and the like.

The processor 1310 may include one or more processing units. For example, the processor 1310 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be separate devices, or may be integrated into one or more processors. A memory may be further disposed in the processor 1310, and is configured to store instructions and data. In some embodiments, the processor 1310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It can be understood that an interface connection relationship between the modules illustrated in this embodiment is merely an example for description, and constitutes no limitation on a structure of the electronic device 1300. In some other embodiments of this application, the electronic device 1300 may alternatively use an interface connection manner different from that in the foregoing embodiment, or use a combination of a plurality of interface connection manners.

Optionally, the terminal device 1300 may further include an external memory interface 1320, an internal memory 1321, a universal serial bus (USB) interface 1330, a charging management module 1340, an antenna 1, an antenna 2, a mobile communication module 1350, a wireless communication module 1360, a button 1390, a motor 1391, an indicator 1392, a camera 1393, a subscriber identity module (SIM) card interface 1395, and the like.

The internal memory 1321 may be configured to store computer-executable program code, and the executable program code includes instructions. The processor 1310 executes various functional applications and data processing of the electronic device 1300 by running the instructions stored in the internal memory 1321. The internal memory 1321 may include a program storage area and a data storage area. The program storage area may store an operating system, an application required by at least one function (such as a sound playback function and an image playback function), and the like. The data storage area may store data (such as audio data or an address book) and the like created during use of the electronic device. In addition, the internal memory 1321 may include a high-speed random access memory, and may further include a non-volatile memory, such as at least one magnetic disk storage device, a flash memory device, or a universal flash storage (UFS). The processor 1310 executes various functional applications and data processing of the electronic device by running the instructions stored in the internal memory 1321 and/or instructions stored in a memory disposed in the processor.

The electronic device implements a display function through the GPU, the display 1330, and the application processor. The GPU is a microprocessor for image processing and is connected to the display 1330 and the application processor. The GPU is configured to perform mathematical and geometric calculations and graphics rendering. The processor 1310 may include one or more GPUs, and execute program instructions to generate or change display information.

The display 1330 is configured to display an image, a video, and the like. The display 1330 includes a display panel. The display panel may be a liquid crystal display (LCD), an organic light-emitting diode (OLED), an active-matrix organic light emitting diode (AMOLED), a flex light-emitting diode (FLED), a Mini-LED, a Micro-LED, a Micro-OLED, a quantum dot light emitting diode (QLED), or the like. In some embodiments, the electronic device may include one or N displays 1330, where N is a positive integer greater than 1.

The electronic device may implement a shooting function through the ISP, the camera 1340, the video codec, the GPU, the display 1330, the application processor, and the like.

The ISP is configured to process data fed back by the camera 1340. For example, during photographing, a shutter is enabled. Light is transferred to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may further perform algorithm optimization on noise, brightness, and complexion of the image. The ISP may further optimize parameters such as exposure and color temperature of a photographing scene. In some embodiments, the ISP may be disposed in the camera 1340.

A wireless communication function of the electronic device may be implemented through the antenna 1, the antenna 2, the mobile communication module 1350, the wireless communication module 1360, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may be multiplexed to improve utilization of the antennas. For example, the antenna 1 may be multiplexed as a diversity antenna of a wireless local area network. In some other embodiments, the antennas may be used in combination with a tuning switch.

The mobile communication module 1350 may provide a solution for wireless communication such as 2G/3G/4G/5G applied to the electronic device. The mobile communication module 1350 may include at least one filter, a switch, a power amplifier, a low noise amplifier (LNA), or the like. The mobile communication module 1350 may receive an electromagnetic wave through the antenna 1, perform processing such as filtering or amplification on the received electromagnetic wave, and transfer a processed electromagnetic wave to the modem processor for demodulation. The mobile communication module 1350 may further amplify a signal modulated by the modem processor, and convert an amplified signal into an electromagnetic wave through the antenna 1 for radiation. In some embodiments, at least some functional modules of the mobile communication module 1350 may be disposed in the processor 1310. In some embodiments, at least some functional modules of the mobile communication module 1350 may be disposed in a same device as at least some modules of the processor 1310.

In some embodiments, the electronic device initiates or receives a call request through the mobile communication module 1350 and the antenna 1.

The wireless communication module 1360 may provide a solution for wireless communication to be applied to the electronic device, including a wireless local area network (WLAN) (such as a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 1360 may be one or more devices integrated with at least one communication processing module. The wireless communication module 1360 receives an electromagnetic wave through the antenna 3, performs processing of frequency modulation and filter on an electromagnetic wave signal, and sends a processed signal to the processor 1310. The wireless communication module 1360 may further receive a to-be-sent signal from the processor 1310, perform frequency modulation and amplification on the to-be-sent signal, and convert a processed signal into an electromagnetic wave through the antenna 2 for radiation.

Optionally, in an implementation, the audio module 1370 may include a speaker 1370A, a receiver 1370B, a microphone 1370C, and a headset jack 1370D. The sensor module 1380 may include the touch sensor 1380K, and may further include at least one of a pressure sensor 1380A, a gyroscope sensor 1380B, a barometric pressure sensor 1380C, a magnetic sensor 1380D, an acceleration sensor 1380E, a distance sensor 1380F, a proximity light sensor 1380G, a fingerprint sensor 1380H, a temperature sensor 1380J, an ambient light sensor 1380L, a bone conduction sensor 1380M, and the like.

The electronic device 1300 may implement an audio function such as music playback, recording, and the like by using the audio module 1370, the speaker 1370A, the receiver 1370B, the microphone 1370C, the headset jack 1370D, the application processor, and the like.

The audio module 1370 is configured to convert digital audio information into an analog audio signal output, and is further configured to convert an analog audio input into a digital audio signal. The audio module 1370 may be further configured to encode and decode an audio signal. In some embodiments, the audio module 1370 may be disposed in the processor 1310, or some functional modules of the audio module 1370 are disposed in the processor 1310.

The speaker 1370A, also referred to as a "horn", is configured to convert an audio electrical signal into a sound signal. The electronic device 1300 may be used to listen to music or answer a hands-free call through the speaker 1370A.

The receiver 1370B, also referred to as an "earpiece", is configured to convert an audio electrical signal into a sound signal. When the electronic device 1300 answers a phone call or a voice message, the receiver 1370B may be placed near a person's ear to answer the voice.

The microphone 1370C, also referred to as a "mouthpiece" or a "megaphone", is configured to convert a sound signal into an electrical signal. When making a call or sending a voice message, a user may make a sound by approaching a mouth to the microphone 1370C, to input a sound signal to the microphone 1370C. At least one microphone 1370C may be disposed in the electronic device 1300. In some other embodiments, two microphones 1370C may be disposed in the electronic device 1300, which may further implement a noise reduction function in addition to collecting a sound signal. In some other embodiments, three, four, or more microphones 1370C may alternatively be disposed in the electronic device 1300 to collect a sound signal and reduce noise. This may further identify a sound source, and implement a directional recording function and the like.

The headset jack 1370D is configured to connect to a wired headset. The headset jack 1370D may be a USB interface, or may be a 3.5 mm open mobile terminal platform (OMTP) standard interface or a cellular telecommunications industry association of the USA (CTIA) standard interface.

It should be noted that a structure shown in this embodiment of this application does not constitute a specific limitation on the terminal device 1300. In some other embodiments of this application, the terminal device 1300 may include more or fewer components than those shown in the figure, some components may be combined, some components may be split, or different component arrangements may be used. The components shown in the figure may be implemented by hardware, software, or a combination of software and hardware.

In addition, an operating system, for example, an iOS operating system, an Android operating system, a Windows operating system, or the like, runs on the foregoing components. An application may be installed and run on the operating system.

Figure 14:
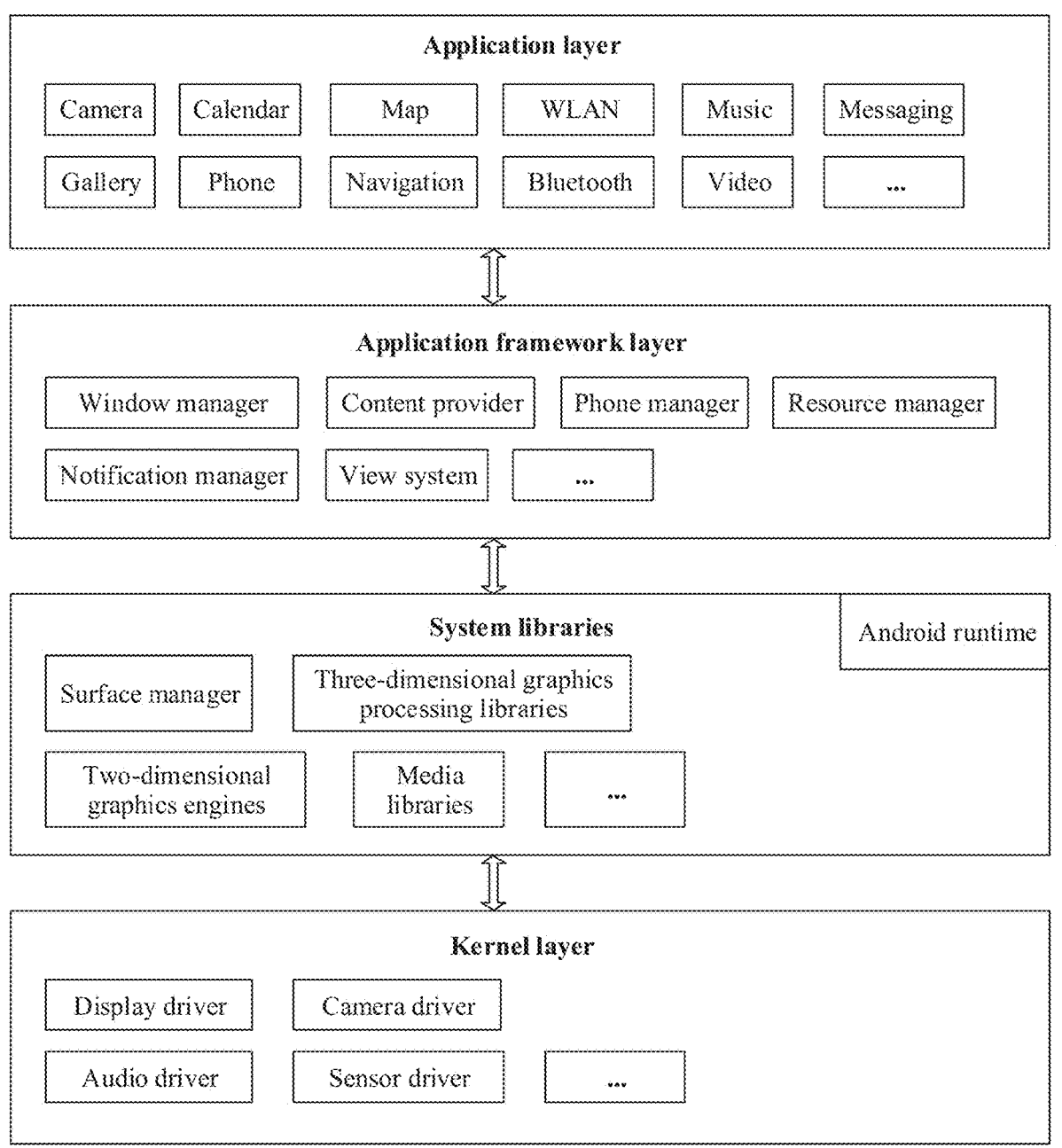
FIG. 14 is a block diagram of a software architecture of an electronic device according to an embodiment of this application.

For example, a software architecture of a terminal device is described. The terminal device may be the terminal device 1300 shown in FIG. 13. A software system of the terminal device may use a layered architecture, an event-driven architecture, a microkernel architecture, a micro service architecture, or a cloud architecture. In this embodiment of this application, a software system with a layered architecture is used as an example to describe a software architecture of the terminal device 1300. FIG. 14 is a block diagram of a software architecture of an example of a terminal device according to an embodiment of this application. FIG. 14 uses the software architecture of the terminal device 1300 shown in FIG. 13 as an example for description. FIG. 14 is a block diagram of a software architecture of an electronic device according to an embodiment of this application.

The layered architecture divides software into several layers, with each layer having a clear role and responsibilities. Layers communicate with each other through a software interface. In some embodiments, the Android system is divided, from top to bottom, into four layers: an application layer, an application framework layer, an Android runtime and system library, and a kernel layer.

The application layer may include a series of application packages. As shown in FIG. 14, the application packages may include applications such as Camera, Gallery, Calendar, Calls, Map, Navigation, WLAN, Bluetooth, Music, Videos, and Messages.

The application framework layer provides an application programming interface (API) and a programming framework for an application at the application layer. The application framework layer includes some predefined functions. As shown in FIG. 14, the application framework layer may include a window manager, a content provider, a phone manager, a resource manager, a notification manager, a view system, and the like.

The window manager is configured to manage a window program. The window manager may obtain a size of a display, determine whether there is a status bar, perform screen locking, take a screenshot, and the like.

The content provider is configured to store and obtain data, so that the data can be accessed by an application. The data may include a video, an image, audio, calls that are made and answered, a browsing history, a bookmark, an address book, and the like.

The phone manager is configured to provide a communication function for the electronic device, for example, call state management (including connecting, hang-up, and the like).

The resource manager provides an application with various resources such as a localized character string, an icon, an image, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on atop status bar of a system in a form of a graph or a scroll bar text, for example, a notification of an application running on the background, or may be a notification that appears on a screen in a form of a dialog window. For example, text information is prompted on a status bar, a prompt tone is made, the electronic device vibrates, or an indicator light flashes.

The view system includes a visual control such as a control for text display or a control for picture display. The view system may be configured to create an application. A display interface may be formed by one or more views. For example, a display interface including an SMS notification icon may include a view for text display and a view for picture display.

A kernel library includes two parts: One part is a functional function that needs to be invoked by a java language, and the other part is a kernel library of Android.

The application layer and the application framework layer are run in a virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library, a three-dimensional graphics processing library (for example, OpenGL ES), and a two-dimensional graphics engine (for example, SGL).

The surface manager is configured to manage a display subsystem, and provide fusion of 2D and 3D layers for a plurality of applications.

The media library supports playback and recording of a plurality of common audio and video formats, a static image file, and the like. The media library may support a plurality of audio and video encoding formats, such as MPEG 2, H.262, MP3, AAC, AMR, JPG, and PNG.

The three-dimensional graphics processing library is configured to implement three-dimensional graphics drawing, image rendering and composition, layer processing, and the like.

The two-dimensional graphics engine is a drawing engine for 2D drawing.

The kernel layer is a layer between hardware and software. The kernel layer includes at least a display driver, a camera driver, an audio driver, a sensor driver, and the like.

It should be noted that although in this embodiment of this application, the Android system is used as an example for description, the basic principle thereof is also applicable to electronic devices based on operating systems such as iOS and Windows.

Figure 15:
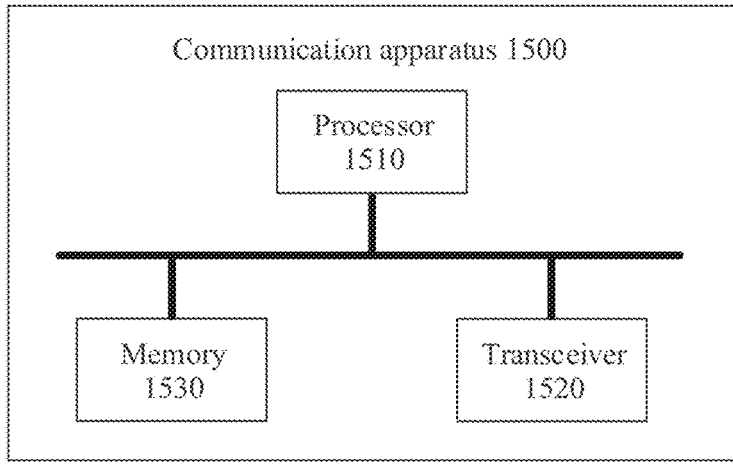
FIG. 15 is a schematic block diagram of a communication apparatus according to an embodiment of this application.

FIG. 15 is a schematic block diagram of a communication apparatus according to an embodiment of this application. The communication apparatus embodiments are corresponding to the method embodiments. For similar descriptions, refer to the method embodiments. A communication apparatus 1500 shown in FIG. 15 may be configured to support execution of all steps that are performed by the first terminal device 140 and the second terminal device 150 and that are corresponding to the embodiments in FIG. 2A and FIG. 2B to FIG. 12. The communication apparatus 1500 includes a processor 1510, a memory 1520, and an antenna 1530. The processor 1510, the memory 1520, and the antenna 1530 are connected through communication. The memory 1520 stores instructions. The processor 1510 is configured to execute the instructions stored in the memory 1520. The antenna 1530 is configured to perform specific signal transmitting and receiving driven by the processor 1510.

The processor 1510 is configured to: when the first terminal device 140 initiates a call to the second terminal device 150, receive INVITE signaling sent by the first terminal device 150; send first signaling to the first terminal device 150 based on the INVITE signaling, where the first signaling includes 200 OK and a=curr:qos local sendrecv, the first signaling is sent before second signaling is received, and the second signaling includes QCI=1; and after the call is connected, receive voice data sent by the first terminal device 150.

Components in the communication apparatus 1500 are connected to each other through communication. To be specific, the processor 1510, the memory 1520, and the antenna 1530 communicate with each other through an internal connection path to transmit control and/or data signals. The foregoing method embodiments of this application may be applied to a processor, or a processor implements the steps of the method embodiments. The processor may be an integrated circuit chip, and has a signal processing capability. In an implementation process, the steps of the foregoing method embodiments may be implemented by using an integrated logic circuit of hardware in the processor or implemented by using instructions in a form of software. The processor may be a central processing unit (CPU), a network processor (NP) or a combination of a CPU and an NP, a digital signal processor (DSP), an application specific integrated circuit (ASIC), a field programmable gate array (FPGA), or another programmable logic device, a discrete gate, a transistor logic device, or a discrete hardware component. The methods, steps, and logic block diagrams disclosed in this application may be implemented or performed. A general-purpose processor may be a microprocessor, or the processor may be any conventional processor. The steps of the methods disclosed in this application may be directly executed by a hardware decoding processor or executed by a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in a memory. The processor reads information in the memory and completes the steps of the foregoing methods in combination with hardware thereof.

Figure 16:
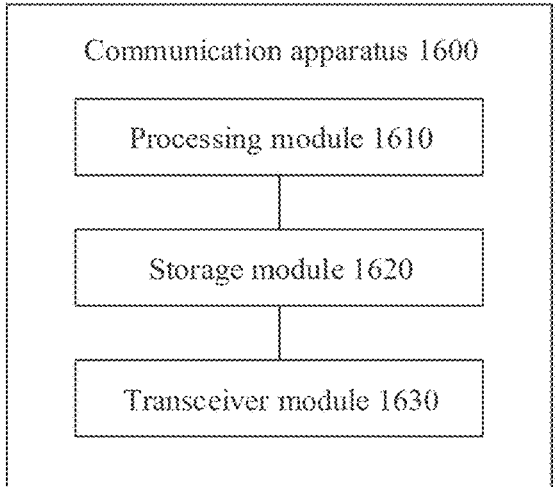
FIG. 16 is a schematic block diagram of another communication apparatus according to an embodiment of this application.

It should be noted that in this embodiment of this application, the processor 1510 may be implemented by a processing module, the memory 1520 may be implemented by a storage module, and the antenna 1530 may be implemented by a transceiver module. As shown in FIG. 16, a communication apparatus 1600 may include a processing module 1610, a storage module 1620, and a transceiver module 1630.

The communication apparatus 1500 shown in FIG. 15 or the communication apparatus 1600 shown in FIG. 16 can implement all the steps in the foregoing FIG. 2A and FIG. 2B to FIG. 12. For similar descriptions, refer to the descriptions of the methods. To avoid repetition, details are not described herein again.

Figure 17:
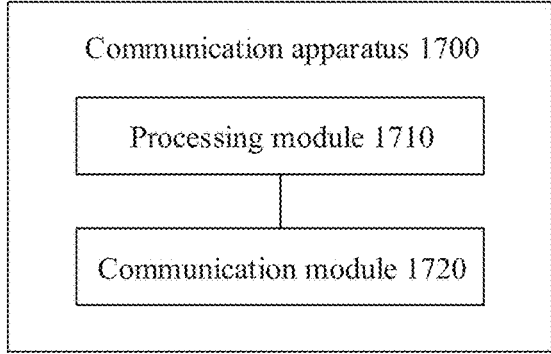
FIG. 17 is a possible schematic diagram of a structure of a terminal device according to an embodiment of this application.

FIG. 17 shows a schematic diagram of a possible structure of a terminal device 1700 in the foregoing embodiments. The terminal device 1700 may be the first terminal device 140 or the second terminal device 150. As shown in FIG. 17, the terminal device 1700 may include a processing module 1710 and a communication module 1720. The processing module 1710 may be configured to control and manage an action of the terminal device. The communication module 1720 may be configured to support communication between the terminal device and another device.

The communication module 1720 may be configured to support the terminal device 1700 to perform all the steps in the foregoing FIG. 2A and FIG. 2B to FIG. 12.

The processing module 1710 may be configured to support the terminal device to indicate that a call is connected, play a ringback tone, ring, play a voice, and the like.

It should be noted that all related content of the steps in the foregoing method embodiments may be cited in function description of corresponding functional modules. Details are not described herein.

The terminal device provided in this embodiment is configured to perform the foregoing communication methods. Therefore, same effect as that of the foregoing implementation methods may be achieved.

The processing module may be a processor or a controller. The processing module may implement or execute various examples of logical blocks, modules, and circuits described with reference to content disclosed in this application. The processor may alternatively be a combination for implementing a computing function, for example, a combination including one or more microprocessors, a combination of a digital signal processor (DSP) and a microprocessor, or the like. The storage module may be a memory. The communication module may be specifically a device, such as a radio frequency circuit, a Bluetooth chip, or a Wi-Fi chip, that interacts with another terminal device.

In some embodiments, the communication module and the processing module may be integrated into one processor. In some other embodiments, the communication module and the processing module may be two processors, which respectively implement a function of the communication module and a function of the processing module.

The terminal device, the computer storage medium, the computer program product, or the chip provided in the embodiments are all configured to perform the corresponding methods provided above. Therefore, for beneficial effect that can be achieved, refer to beneficial effect of the corresponding methods, and details are not described herein again.

It may be understood that some optional features in this embodiment of this application may not depend on another feature in some scenarios, for example, a solution that is currently based on the feature, but is implemented independently to resolve a corresponding technical problem and achieve a corresponding effect, or may be combined with another feature in some scenarios based on a requirement. Correspondingly, the apparatus provided in this embodiment of this application may correspondingly implement these features or functions, and details are not described herein again.

A person skilled in the art may further learn that various illustrative logic blocks and steps listed in the embodiments of this application may be implemented by electronic hardware, computer software, or a combination thereof. Whether the functions are implemented by using hardware or software depends on particular applications and a design requirement of the entire system. A person skilled in the art may use different methods to implement the described functions for each particular application, but it should not be understood that the implementation goes beyond the protection scope of the embodiments of this application.

The technologies described in this application may be implemented in various manners. For example, these technologies may be implemented in a manner of hardware, software, or a combination of software and hardware. For a hardware-based implementation, a processing unit configured to execute these technologies on a communication apparatus (for example, a base station, a terminal, a network entity, or a chip) may be implemented in one or more general-purpose processors, DSPs, digital signal processing devices, ASICs, programmable logic devices, FPGAs, or other programmable logic apparatuses, discrete gates or transistor logic, discrete hardware devices, or any combination thereof. The general-purpose processor may be a microprocessor. Optionally, the general-purpose processor may be any conventional processor, controller, microcontroller, or state machine. The processor may alternatively be implemented through a combination of computing apparatuses, for example, a combination of a digital signal processor and a microprocessor, a plurality of microprocessors, one or more microprocessors in conjunction with a digital signal processor core, or any other similar configuration.

It may be understood that the memory in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and serves as an external cache. Through illustrative but not limited description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memories used for the systems and the methods described herein are intended to include, but are not limited to, these and any other suitable types of memories.

This application further provides an apparatus, where the apparatus may be specifically a chip, a component, or a module, and the apparatus may include a processor, a memory, and a communication module that are connected. The memory is configured to store computer-executable instructions. When the apparatus is run, the processor may execute the computer-executable instructions stored in the memory, to enable the chip to perform the communication methods in the foregoing method embodiments.

This embodiment further provides a computer storage medium. The computer storage medium stores a computer instruction. When the computer instruction is run on a terminal device, the terminal device is enabled to perform the steps of the foregoing related methods and implement the communication methods in the foregoing embodiments.

This application further provides a computer-readable medium, where the computer-readable medium stores a computer program, and the computer program implements a function of any one of the foregoing method embodiments when being executed by a computer.

This embodiment further provides a computer program product. When the computer program product runs on a computer, the computer is enabled to perform the foregoing related steps, so as to implement the communication method in the foregoing embodiment.

All or some of the foregoing embodiments may be implemented by software, hardware, firmware, or any combination thereof. When the software is used for implementation, all or some of the foregoing embodiments may be implemented in a form of a computer program product. The computer program product includes one or more computer instructions. When the computer instruction is loaded and executed on a computer, all or some of the processes or functions according to the embodiments of this application are produced. The computer may be a general-purpose computer, a dedicated computer, a computer network, or another programmable apparatus. The computer instruction may be stored in a computer-readable storage medium or transmitted from one computer-readable storage medium to another computer-readable storage medium. For example, the computer instruction may be transmitted from one website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center that includes one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

In the foregoing embodiments, the electronic device may perform some or all the steps in the embodiments. These steps or operations are merely examples. The embodiments of this application may further perform another operation or deformation of various operations. In addition, the steps may be performed in an order different from that described in the embodiments, and possibly not all the operations in the embodiments of this application need to be performed. In addition, sequence numbers of the steps do not mean execution sequences. The execution sequences of the various processes should be determined based on functions and internal logic of the processes, and should not be construed as any limitation on the implementation processes of the embodiments of this application.

A person of ordinary skill in the art may be aware that, units, algorithms, and steps described in the examples described with reference to the embodiments disclosed in this specification may be implemented by electronic hardware or a combination of computer software and electronic hardware. Whether these functions are performed by hardware or software depends on design constraints and specific application of the technical solutions. A person skilled in the art may use different methods to implement the described functions for each particular application, but it should not be considered that the implementation goes beyond the scope of this application.

It may be clearly understood by a person skilled in the art that, for convenient and brief description, for specific working processes of the above systems, apparatuses, and units, refer to the corresponding processes in the above method embodiments, and the details are not repeated herein.

In the several embodiments provided in this application, it should be understood that the disclosed systems, apparatuses, and methods may be implemented in other manners. For example, the described apparatus embodiments are merely examples. For example, division of the units is merely logical function division. In an actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic, mechanical, or another form.

The units described as separate components may or may not be physically separate, and components displayed as units may or may not be physical units, and may be at one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit.

The function may be stored in a computer-readable storage medium when the function is implemented in a form of a software functional unit and sold or used as an independent product. Based on such an understanding, the technical solutions of this application essentially, or the part contributing to the conventional technology, or some of the technical solutions may be embodied in a form of a software product. The computer software product is stored in a storage medium, and includes several instructions for indicating a computer device (which may be a personal computer, a server, a network device, or the like) to perform all or some of the steps of the methods described in embodiments of this application. The storage medium includes various media that can store program code, for example, a USB flash drive, a removable hard disk, a read-only memory ROM, a random access memory RAM, a magnetic disk, or an optical disc.

It should be noted that sequence numbers of the various processes do not mean execution sequences in various embodiments of this application. The execution sequences of the various processes should be determined based on functions and internal logic of the processes, and should not be construed as any limitation on the implementation processes of the embodiments of this application.

In addition, the terms "system" and "network" are often used interchangeably in this specification. In this specification, the term "and/or" is only a description of an association relationship between associated objects, and means that there may be three types of relationships. For example, A and/or B may mean that A exists alone, both A and B exist, and B exists alone. In addition, the character "/" in this specification usually indicates an "or" relationship between associated objects. For example, A/B may mean A or B.

The terms (or numbers) "first", "second", and the like that appear in the embodiments of this application are for description purposes only, that is, for distinguishing between different objects, for example, different "measurement results", and shall not be construed as indicating or implying relative importance or implying a quantity of indicated technical features. Therefore, features defined as "first", "second", and the like may explicitly or implicitly include one or more of these features. Further, in the descriptions of the embodiments of this application, "at least one items" means "one or more items". "A plurality of" means two or more. "At least one of the following items" or a similar expression means any combination of these items, including a single item or any combination of a plurality of items.

For example, a meaning of an expression similar to the expression "the item includes at least one of the following: A, B, and C" that appears in the embodiments of this application usually means, unless otherwise specified, that the item may be any one of the following: A; B; C; A and B; A and C; B and C; A, B and C; A and A; A, A and A; A, A and B; A, A and C; A, B and B; A, C and C; B and B; B, B and B; B, B and C; C and C; C, C and C; and other combinations of A, B and C. The foregoing three elements A, B and C are used as examples to illustrate an optional entry of the item. When expressed as "The item includes at least one of the following. A, B, . . . , and X", that is, when there are more elements in the expression, the entries that the item may apply to may also be obtained according to the foregoing rule.

In conclusion, the foregoing descriptions are merely example embodiments of this application, and are not intended to limit the protection scope of this application. Any modification, equivalent replacement, or improvement made without departing from the spirit and principle of this application falls within the protection scope of this application.

The invention claimed is:

1. A communication method, comprising:

receiving, by a second terminal device, a first switching instruction before a network standard of the second terminal device is configured as a second network standard, wherein the network standard of the second terminal device is configured as the second network standard in response to the first switching instruction;

receiving, by the second terminal device, a first call initiated by a first terminal device;

receiving, by the second terminal device, UPDATE signaling from the first terminal device based on the first call;

sending, by the second terminal device, first signaling to the first terminal device in response to receiving the UPDATE signaling, wherein the first signaling comprises 200 OK and a=curr:qos local sendrecv, the first signaling is sent before second signaling is received by the second terminal device, and the second signaling comprises QCI=1; and receiving, by the second terminal device, a voice from the first terminal device after the second terminal device connects to the first call.

2. The method according to claim 1, wherein an EPS (Evolved Packet System) fallback occurs on the second terminal device after the first call initiated by the first terminal device is received and before the first signaling is to be received by the first terminal device.

3. The method according to claim 2, wherein the first signaling is received by the first terminal device based on completion of the EPS fallback by the second terminal device.

4. The method according to claim 1, further comprising:

sending, by the second terminal device before the second terminal device receives the first switching instruction, 100 Trying signaling to the first terminal device in response to the first call initiated by the first terminal device, wherein the first switching instruction is received based on the 100 Trying signaling.

5. An electronic device, comprising:

an antenna;

a memory configured to store instructions; and a processor configured to execute the instructions stored in the memory, to control the antenna to receive or send a signal, so as to cause the electronic device to:

receive a first switching instruction before a network standard of the electronic device is configured as a second network standard, wherein the network standard of the electronic device is configured as the second network standard in response to the first switching instruction;

receive a first call initiated by a second electronic device;

receive UPDATE signaling from the second electronic device based on the first call;

send a first signaling to the second electronic device in response to receiving the UPDATE signaling, wherein the first signaling comprises 200 OK and a=curr:qos local sendrecv, the first signaling is sent before second signaling is received by the electronic device, and the second signaling comprises QCI=1; and receive a voice from the second electronic device after the electronic device connects to the first call.

6. The electronic device according to claim 5, wherein an EPS (Evolved Packet System) fallback occurs on the electronic device after the first call initiated by the second electronic device is received and before the first signaling is to be received by the electronic device.

7. The electronic device according to claim 6, wherein the first signaling is received by the electronic device based on completion of the EPS fallback by the electronic device.

8. The electronic device according to claim 5, wherein the processor executing the instructions further causes the electronic device to:

send, before the electronic device receives the first switching instruction, 100 Trying signaling to the second electronic device in response to the first call initiated by the second electronic device, wherein the first switching instruction is received based on the 100 Trying signaling.

9. A chip system, comprising:

a processor, wherein the processor is configured to execute a computer-executable program, to enable a device installed with the chip system to:

receive a first switching instruction before a network standard of the device is configured as a second network standard, wherein the network standard of the device is configured as the second network standard in response to the first switching instruction;

receive a first call;

receive UPDATE signaling based on the first call;

send a first signaling to the chip system in response to receiving the UPDATE signaling, wherein the first signaling comprises 200 OK and a=curr:qos local sendrecv, the first signaling is sent before second signaling is received by the chip system, and the second signaling comprises QCI=1; and receive a voice from the chip system after the chip system connects to the first call.

10. The chip system according to claim 9, wherein an EPS (Evolved Packet System) fallback occurs on the chip system after the first call is received and before the first signaling is to be received.

11. The chip system according to claim 10, wherein the first signaling is received based on completion of the EPS fallback by the chip system.

12. The chip system according to claim 9, wherein the processor executing the computer-executable program further enabled the device to:

send, before the chip system receives the first switching instruction, 100 Trying signaling to a first electronic device in response to receiving the first call, wherein the first switching instruction is received based on the 100 Trying signaling.

* * * * *